United States Patent
Murayama

[11] Patent Number: 5,923,786
[45] Date of Patent: Jul. 13, 1999

[54] METHOD AND DEVICE FOR ENCODING AND DECODING MOVING IMAGES

[75] Inventor: Jun Murayama, Tokyo, Japan

[73] Assignee: Sony Corporation, Tokyo, Japan

[21] Appl. No.: 08/680,489

[22] Filed: Jul. 15, 1996

[30] Foreign Application Priority Data

Jul. 17, 1995 [JP] Japan ................................. 7-179774
Jul. 19, 1995 [JP] Japan ................................. 7-182426

[51] Int. Cl.⁶ ........................................................ G06K 9/48
[52] U.S. Cl. ........................ 382/242; 382/232; 382/236; 348/413; 348/416
[58] Field of Search ................................. 382/242, 232, 382/236, 197; 348/413, 437, 416

[56] References Cited

U.S. PATENT DOCUMENTS

| | | | |
|---|---|---|---|
| 4,951,140 | 8/1990 | Ueno et al. | 348/413 |
| 5,523,793 | 6/1996 | Fujita et al. | 348/437 |
| 5,592,228 | 1/1997 | Dachiku et al. | 348/416 |
| 5,594,504 | 1/1997 | Ebrahimi | 348/416 |
| 5,598,215 | 1/1997 | Watanabe | 348/416 |
| 5,757,972 | 5/1998 | Murayama | 382/242 |

*Primary Examiner*—Jose L. Couso
*Assistant Examiner*—Anh Hong Do
*Attorney, Agent, or Firm*—Limbach & Limbach L.L.P.

[57] ABSTRACT

An image encoding method for encoding moving images, comprising the steps of:

detecting characteristic points of a moving image;

encoding a chain generated based on information relating to the characteristic points in such a manner as to generate chain encoded data, with the chain corresponding to an outline of the image;

detecting motion of the chain and generating information corresponding to the motion; and multiplexing the chain encoded data and the motion information.

12 Claims, 74 Drawing Sheets

FIG. 7
| address | storage value of ROM 30 | storage value of ROM 31 |
|---|---|---|
| 0 | -1 | -1 |
| 1 | -1 | 0 |
| 2 | -1 | 1 |
| 3 | 0 | -1 |
| 4 | 0 | 1 |
| 5 | 1 | -1 |
| 6 | 1 | 0 |
| 7 | 1 | 1 |
storage values of ROMs 30 and 31
FIG. 8
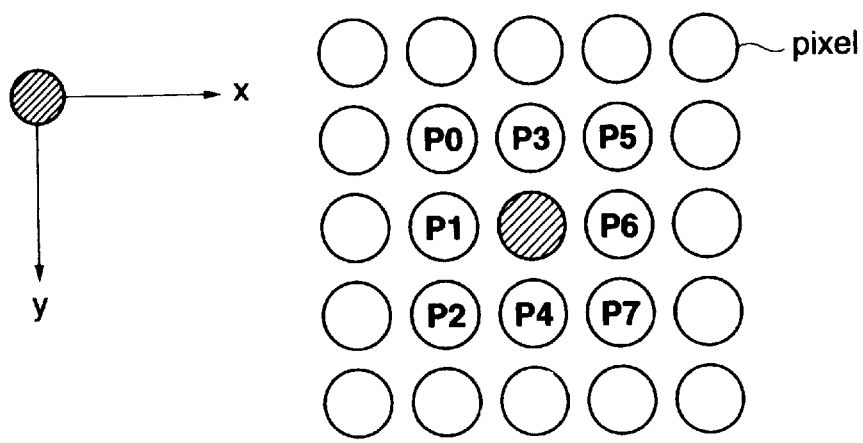
address generated by address generator 32 for noted pixel 

| address | stored contents of ROM 33 |
|---------|---------------------------|
| 0 | C0 |
| 1 | C1 |
| 2 | C2 |
| 3 | C3 |
| 4 | C4 |
| 5 | C5 |
| 6 | C6 |
| 7 | C7 | stored contents of ROM 33 directions expressed by direction data timing diagram for valid data selection signal, direction data and forward direction data

| | forward direction data | direction data | direction change data |
|---|---|---|---|
| FIG. 13A | 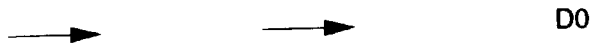 | | D0 |
| FIG. 13B | 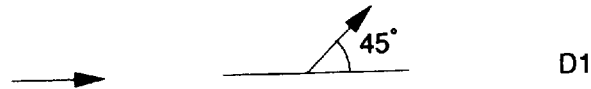 | | D1 |
| FIG. 13C | 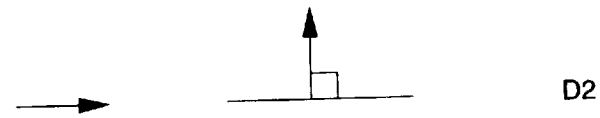 | | D2 |
| FIG. 13D | 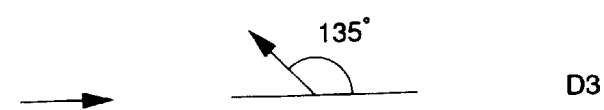 | | D3 |
| FIG. 13E |  | | D4 |
| FIG. 13F |  | | D5 |
| FIG. 13G | 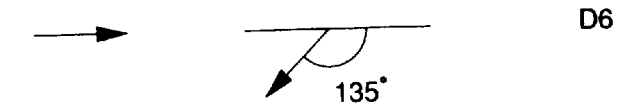 | | D6 |
| FIG. 13H |  | | no code |

FIG. 14

| forward direction data | direction data | direction change data |
|---|---|---|
| C0<br>C1<br>C2<br>C3<br>C4<br>C5<br>C6<br>C7 | C0<br>C1<br>C2<br>C3<br>C4<br>C5<br>C6<br>C7 | D0 |
| C0<br>C1<br>C2<br>C3<br>C4<br>C5<br>C6<br>C7 | C1<br>C2<br>C4<br>C0<br>C7<br>C3<br>C5<br>C6 | D1 |
| C0<br>C1<br>C2<br>C3<br>C4<br>C5<br>C6<br>C7 | C2<br>C4<br>C7<br>C1<br>C6<br>C0<br>C3<br>C5 | D2 |
| C0<br>C1<br>C2<br>C3<br>C4<br>C5<br>C6<br>C7 | C4<br>C7<br>C6<br>C2<br>C5<br>C1<br>C0<br>C3 | D3 | example of input/output of direction change signal generator 35

FIG. 15

| forward direction data | direction data | direction change data |
|---|---|---|
| C0<br>C1<br>C2<br>C3<br>C4<br>C5<br>C6<br>C7 | C3<br>C0<br>C1<br>C5<br>C2<br>C6<br>C7<br>C4 | D4 |
| C0<br>C1<br>C2<br>C3<br>C4<br>C5<br>C6<br>C7 | C5<br>C3<br>C0<br>C6<br>C1<br>C7<br>C4<br>C2 | D5 |
| C0<br>C1<br>C2<br>C3<br>C4<br>C5<br>C6<br>C7 | C6<br>C5<br>C3<br>C7<br>C0<br>C4<br>C2<br>C1 | D6 |
| C0<br>C1<br>C2<br>C3<br>C4<br>C5<br>C6<br>C7 | C7<br>C6<br>C5<br>C4<br>C3<br>C2<br>C1<br>C0 | no code | example of input/output of direction change signal generator 35

FIG. 16

| direction change signal | code word |
|---|---|
| D0 | 1 |
| D1 | 01 |
| D2 | 001 |
| D3 | 0001 |
| D4 | 00001 |
| D5 | 000001 |
| D6 | 0000001 | example of code word allotment for direction change data

FIG. 21 storage contents of RAM 52n

|  |  |  |  |  |  |  |  |  | ⋱ |
|---|---|---|---|---|---|---|---|---|---|
| -1 | -1 | -1 | -1 | -1 | -1 | -1 | -1 |  |  |
| -1 | -1 | -1 | -1 | -1 | -1 | -1 | -1 |  |  |
| -1 | -1 | -1 | -1 | -1 | -1 | -1 | 123 |  |  |
| -1 | -1 | -1 | -1 | -1 | -1 | 123 | -1 |  |  |
| -1 | -1 | -1 | -1 | -1 | 123 | 123 | -1 |  |  |
| -1 | -1 | -1 | -1 | 14 | -1 | -1 | -1 |  |  |
| -1 | -1 | 10 | 10 | -1 | -1 | 14 | -1 |  |  |
| 10 | 10 | -1 | -1 | -1 | 14 | -1 | -1 |  |  |
| -1 | -1 | -1 | -1 | 0 | -1 | -1 | -1 |  |  |
| -1 | -1 | -1 | 0 | -1 | 0 | -1 | -1 |  |  |
| -1 | 0 | 0 | -1 | -1 | -1 | -1 | -1 |  |  |
| -1 | -1 | -1 | -1 | -1 | -1 | -1 | -1 |  |  |
| -1 | -1 | -1 | -1 | -1 | -1 | -1 | -1 |  |  |

FIG. 24

| chain number | motion vector going to following frame | motion vector going to previous frame | chain number of chain in the previous frame having the highest degree of similarity | chain number of chain in the following frame having the highest degree of similarity |
|---|---|---|---|---|
| 0 | 0,-8 | 1,2 | 12 | 34 |
| 1 | -1,-3 | 1,2 | -1 | 123 |
| 2 | 6,6 | -6,5 | 109 | -1 |
| 3 | 7,7 | 2,1 | -1 | -1 |
| · · · | · · · | · · · | · · · | · · · |
| N1 | -5,-5 | 0,-1 | 210 | 4 | storage contents of RAM 42n

FIG. 26A storage contents of RAM 42n fifth frame

| chain number | motion vector going to following frame | motion vector going to previous frame | chain number of chain in the previous frame having the highest degree of similarity | chain number of chain in the following frame having the highest degree of similarity |
|---|---|---|---|---|
| ⋮ | ⋮ | ⋮ | ⋮ | ⋮ |
| 273 | -1,3 | 3,6 | -1 | 56 |
|  |  |  |  |  | sixth frame

| chain number | motion vector going to following frame | motion vector going to previous frame | chain number of chain in the previous frame having the highest degree of similarity | chain number of chain in the following frame having the highest degree of similarity |
|---|---|---|---|---|
| ⋮ | ⋮ | ⋮ | ⋮ | ⋮ |
| 56 | -3,-6 | 0,2 | 273 | 24 |
|  |  |  |  |  | seventh frame

| chain number | motion vector going to following frame | motion vector going to previous frame | chain number of chain in the previous frame having the highest degree of similarity | chain number of chain in the following frame having the highest degree of similarity |
|---|---|---|---|---|
| ⋮ | ⋮ | ⋮ | ⋮ | ⋮ |
| 24 | 0,-2 | 3,9 | 56 | -1 |
|  |  |  |  |  |

FIG. 26B storage contents of RAM 44

| frame number | chain number | motion vector going to following frame | motion vector going to previous frame |
|---|---|---|---|
| ⋮ | ⋮ | ⋮ | ⋮ |
| 5 | 273 | -1,3 | 3,6 |
| 6 | 56 | -3,-6 | 0,2 |
| 7 | 24 | 0,-2 | 3,9 |
| ⋮ | ⋮ | ⋮ | ⋮ |

FIG. 26C output of chain linking circuit 43

| minimum frame number | 5 |
|---|---|
| minimum chain number | 273 |

| motion vector going to following frame | -1,3 | -3,-6 | 0,2 |
|---|---|---|---|

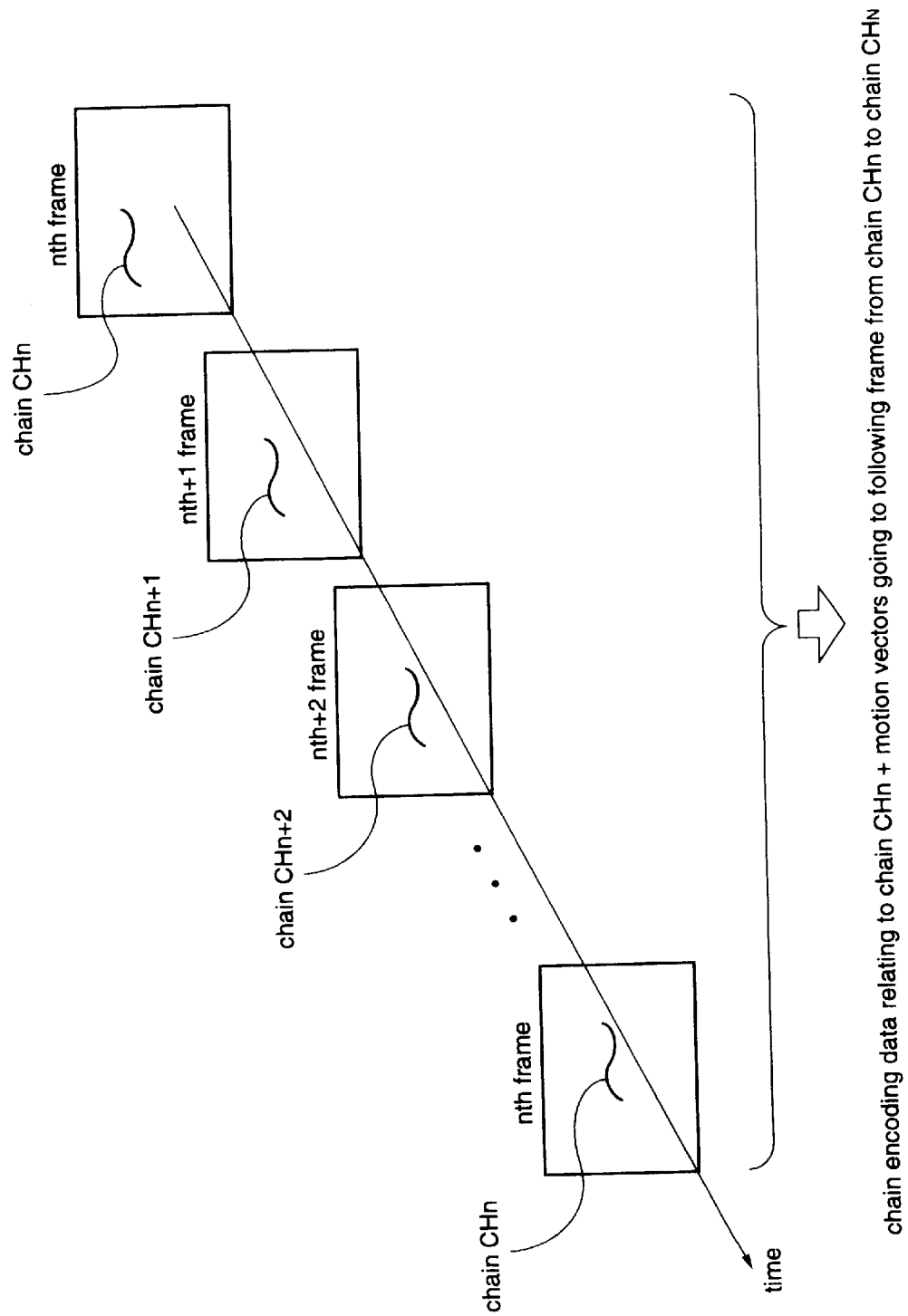

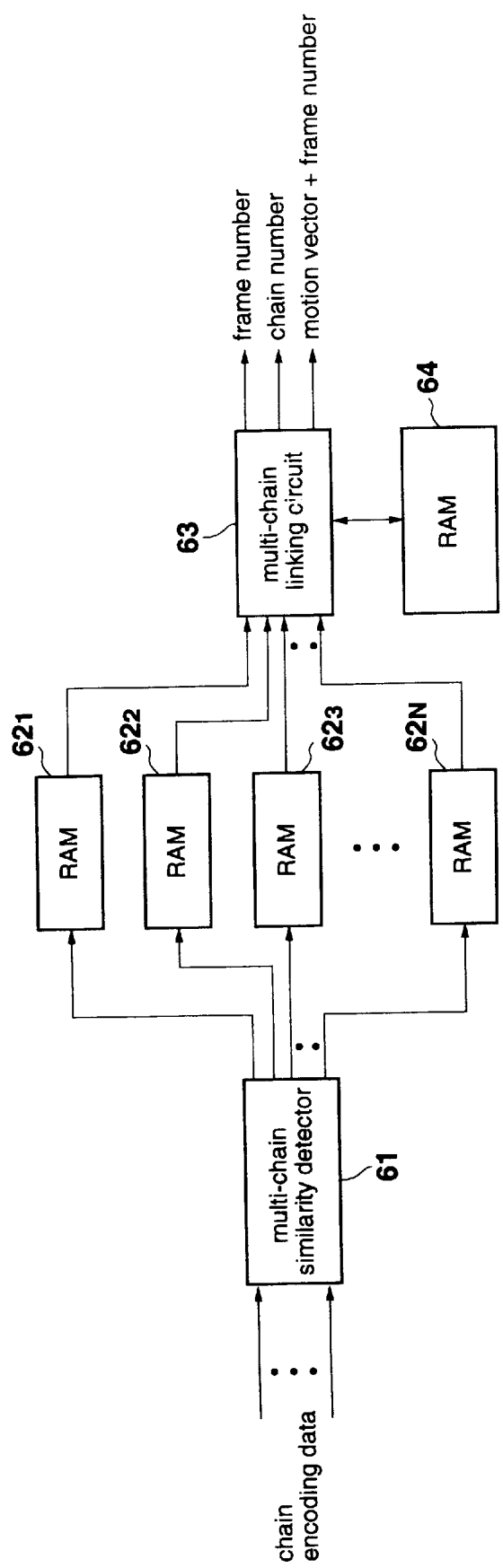

FIG. 29

| chain number | motion vector going to following frame | motion vector going to previous frame | chain number of previous frame | degree of similarity | chain number of following frame | degree of similarity |
|---|---|---|---|---|---|---|
| 0 | 0,-8 | 1,2 | 12 | 0.7 | 109 | 0.7 |
|  |  |  | 8 | 0.23 | 69 | 0.1 |
| 1 | 7,7 | 2,1 | 44 | 0.06 | -1 | -1 |
|  |  |  | 121 | 0.92 | 39 | 0.97 |
| ... | ... | ... | ... | ... | ... | ... |
| N2 | -5,-5 | 0,-1 | 2 | 0.2 | -1 | -1 | storage contents of RAM 62n

FIG. 37 seventh frame

| chain number | motion vector to following frame | motion vector to previous frame | chain number of previous frame | degree of similarity | chain number of following frame | degree of similarity |
|---|---|---|---|---|---|---|
| ⋮ | ⋮ | ⋮ | ⋮ | ⋮ | ⋮ | ⋮ |
| 36 | 0,-2 | 3,9 | -1 | -1 | 56 | 0.97 |
| ⋮ | ⋮ | ⋮ | ⋮ | ⋮ | ⋮ | ⋮ |
| 151 | 0,-2 | 3,1 | -1 | -1 | 56 | 0.91 |
| | | | | | | | eighth frame

| chain number | motion vector to following frame | motion vector to previous frame | chain number of previous frame | degree of similarity | chain number of following frame | degree of similarity |
|---|---|---|---|---|---|---|
| ⋮ | ⋮ | ⋮ | ⋮ | ⋮ | ⋮ | ⋮ |
| 56 | 5,3 | -2,0 | 36 | 0.96 | 24 | 0.99 |
| | | | 151 | 0.91 | 25 | 0.92 |
| | | | | | | | ninth frame

| chain number | motion vector to following frame | motion vector to previous frame | chain number of previous frame | degree of similarity | chain number of following frame | degree of similarity |
|---|---|---|---|---|---|---|
| ⋮ | ⋮ | ⋮ | ⋮ | ⋮ | ⋮ | ⋮ |
| 24 | 1,-1 | 4,0 | 56 | 0.95 | -1 | -1 |
| 25 | 1,-1 | 4,2 | 56 | 0.90 | -1 | -1 |
| | | | | | | | storage contents of RAM 62n storage contents of RAM 64

| frame number | chain number | motion vector to following frame | motion vector to previous frame |
|---|---|---|---|
| ⋮ | ⋮ | ⋮ | ⋮ |
| 7 | 36 | 0,-2 | 3,9 |
|   | 151 | 0,-2 | 3,1 |
| 8 | 56 | 5,3 | -2,0 |
| 9 | 24 | 1,-1 | 4,0 |
|   | 25 | 1,-1 | 4,2 |
| ⋮ | ⋮ | ⋮ | ⋮ | output of multi-chain linking circuit 63

FIG. 46 storage contents of RAM 123n

| 0 | 0 | 0 | 0 | 0 | 0 | 0 | 0 | 0 |
| - | - | - | - | - | - | - | - | - |
| 0 | 0 | 0 | 0 | 0 | 0 | 0 | 0 | 0 |
| 0 | 1 | 1 | 0 | 0 | 0 | 0 | 0 | 0 |
| 0 | 0 | 0 | 1 | 0 | 1 | 0 | 1 | 0 |
| 0 | 0 | 0 | 0 | 1 | 0 | 0 | 1 | 0 |
| 0 | 0 | 0 | 0 | 0 | 0 | 0 | 1 | 0 |
| 1 | 1 | 0 | 0 | 0 | 1 | 0 | 0 | 1 |
| 0 | 0 | 1 | 1 | 0 | 0 | 1 | 0 | 0 |
| 0 | 0 | 0 | 0 | 0 | 0 | 0 | 0 | 0 |
| 0 | 0 | 0 | 0 | 0 | 1 | 1 | 0 | 0 |
| 0 | 0 | 0 | 0 | 1 | 0 | 0 | 0 | 0 |
| 0 | 0 | 0 | 0 | 0 | 0 | 0 | 0 | 0 |

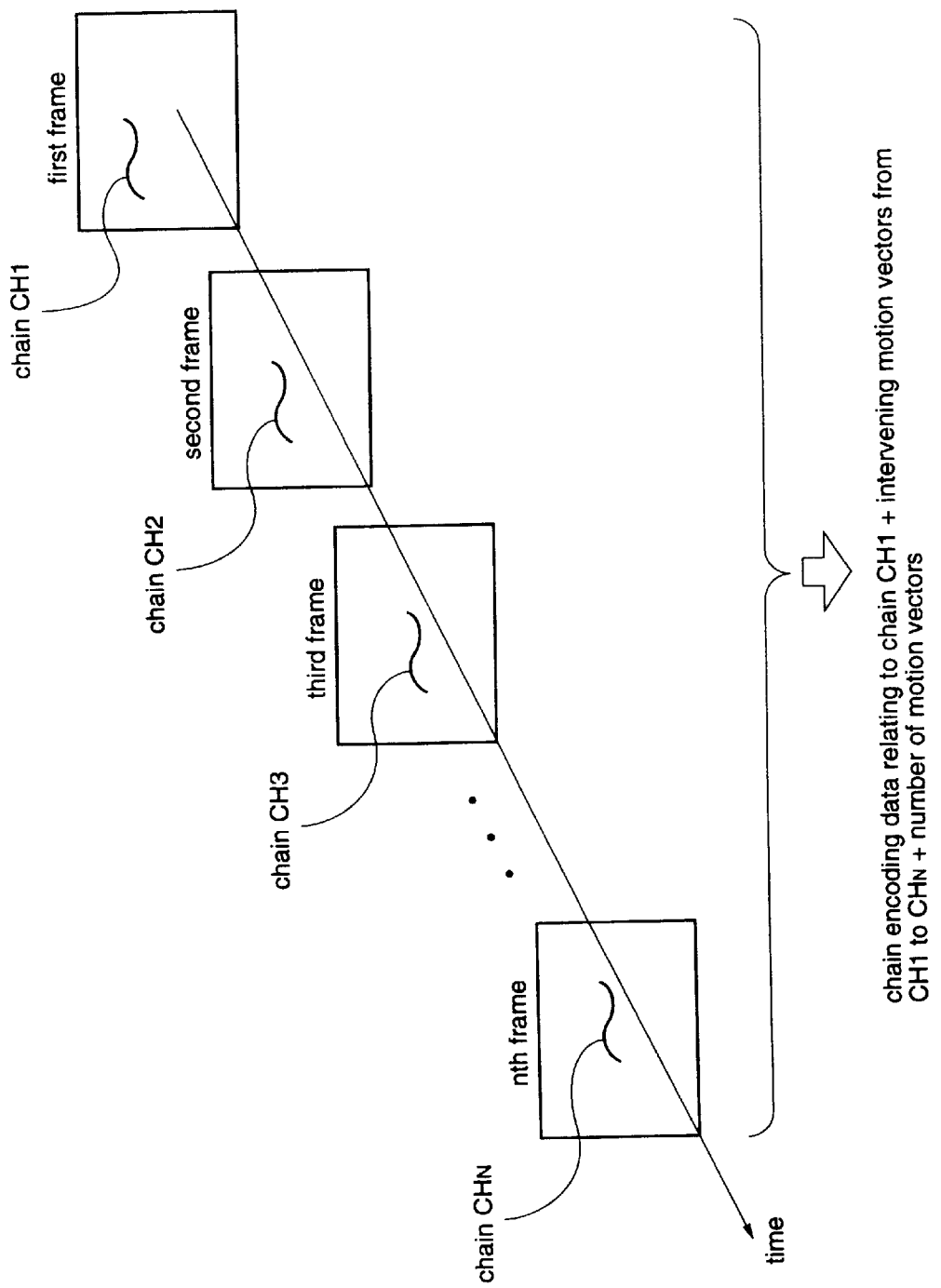

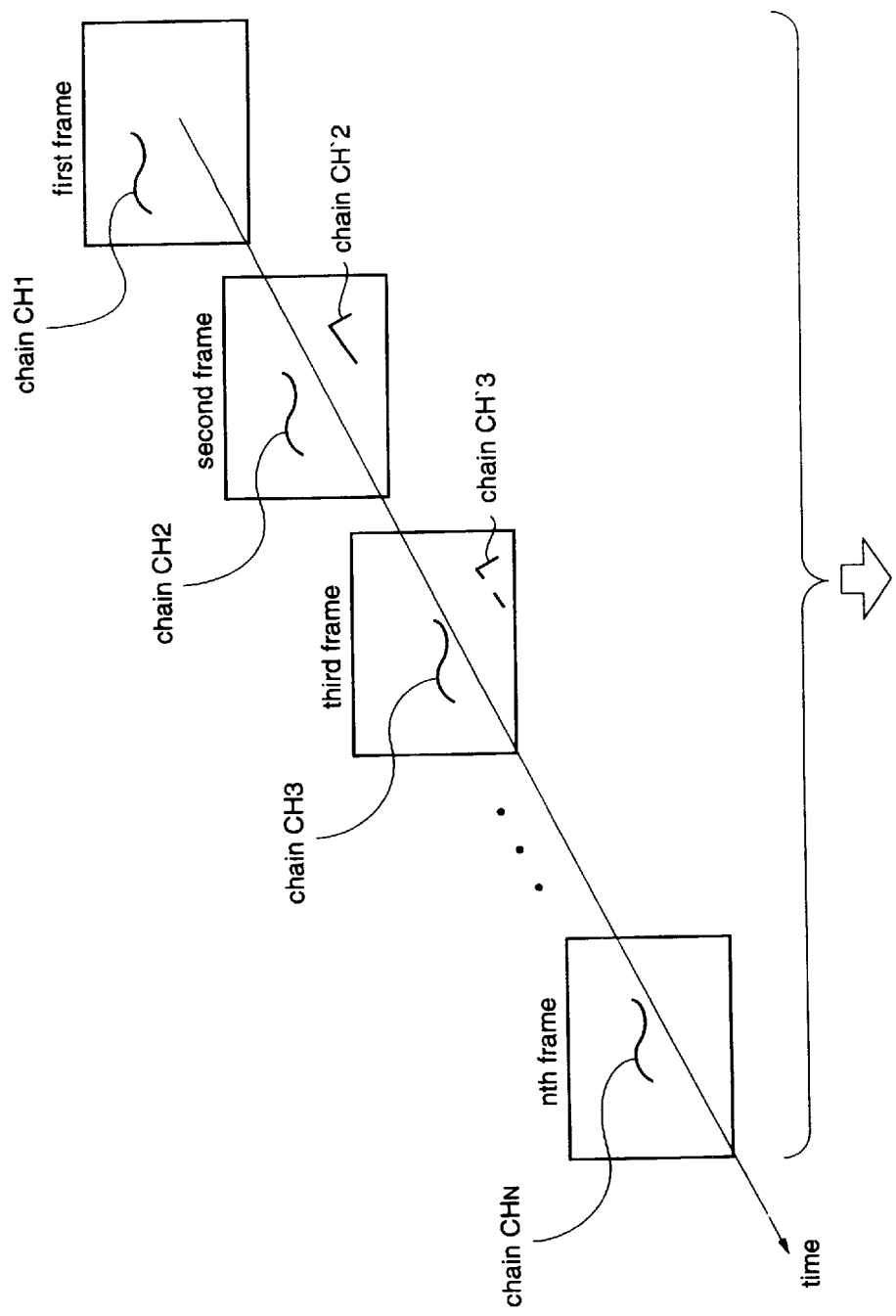

original image decoded image original image decoded image

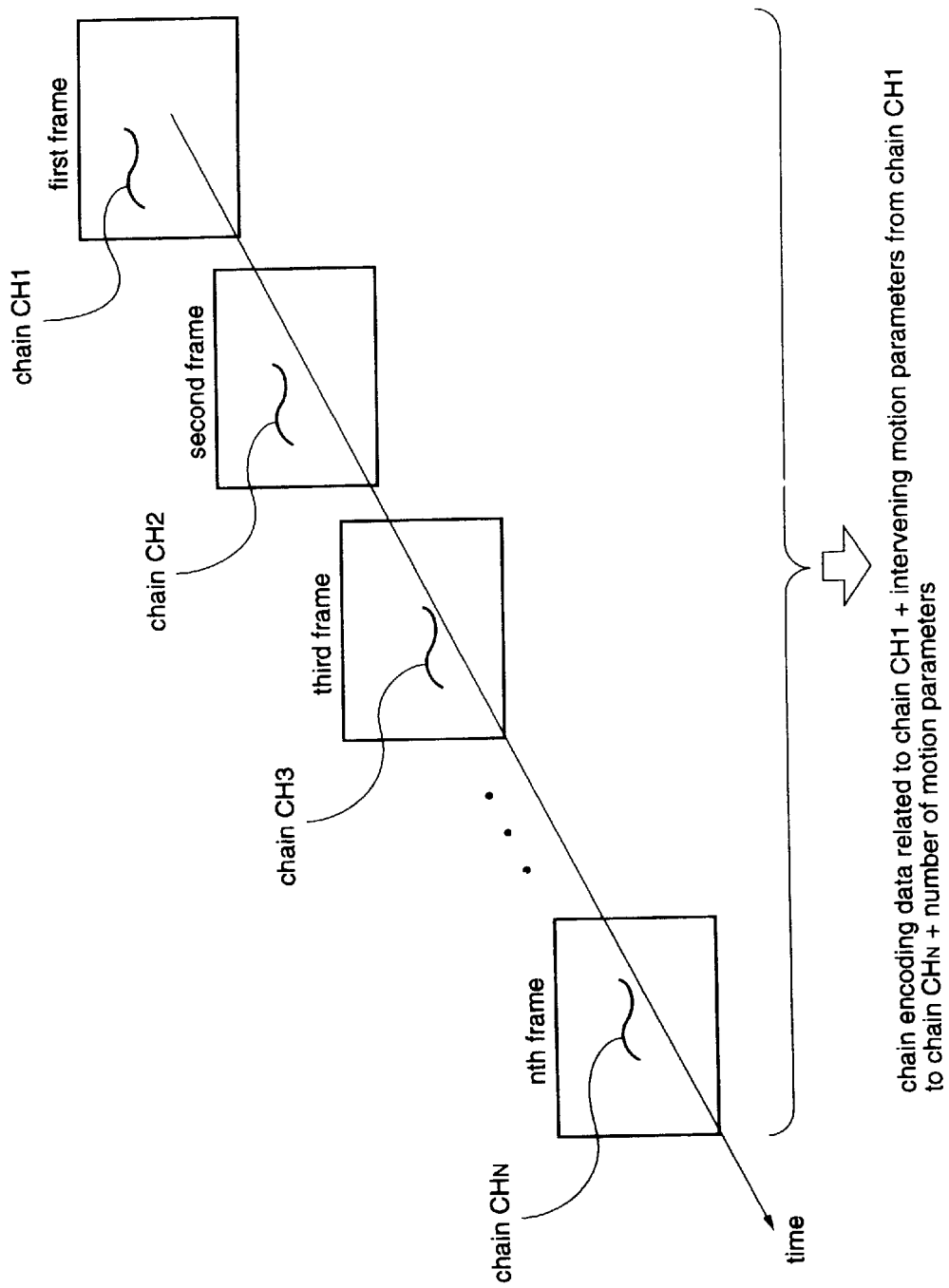

METHOD AND DEVICE FOR ENCODING AND DECODING MOVING IMAGES

BACKGROUND OF THE INVENTION

1. Field of the Invention

The present invention relates to an image encoding device and image encoding method, an image decoding device and image decoding method, a recording medium and a motion parameter detecting device and motion parameter detecting method and more particularly relates to an image encoding device and image encoding method, an image decoding device and image decoding method, a recording medium and a motion parameter detecting device and motion parameter detecting method capable of reducing the amount of code generated by multiplexing encoded image data relating to characteristic points of a moving image and motion vectors for chains linking these characteristic points. The present invention also further relates to a motion parameter detecting device and a motion parameter detecting method capable of accurately detecting motion parameters expressing the motion of image linking points for chains etc. linking characteristic points of an image, capable of being applied to the above-mentioned image encoding.

2. Description of Related Art

Conventionally, highly efficient coding methods have been adopted for efficiently compressing image data using few code words in devices such as devices for transmitting images across limited transmission bands or devices for recording to recording media of limited storage capacity. Methods such as methods where, for example, inputted images undergo an orthogonal transformation using DCTs (Discrete Cosine Transforms) and are then appropriately quantized in accordance with peoples' sense of sight every frequency band or methods where an image is divided into sub-bands by a wavelet base (wavelet transform) and encoding is performed with a weighting given to each band are well known as highly efficient image encoding methods. According to these methods, visual distortion becomes difficult to notice and a high compression efficiency can be achieved.

However, if the compression efficiency is increased in these encoding methods, effects such as block distortions which are not visually pleasing become more striking.

Further methods such as structure extracting encoding methods where points characteristic to the structure of the image (characteristic points such as, for example, points (pixels) comprising edges) are extracted, the image data occurring at the characteristic points is efficiently encoded and the characteristic points of the image are detected, such as in U.S. patent application Ser. No. 08/457,830, U.S. Pat. No. 5,757,972, have been put forward by the applicant as encoding methods where visually damaging distortion does not occur even under a high compression rate.

However, with conventional image encoding devices where encoding was carried out by detecting characteristic points, because still images were taken as the encoding target, when moving images were taken as the encoding target, the encoding efficiency was poor when compared with transform encoding methods including, for example, motion compensation processing and DCT processing etc. because time consuming components were removed.

As the present invention sets out to resolve these kinds of problems, it is the object of the present invention to provide an image encoding device and image encoding method, an image encoding device and image decoding method and recording medium capable of increasing the compression efficiency while an image is being compression encoded using a structure extraction encoding method.

It is a further object of the present invention to provide a motion parameter detecting device and a motion parameter detecting method capable of rapidly detecting accurate motion parameters and capable of being applied to an image encoding device.

SUMMARY OF THE INVENTION

In the image encoding method of the present invention, characteristic points of a moving image are detected, chains corresponding to the outline of the image generated based on information relating to these characteristic points are encoded and chain encoded data is generated. The movement of these chains is detected and motion information corresponding to this motion is generated. The chain encoded data and the motion information is then multiplexed.

Further, in the image encoding method of the present invention, motion vectors between corresponding chains existing at neighboring frames are detected and these motion vectors are generated as motion information.

Moreover, in the image encoding method of the present invention, corresponding frames existing as different frames are connected, chain encoded data and motion vectors corresponding to these connection results are decided and the decided chain encoded data and motion vectors are then multiplexed.

Further, with the image encoding method of the present invention, degrees of similarity for chains existing at neighboring frames are calculated and corresponding chains are connected based on these degrees of similarity.

Still further, in the image encoding method of the present invention, motion parameters between chains existing at neighboring frames are detected and these motion parameters (information showing parallel movement, the rate of enlargement/reduction and the amount of rotation of the characteristic points comprising the chain) are generated as motion information.

Moreover, in the image encoding method of the present invention, one or more characteristic points is selected from the characteristic points comprising the chain, motion vectors are detected for the one or more selected characteristic points and the motion parameters for the chain are calculated based on the detected motion vectors.

Further, an image encoding device of the present invention comprises detecting means for detecting characteristic points of a moving image, encoding means for encoding a chain generated based on information relating to the characteristic points in such a manner as to generate chain encoded data, with the chain corresponding to an outline of the image, motion information detecting means for detecting motion of the chain and generating information corresponding to the motion and multiplexing means for multiplexing the chain encoded data and the motion information.

Still further, in the image decoding method of the present invention, encoded data is received, and chain encoded data encoded in information relating to characteristic points for the moving image and motion information corresponding to the chain encoded data is extracted from the encoded data. Decoded data obtained by decoding the chain encoded data is then motion compensated based on the motion information.

Moreover, the image decoding device of the present invention comprises means for receiving encoded data, means for extracting motion information corresponding to chain encoded data encoded with information relating to characteristic points of the moving image from the encoded data and motion compensating means for motion-compensating decoded data obtained by decoding the chain encoded data based on the motion information.

The recording medium of the present invention is capable of recording signals that can be decoded by a decoding device and has a recording signal capable of being decoded by a decoding device including chain encoded data encoded for a chain generated based on information relating to characteristic points of the moving image and motion information for chains corresponding to the chain encoded data.

In the signal transmission method of the present invention, where a moving image is encoded and this encoded image is transmitted, the characteristic points of the moving image are detected and chains generated based on information relating to these characteristic points corresponding to the outline of the image are encoded. Chain encoded data is therefore generated, motion of the chain is detected and motion information corresponding to this motion is generated. The chain encoded data and the motion information are then multiplexed, a multiplexed signal is generated and the multiplexed signal is transmitted.

Further, in the motion parameter detecting method of the present invention, with this motion parameter detecting method for detecting motion parameters present in parameters expressing motion of consecutive points within the image, one or more of the consecutive points are selected and motion vectors for the one or more points are selected. The motion parameters for the chain are then calculated based on the detected motion vectors.

Moreover, in the motion parameter detecting method of the present invention, two of the consecutive points are selected and the motion parameters expressing the amount of parallel movement, the enlargement/reduction rate and the amount of rotation for the consecutive points are calculated based on the motion vectors for these two points.

Further, in the motion parameter detecting method of the present invention, degrees of reliability expressing the reliability of the consecutive points are calculated and two points are selected based on these degrees of reliability.

Still further, the motion parameter detecting device for detecting motion parameters present in parameters expressing the motion of consecutive points within the image of the present invention comprises selection means for selecting one point from the consecutive points, motion vector detecting means for detecting motion vectors for the selected one or more points, and motion parameter calculating means for calculating motion parameters for the chain based on the detected motion vectors.

BRIEF DESCRIPTION OF THE DRAWINGS

FIG. 7 is a view showing the storage contents of the ROMs 30 and 31 shown in FIG. 3;

FIG. 8 is a view illustrating the addresses outputted by the address generator 32 shown in FIG. 3;

FIG. 13A to 13H are views illustrating the direction change data outputted from the direction change signal generator 35 shown in FIG. 3;

FIG. 14 is a view showing a corresponding table for the previous direction data and direction data, and the direction change data stored in the direction change signal generator 35 shown in FIG. 3;

FIG. 15 is a view showing a corresponding table of the previous direction data, the direction data and the direction change data stored in the direction change signal generator 35 shown in FIG. 3;

FIG. 16 is a view showing code words allotted to direction change data outputted by the direction change signal generator 35 shown in FIG. 3;

FIG. 21 is a view showing the storage contents of RAM $52_n$ shown in FIG. 19 for the case of the chain shown in FIG. 20 existing at the image of the nth frame;

FIG. 24 is a view showing the storage contents of RAM $42_n$ shown in FIG. 18;

FIG. 26A to FIG. 26C are views illustrating the process shown in the flowchart of FIG. 25;

FIG. 27 is a view illustrating multiplexed chain encoded data outputted by the select multiplexer 16 shown in FIG. 2;

FIG. 28 is a block diagram showing a further example of the structure of the similar chain detector 15 shown in FIG. 2;

FIG. 29 is a view showing the storage contents of the RAM $62_n$ shown in FIG. 28;

FIG. 37 is a view illustrating the process shown in the flowchart of FIG. 30;

FIG. 46 is a view showing the storage contents of the RAM $123_n$ shown in FIG. 45;

FIG. 49 is a view illustrating the multiplexed chain encoded data outputted by the select multiplexer 116 shown in FIG. 44;

FIG. 54 is a view illustrating the multiplexed chain encoded data outputted by the select multiplexer 216 shown in FIG. 50;

FIG. 61 is a view illustrating the multiplexed chain encoded data outputted by the select multiplexer 316 shown in FIG. 57;

DETAILED DESCRIPTION OF THE PREFERRED EMBODIMENTS

First Embodiment

Figure 1:
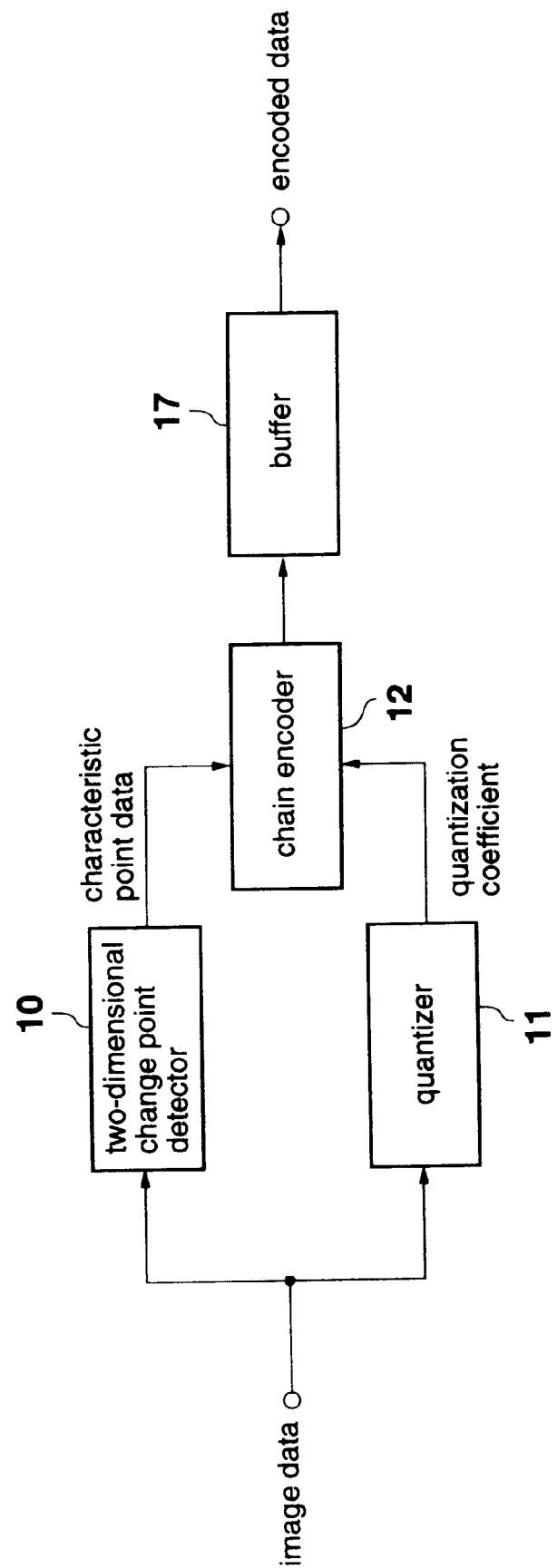
FIG. 1 is a block diagram showing an example of an image encoding device relating to the present invention.

FIG. 1 is a block diagram showing a first example of an image encoding device relating to the present invention.

Figure 2:
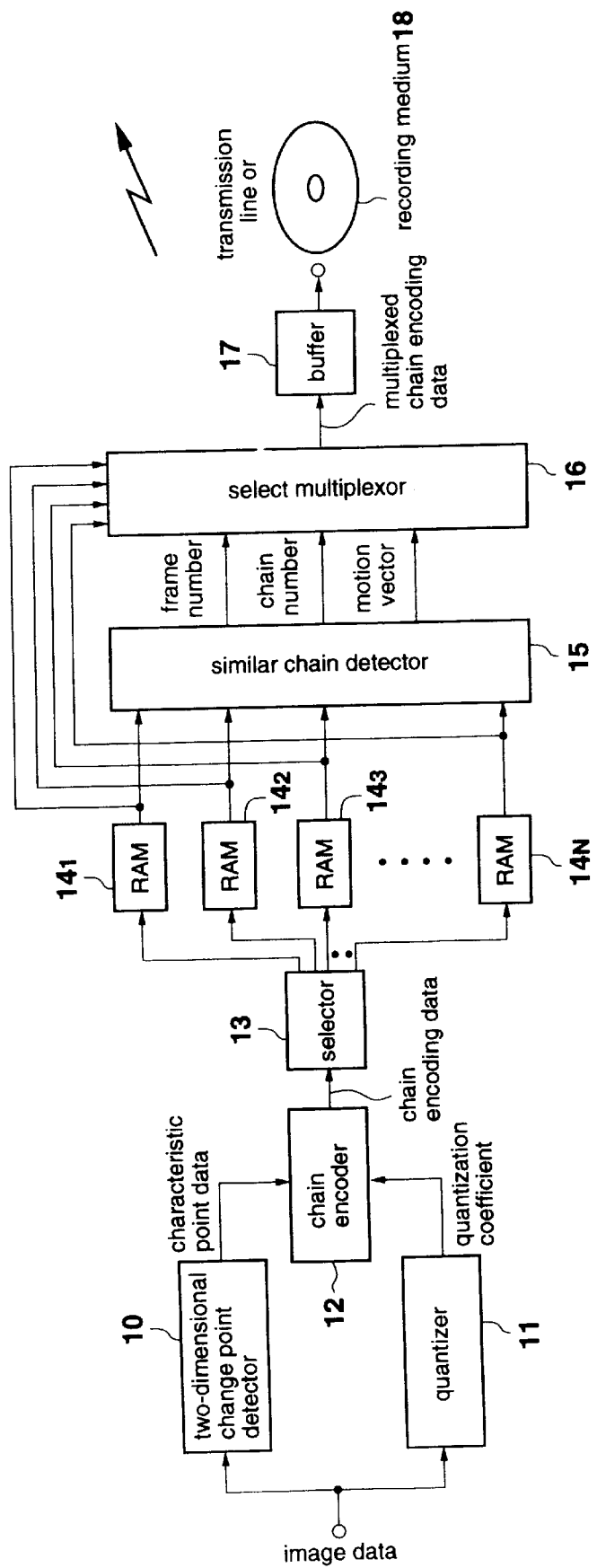
FIG. 2 is a block diagram showing the structure of a first embodiment of the present invention applied to an image encoding device.

FIG. 2 is a block diagram showing the structure of a first embodiment of the present invention applied to an image encoding device.

The image encoding device of FIG. 2 compresses moving images using a structure extraction encoding method. The portions for compression-encoding images using the structure extraction encoding method are the same as for the device in FIG. 1 and a description will therefore first be given regarding the compression encoding of images by the structure extraction-encoding method for the device shown in FIG. 1. Portions of FIG. 1 corresponding to portions of FIG. 2 are given the same numerals.

In the image encoding device of FIG. 1, image data is inputted to a memory cell array area 11 and a two-dimensional change point detector 10. The image data is quantized at the memory cell array area 11 and a quantization coefficient is obtained. This quantization coefficient is then provided to a chain encoder 12. Further, whether or not the inputted image data is a characteristic point is detected at the two-dimensional change point detector 10. When the inputted image data is a characteristic point, characteristic point data of a value of, for example, "1" is outputted to the chain encoder 12, and when the inputted image data is not a characteristic point, characteristic point data of a value of, for example, "0" is outputted to the chain encoder 12.

When the quantization process occurring at the memory cell array area 11 and the characteristic point detection process occurring at the two-dimensional change point detector 10 is completed for one frame of image data, position information (characteristic point position (coordinate)) for one point (pixel) of characteristic point data is chain encoded at the chain encoder 12, multiplexed with the quantization coefficient (quantization coefficient of image data occurring at the pixel detected as the characteristic point) of the characteristic point, with the result then being taken to be the chain encoded data. This chain encoded data is then provided to a buffer (buffer memory) 17 and is then recorded to a recording medium not shown in FIG. 1 or outputted to a transmission line after being temporarily stored. The amount of chain encoded data is smoothed out as a result of storing in the buffer 17. The chain encoded data can therefore be outputted to the recording medium or transmission line at an approximately fixed rate.

When this image encoding device of FIG. 2 compression encodes moving images, inputted image data of, for example, moving picture image signals put into digital form is put into the form of chain encoded data by providing this data to a chain encoder 12 via a two-dimensional change point detector 10 and a quantizer 11, as shown in FIG. 1. The chain encoded data is then provided to the selector 13. The selector 13 then stores the chain encoded data in RAM (Chain Code RAM) $14_1$ to $14_N$ in frame units.

Processing is then carried out in N frame units (for example, 15 frame units, etc.) at a following similar chain detector 15 and select multiplexer 16, with the leading frame (first frame) of the N frame units of chain encoded data being stored at the RAM $14_1$, the second frame of chain encoded data being stored at RAM $14_2$, and the nth frame (where n=1, 2, . . . N) of chain encoded data being stored at RAM $14_n$, etc.

N frame portions of chain encoded data are stored at the RAM $14_1$ to $14_N$. The similar chain detector 15 then reads the chain encoded data stored at the RAM $14_n$ and detects chains present in series of continuous characteristic points existing in the first to Nth frames taking this data as a reference. The similar chain detector 15 detects and links (giving equivalence to items expressing the same object outline) chains having the highest degree of similarity between the frames and detects motion vectors between connected chains.

The similar chain detector 15 then decides which chain of the linked chains will become the so-called foundation (hereinafter referred to as a "foundation chain") and outputs the frame number (in these embodiments, when the frame at which this chain exists is the nth frame, the frame number is taken to be "n") of the frame at which this foundation frame exists, the chain number of the foundation chain (in the following, chains existing at each frame are given unique numbers in order to distinguish these chains from other chain, with these numbers being taken to be the chain numbers in these embodiments), and motion vectors going from the foundation chain to chains existing at other frames linked with this foundation chain are outputted to a select multiplexer 16.

The select multiplexer 16 receives the frame number, chain number and motion vector from the similar chain detector 15 and reads the chain encoded data for the chain corresponding to the chain number of the chains existing at the frame corresponding to the frame number from one of the RAMs $14_1$ to $14_N$. The select multiplexer 16 then multiplexes and outputs as multiplexed chain encoded data this chain encoded data and the motion vector from the similar chain detector 15. This multiplexed chain encoded data is then outputted to a transmission line or provided to and recorded on a recording medium 18 such as magnetic tape, an optical disc or a magneto-optical disc via the buffer 17.

Figure 3:
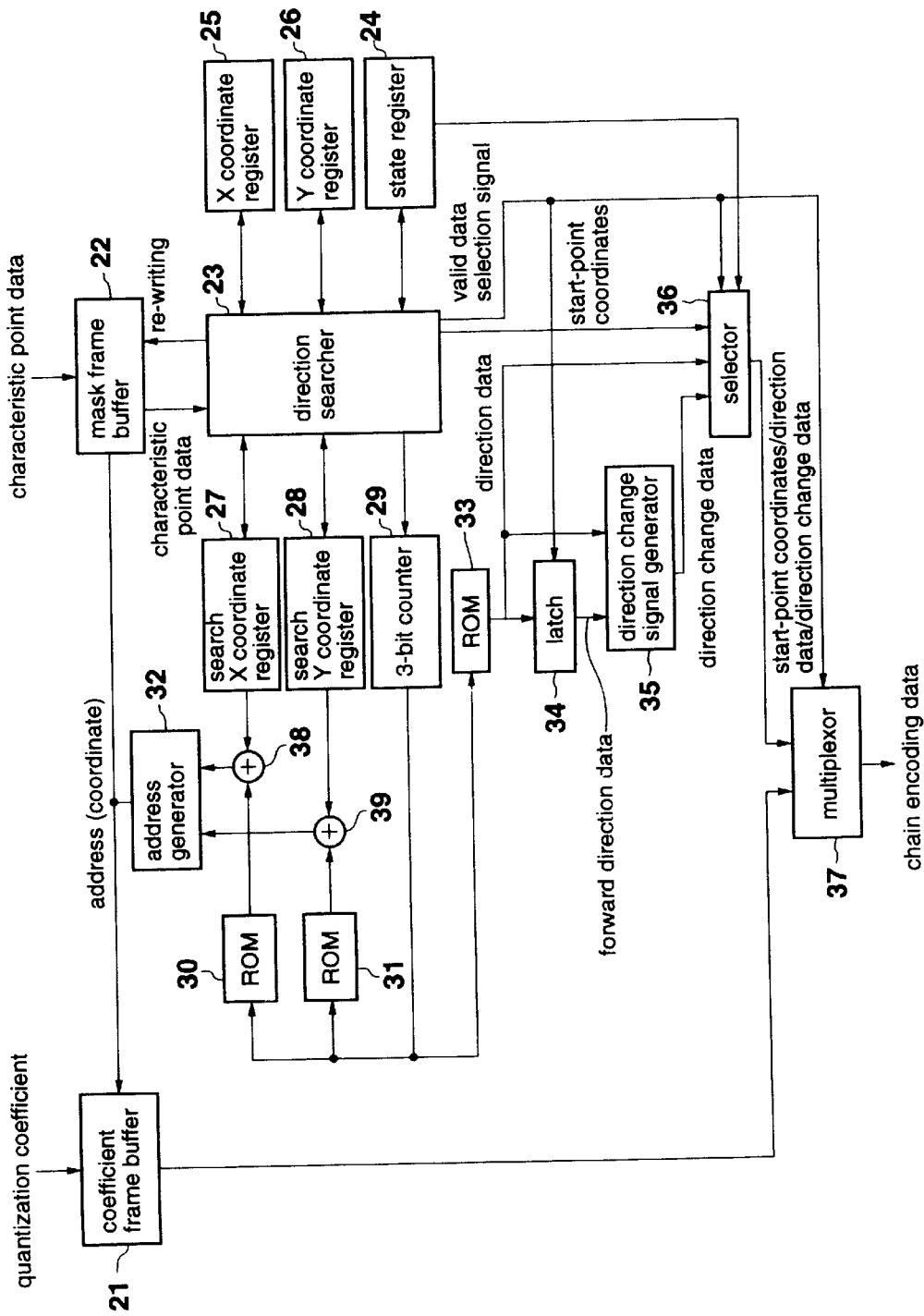
FIG. 3 is a block diagram showing an example of the structure of the chain encoder 12 shown in FIG. 2.
Figure 4:
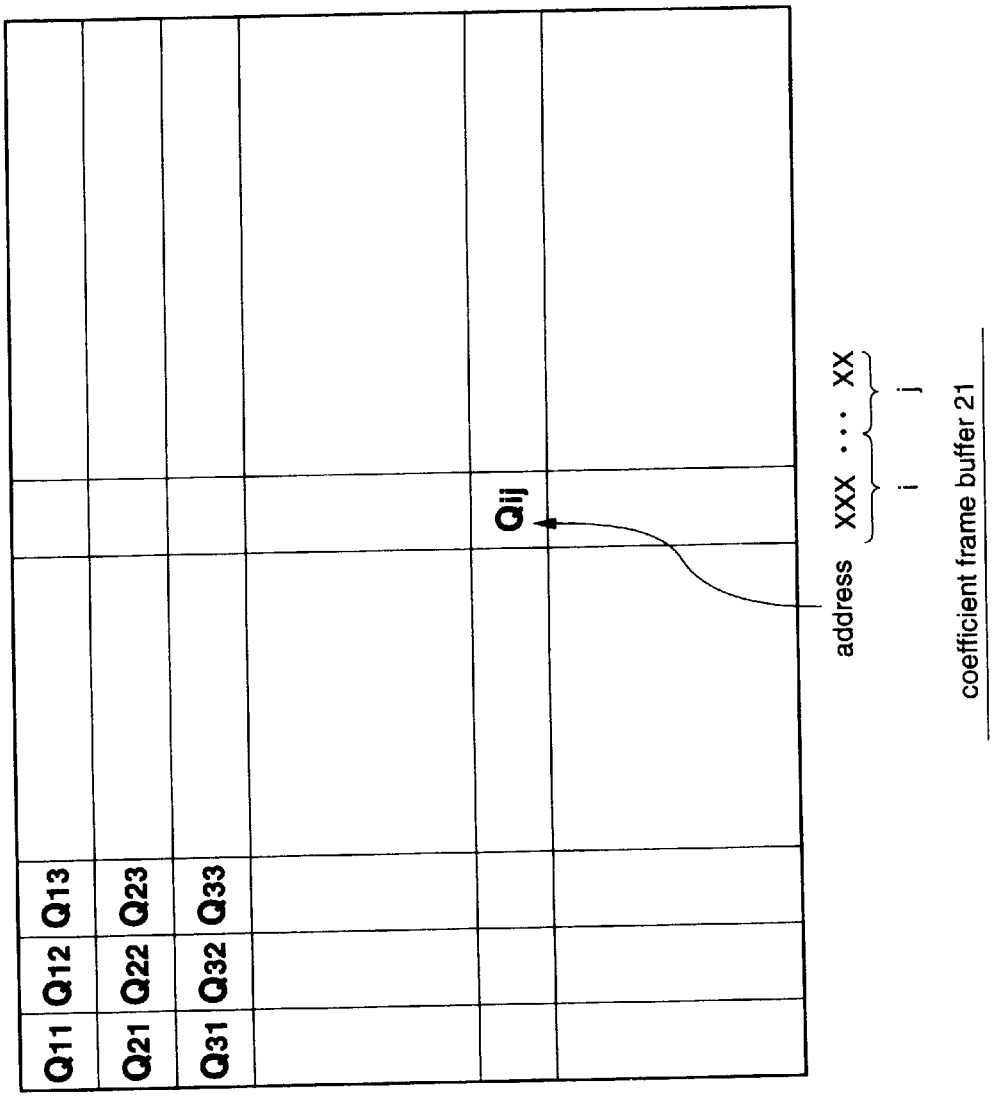
FIG. 4 is a view illustrating the storage contents of the coefficient frame buffer 21 shown in FIG. 3.

FIG. 3 shows an example of the structure of the chain encoder 12 of FIG. 2. A quantization coefficient from a quantizer 11 is provided to and stored in a coefficient frame buffer 21. At the coefficient frame buffer 21, a quantization coefficient Qij for image data occurring at a point (i, j) on the image is stored as an address expressed by i and j for the upper and lower address respectively, as shown, for example, in FIG. 4 (where i and j express the horizontal (x-axis direction) and vertical (y-axis direction) coordinates of a pixel (point) comprising the image, respectively).

Further, characteristic point data from the two-dimensional change point detector 10 are provided to and stored in a mask frame buffer 22. The characteristic point data is stored in the mask frame buffer 22 in the same way as for the coefficient frame buffer 21 described above.

One frame portion of quantization coefficients and characteristic point data are stored at the coefficient frame buffer 21 and the mask frame buffer 22. Processing is then carried out at a direction searcher 23 in accordance with the flowchart shown in FIG. 5.

First, in step S1, a state register 24, X-coordinate register 25 and Y-coordinate register 26 are initialized with "0". Then, in step S2, it is determined whether or not the value stored in the state register 24 is "0". When it is determined in step S2 that the value stored in the state register is "0", step S3 is proceeded to, and a determination is made as to whether or not there are any unprocessed coordinates. Namely, the direction searcher 23, in step S4 to be described later, sets the x and y coordinates of pixels comprising the image for one frame at the X-coordinate register 25 and the Y-coordinate register 26 to be in, for example, so-called line-scan order (in a direction from left to right and from top to bottom). When the image is seen to be in line scan order at the X-coordinate register 25 and the Y-coordinate register 26, respectively, in step S3, a determination is made as to how the x-coordinate or y-coordinate of the pixel positioned last is made (for example, when the image for one frame is comprised of 640×400 pixels, a determination is made as to whether 640 and 400 are installed at the X-coordinate register 25 and the Y-coordinate register 26, respectively).

When it is determined in step S3 that unprocessed coordinates exist, step S4 is proceeded to and the unprocessed coordinates (x and y coordinates) first appearing when viewing the image in line scan order are installed in the X-coordinate register 25 and the Y-coordinate register 26.

The X-coordinate register 25 and the Y-coordinate register 26 can therefore both be installed with "0" directly after the quantization coefficients for one frame portion and the characteristic point data have been stored in the coefficient frame buffer 21 and mask frame buffer 22 respectively.

Here, the pixel of the coordinates corresponding to the values stored in the X-coordinate register 25 and the Y-coordinate register 26 becomes the first processing object at the chain encoder 12, but the pixel which has become this kind of processing object is referred to hereafter as the "noted pixel".

After this, in step S5, characteristic point data corresponding to the noted pixel is read from the mask frame buffer 22 (the characteristic data is read from an address in which the x coordinate and the y coordinate of the noted pixel are taken as upper and lower addresses) and a determination is made as to whether or not this is "1". When it is determined in step S5 that the characteristic point data is not "1" (when it is determined to be "0"), i.e. when the noted pixel is determined not to be the characteristic point, step S2 is returned to. If it is determined in step S5 that the characteristic point data is "1", i.e. that the noted pixel is the characteristic point, step S6 is proceeded to and the values stored in the X-coordinate register 25 and the Y-coordinate register 26 are installed to a search X-coordinate register 27 and a search Y-coordinate register 28. A 3-bit counter 29 is then initialized to "0" in step S6. This 3-bit counter 29 is capable of counting in numbers capable of being expressed in 3-bits, i.e. 0 to 7 ($2^3-1$).

In step S7, a valid data selection signal of value "1" (H level) is outputted at the direction searcher 23. This valid data selection signal is usually "0" (an L level) and is provided to a latch 34, selector 36 and multiplexer 37. After going from "0" to "1", this valid data selection signal returns again to "0" after the time for one clock period has passed.

Further, in step S7, the coordinates stored in the search X-coordinate register 27 and the search Y-coordinate register 28 are read-out and outputted to the selector 36 as start point coordinates. Moreover, "1" is also installed in the state register 24 in step S7, and the characteristic point data of value "1" stored in the mask frame buffer 22 corresponding to the noted pixel is rewritten with "0", with step S2 then being returned to.

Still further, the value stored at the state register 24, the output of a ROM (direction ROM) 33 and the output of a direction change signal generator 35 are also provided at the selector 36 in addition to the valid data selection signal and the start point coordinates from the direction searcher 23. When the selector 36 receives the valid data selection signal of value 1, the selector refers to the value stored in the state register 24. When the value is "0", the selector 36 selects and outputs to the multiplexer 37 the start point coordinate from the direction searcher 23 from the start point coordinate from the direction searcher 23, the output of the ROM 33 and the output of the direction change signal generator 35.

Further, when the multiplexer 37 receives a valid data selection signal of value "1", the quantization coefficient of the noted pixel is read from the coefficient frame buffer 21, multiplexed with the output of the selector 36 and outputted.

Therefore, in step S7, chain encoded data multiplexed from the coordinates (start point coordinates) of the noted pixel which is the characteristic point and the quantization coefficient at this characteristic point at the time when the value stored in the state register 24 is "0" and the valid data selection signal is "1" (when the noted pixel is the characteristic point) is outputted from the chain encoder 12 (multiplexer 37).

When the value stored in the state register 24 is "0" (hereinafter referred to as the case of "state 0"), the valid data selection signal becoming "1" means that a characteristic point forming a chain has been encountered and the start point of this characteristic point has been found. In this case, as described above, the value stored in the state register 24 is taken to be "1" in step 7.

Figure 6:
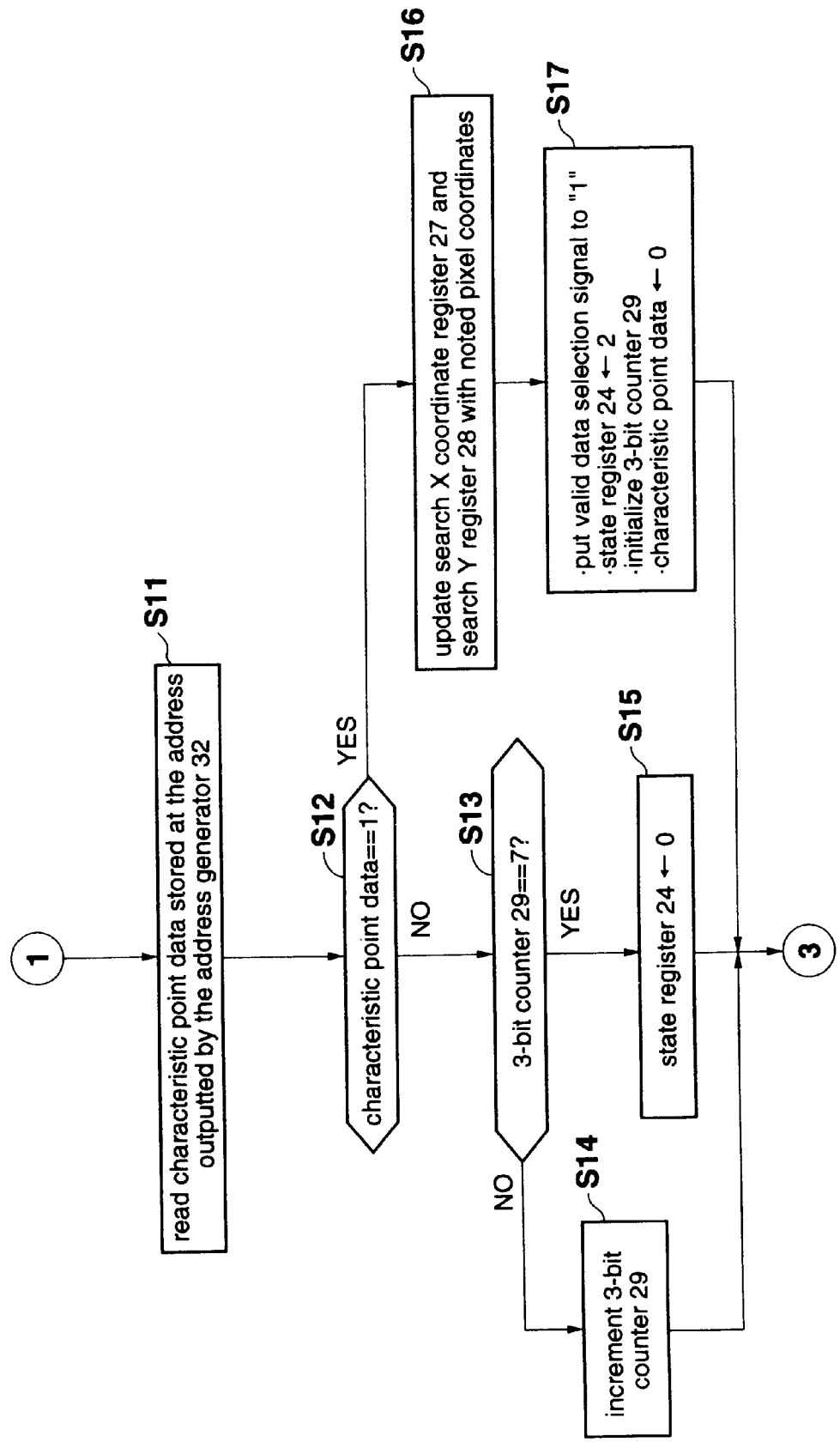
FIG. 6 is a continuation of the flowchart of FIG. 5.

On the other hand, when it is determined in step S2 that the value in the state register 24 is not "0", step S8 is proceeded to and the value stored is determined to be "1". When it is determined in step S8 that the value stored in the state register 24 is "1", step S11 of FIG. 6 is proceeded to and characteristic point data stored at an address generated by the address generator 32 is read from the mask frame buffer 22.

The address generator 32 outputs an address taking values outputted by adders 38 and 39 as an upper address and a lower address. The x-coordinate stored at the search X-coordinate register 27 and the output value of the ROM (search X-ROM) 30 are provided to, added at, and outputted from the adder 38. Further, the y-coordinate stored at the search Y-coordinate register 28 and the output value of the ROM (Search Y-ROM) 31 provided to, added at and outputted from the adder 39 in the same way as for the adder 38.

The ROMs 30 and 31 have space for 3-bit addresses, with the kind of values shown in FIG. 7 being stored at these spaces. The ROMs 30 and 31 take the values outputted at the 3-bit counter 29 as addresses, and output the values stored at these addresses.

Therefore, expressing the outputs of the adders 38 and 39 as "the output of adder 38" and "the output of adder 39", and expressing the values stored at the search X-coordinate register 27 and the search Y-coordinate register 28 as "x" and "y" respectively, when the output value of the 3-bit counter 29 is "0" to "7", the outputs of the adders 38 and 39 become (x−1, y−1), (x−1, y), (x−1, y+1), (x, y−1), (x, y+1), (x+1, y−1), (x+1, y), and (x+1, y+1), respectively.

The address generator 32 therefore outputs the addresses corresponding to the coordinates of the eight pixels P0 to P7 neighboring the pixel (the portion at the center of FIG. 8 shaded with diagonal lines) of the coordinates expressed by the values stored in the search X-coordinate register 27 and the search Y-coordinate register 28 as a result of the output value of the 3-bit counter 29 changing from 0 to 7, as shown in FIG. 8.

Then, in step S11, characteristic point data occurring at one of the pixels (pixels corresponding to the count value outputted by the 3-bit counter 29) P0 to P7 neighboring the pixel of the coordinates expressed by the values stored in the search X-coordinate register 27 and the search Y-coordinate register 28 is read from the mask frame buffer 22. The pixel of the coordinates expressed by the values stored in the search X-coordinate register 27 and the search Y-coordinate register 28 is hereafter referred to as the search center pixel because, in a process to be described later, pixels neighboring this pixel are searched (taken in sequence as noted pixels) taking this pixel of the coordinates expressed by the values stored in the search X-coordinate register 27 and the search Y-coordinate register 28 as an origin.

Figure 5:
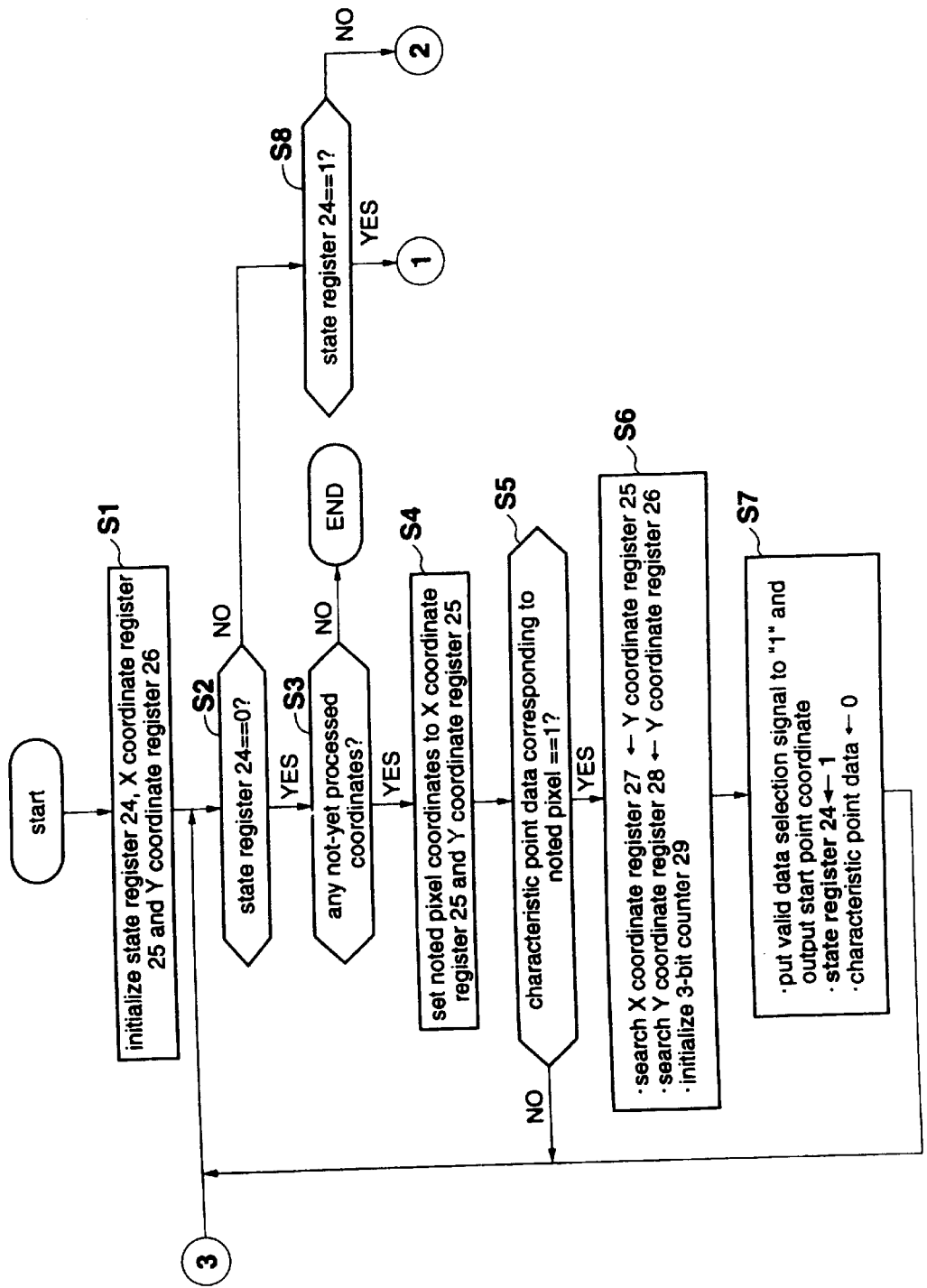
FIG. 5 is a flowchart illustrating the operation of the direction searcher 23 shown in FIG. 3.

When the characteristic point data has been read, a determination is made as to whether or not this value is "1" in step S12. When the characteristic point data is determined not to be "1" in step S12, i.e. when the noted pixel is not a characteristic point, a determination is made in step S13 as to whether or not the count value (output value) of the 3-bit counter 29 is "7". If it is determined in step S13 that the count value of the 3-bit counter 29 is not "7", i.e. if processing has not been carried out for all of the pixels neighboring the search center pixel, step S14 is proceeded to, the count value of the 3-bit counter 29 is incremented by "1" and step S2 of FIG. 5 is returned to. In this case, the value stored at the state register 24 remains at 1, so the process from step S11 onwards is carried out again via step S2 and step S8.

When it is determined in step S13 that the count value of the 3-bit counter 29 is "7", i.e. that the processing for all of the pixels neighboring the search center pixel has been carried out, if it is determined as a result that there are no characteristic points amongst the pixels neighboring the search center pixel, step S15 is proceeded to, "0" is installed in the state register 24 and step S2 is returned to.

On the other hand, when it is determined in step S12 that the characteristic data is "1", i.e. when the noted pixel is a characteristic point, step S16 is proceeded to and this noted pixel is taken as the new search center pixel. Namely, the values stored at the search X-coordinate register 27 and the search Y-coordinate register 28 are updated with the x and y coordinates of the noted pixel, respectively. Step S17 is then proceeded to, the valid data selection signal is put to "1" and the value stored in the state register 24 is put to "2". The 3-bit counter 29 is also initialized to "0" in step S17, the characteristic point data stored in the mask frame buffer 22 corresponding to the noted pixel for which the value is "1" is rewritten with "0", and step S2 is returned to.

The selector 36 then receives a valid data selection signal of value "1", and refers to the value stored in the state register 24. When this is "1", the selector 36 selects and outputs to the multiplexer 37 the output of the ROM 33 from the start point coordinates from the direction searcher 23, the output of the ROM 33 and the output of the direction change signal generator 35.

Figures 9, 10:
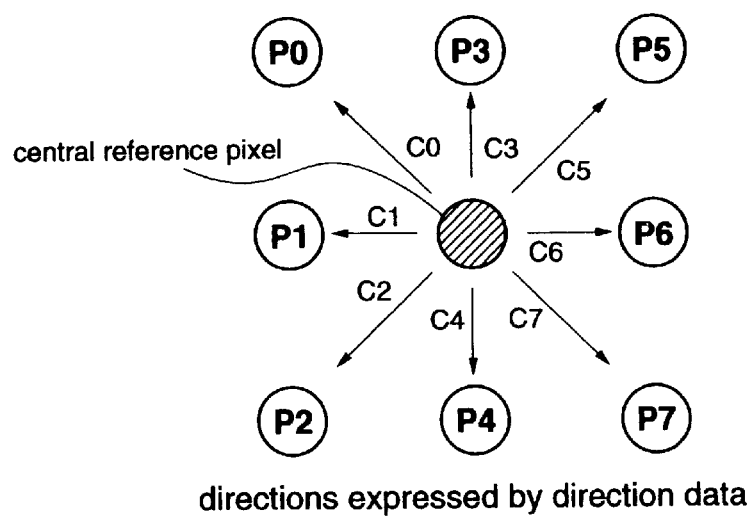
FIG. 9 is a view showing the storage contents of the ROM 33 shown in FIG. 3.
FIG. 10 is a view showing the direction indicated by the direction data outputted from the ROM 33 shown in FIG. 3.

The ROM 33 also has space for a three-bit address in the same way as the ROMs 30 and 31, with the kinds of values shown in FIG. 9 being stored in this space. The ROM 33 therefore takes the value of the output of the 3-bit counter 29 as an address in the same way as the ROMs 30 and 31, and outputs the value (this stored value is hereafter referred to as direction data) stored at this address.

The direction data C0 to C7 is therefore outputted respectively from the ROM 33 when the output value of the 3-bit counter 29 is 0 to 7. This direction data C0 to C7 expresses the eight directions from the search center pixel of the neighboring pixels, namely, for example, the directions of upper left, left, lower left, up, down, upper right, right and lower right, as shown in FIG. 10. The direction data C0 to C7 therefore expresses the directions at which the pixels P0 to P7 neighboring the search center pixel are positioned with respect to this search center pixel.

As a result, direction data expressing the direction of the noted pixel with respect to the search center pixel is outputted from the ROM 33. The direction data is also provided to the latch 34 and the direction change signal generator 35, as well as the selector 36.

In the case in step S17 where the value stored in the state register 24 is "1", chain encoded data multiplexed from direction data expressing the positioning of noted pixels neighboring the search center pixel (pixel positioned at the start point coordinates) which are characteristic points and the quantization coefficients occurring at these noted pixels is outputted from the chain encoder 12 (multiplexer 37) when the valid data selection signal is "1" (i.e. when the noted pixel is a characteristic pixel).

When the value stored in the state register 24 is "1" (hereinafter referred to as "in the case of state "1""), a valid data selection signal of "1" means that a characteristic point forming a chain has been encountered and an item neighboring this start point has been found. In this case, as described above the value stored in the state register 24 is put to "2" in step S17.

Figure 11:
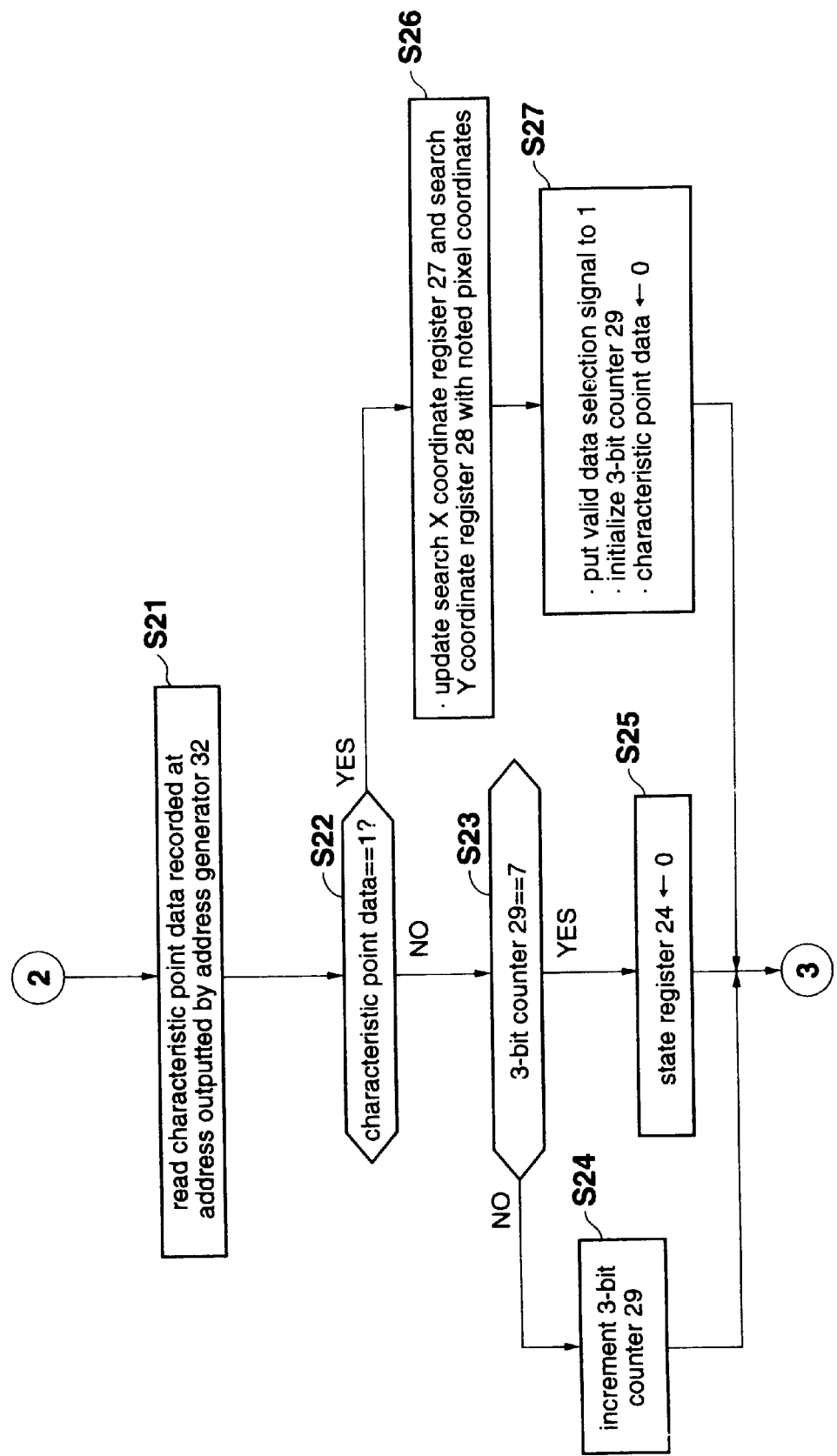
FIG. 11 is a continuation of the flowchart of FIG. 5.

Returning to FIG. 5, when it is determined in step S8 that the value stored in the state register 24 is not "1", step S21 of FIG. 11 is proceeded to, where one of the integers 0 to 2 are stored in the state register 24. Therefore, when the value stored in the state register 24 is determined not to be "0" in step S2 of FIG. 5 and determined not to be "1" in step S8 of FIG. 5, this value is then "2".

In step S21 of FIG. 11, characteristic point data occurring at a pixel (the pixel corresponding to the count value outputted from the 3-bit counter 29) neighboring the search center pixel is read out from the mask frame buffer 22, in the same way as the case for step S11 of FIG. 6. Step S22 is then proceeded to and a determination is made as to whether or not this value is "1". In step S22, when the characteristic point data is determined not to be "1", i.e. when the noted pixel is not a characteristic point, step S23 is proceeded to and a determination is made as to whether or not the count value of the 3-bit counter 29 is "7". When a determination is made in step S23 that the count value of the 3-bit counter 29 is not "7", i.e. when all of the pixels neighboring the search center pixel have not been processed, step S24 is proceeded to, the count value of the 3-bit counter 29 is incremented by "1" and step S2 of FIG. 5 is returned to. In this case, the process from step S21 is then carried out again via step S2 and step S8 because the value stored at the state register 24 remains at "2".

Further, when it is determined in step S23 that the count value of the 3-bit counter 29 is "7", i.e. when it is determined that all of the pixels neighboring the search center pixel have been processed, in the case that there are no characteristic points at the pixels neighboring the search center pixel, step S25 is proceeded to, the state register is installed with "0" and step S2 is returned to.

On the other hand, when it is determined in step S22 that the characteristic point data is "1", i.e. when the noted pixel is a characteristic point, step S25 is proceeded to and the noted pixel is taken to be a new search center pixel by updating the values stored at the search X-coordinate register 27 and the search Y-coordinate register 28 with the x and y coordinates of the noted pixel, respectively. Step S27 is then proceeded to and the valid data selection signal is put to "1". In step S27, the three-bit counter 29 is initialized to "0" and the characteristic point data stored at the mask frame buffer 22 corresponding to the noted pixel of value "1" is rewritten with "0" and step S2 is returned to. In this case, the process from step 21 onwards is again carried out via step S2 and step S8 because the value stored at the state register 24 remains at "2". However, in this case, in step S26, processing is carried out with pixels neighboring the new search center pixel taken as the noted pixels because a noted pixel taken as a processing target the previous time is taken as the new search center pixel.

The selector 36 then receives a valid data selection signal of value "1" and refers to the storage value of the state register 24. When this is "2", the selector 36 selects and outputs to the multiplexer 35 the output of the direction change signal generator 35 from the start point coordinates from the direction searcher 23, the output of the ROM 33 and the output of the direction change signal generator 35.

The direction data outputted from the ROM 33 and the output of the latch 34 are provided to the direction change signal generator 35. Direction change data to be described later is then generated at the direction change signal generator 35 based on these inputs.

Figure 12:
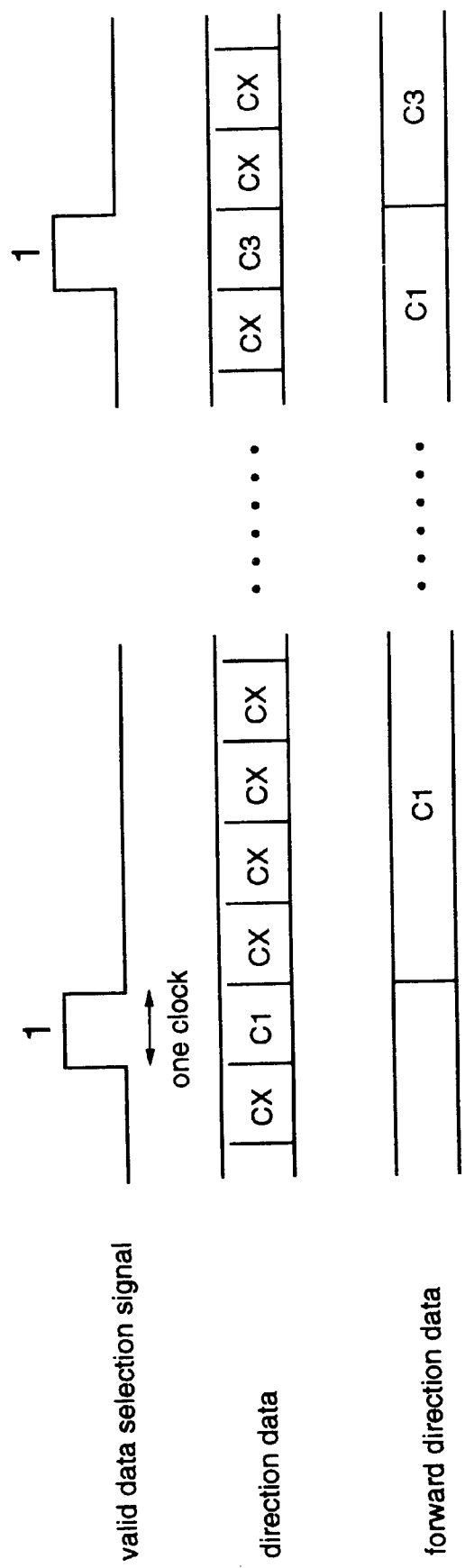
FIG. 12 is a timing diagram showing the timing of the outputting of the valid data selection signal from the direction searcher 23, the direction data from the ROM 33 and the previous direction data from the latch 34.

As shown in the timing diagram of FIG. 12, when the valid data selection signal becomes "1", the direction data outputted from the ROM 33 is latched at the latch 34. This direction data is then continuously outputted to the direction change signal generator 35 after a delay of one clock period, until the next time the valid data selection signal becomes "1". Namely, when a characteristic point is found (when the valid data selection signal becomes "1"), direction data expressing the direction from the search center pixel to this characteristic point is outputted continuously from the latch 34 until the next characteristic point is found. FIG. 12 is a timing diagram showing the timing of the outputting of the valid data selection signal from the direction searcher 23, the direction data from the ROM 33 and the previous direction data from the latch 34. Direction data outputted by the latch 34 is hereafter referred to as "previous direction data".

When the valid data selection signal becomes "1", i.e. when a characteristic point is found, the direction change signal generator 35 compares the direction shown by the previous direction data being outputted by the latch 34 and the direction shown by the direction data outputted from the ROM 33. The direction change signal generator 35 then outputs direction change data expressing changes in the direction shown by the direction data with respect to the direction shown by the previous direction data in response to this comparison result.

For example, as shown in FIG. 13A, the direction change signal generator 35 outputs D0 as the direction change data when the direction shown by the previous direction data and the direction shown by the direction data are the same. Further, as shown by FIG. 13B to FIG. 13D, the direction change signal generator 35 outputs D1 to D3 as the direction change data when the direction shown by the direction data differs from the direction shown by the previous direction data by 45, 90 and 135 degrees in the anti-clockwise direction, respectively. Moreover, as shown by FIG. 13E to FIG. 13G, the direction change signal generator 35 outputs D4 to D6 as the direction change data when the direction shown by the direction data differs from the direction shown by the previous direction data by 45, 90 and 135 degrees in the clockwise direction.

With regards to the relationship between the direction shown by the direction data and the direction shown by the previous direction data, in addition to the above cases, there is also the case where, as shown by FIG. 13H, both directions differ by 180 degrees. However, the case where the direction shown by the direction data and the direction shown by the previous direction data differ by 180 degrees does not occur because at the chain encoder 12 of FIG. 3, as described above, when a characteristic point has become a processing target once, the characteristic point data corresponding to this characteristic point is rewritten with "0". Because of this, code is not provided (code is not necessary) in the case where the direction shown by the direction data and the direction shown by previous direction data differ by 180 degrees, as shown in FIG. 13H.

In reality, the direction change signal generator 35 stores a corresponding table for the kind of previous direction data, direction data and direction change data shown, for example, in FIG. 14 and FIG. 15. Lines coinciding with the combinations of the previous direction data outputted from the latch 34 and the direction data outputted from the ROM 33 are then searched from the corresponding table and the direction change data listed in the right column of this line is then outputted. In reality, the kind of code words shown in, for example, FIG. 16 are allotted to the direction change data D0 to D6, with this code actually being outputted.

From the above, when the value stored in the state register 24 is "2", chain encoded data multiplexed from direction change data expressing the difference between the direction (the direction from the characteristic point found the time before last to the characteristic point found the previous time) with regards to the characteristic point found the previous time and the direction (the direction from the characteristic point found the previous time to the characteristic point found this time) with regards to the characteristic point found this time and the quantization coefficient occurring at the characteristic point (noted pixel) found this time is outputted from the chain encoder 12 (multiplexer 37) when the valid data selection signal becomes "1" (when the noted pixel is a characteristic point).

When the value stored in the state register 24 is 2 (hereinafter referred to as "the case of a "2" state), the valid data selection signal becoming "1" means that a characteristic point forming a chain comprised of three or more linked characteristic points has been encountered, and this starting point and items (third characteristic point onwards) other than items neighboring this starting point have been encountered. In this case, the value stored in the state register 24 remains at "2".

Returning to FIG. 5, when it is determined in step S3 that there are no unprocessed coordinates, the processing is complete. The storing of the quantization coefficients and the characteristic point data for the next frame to the coefficient frame buffer 21 and the mask frame buffer 22 is then waited-on, and the process is carried out again from step S1.

Figure 17:
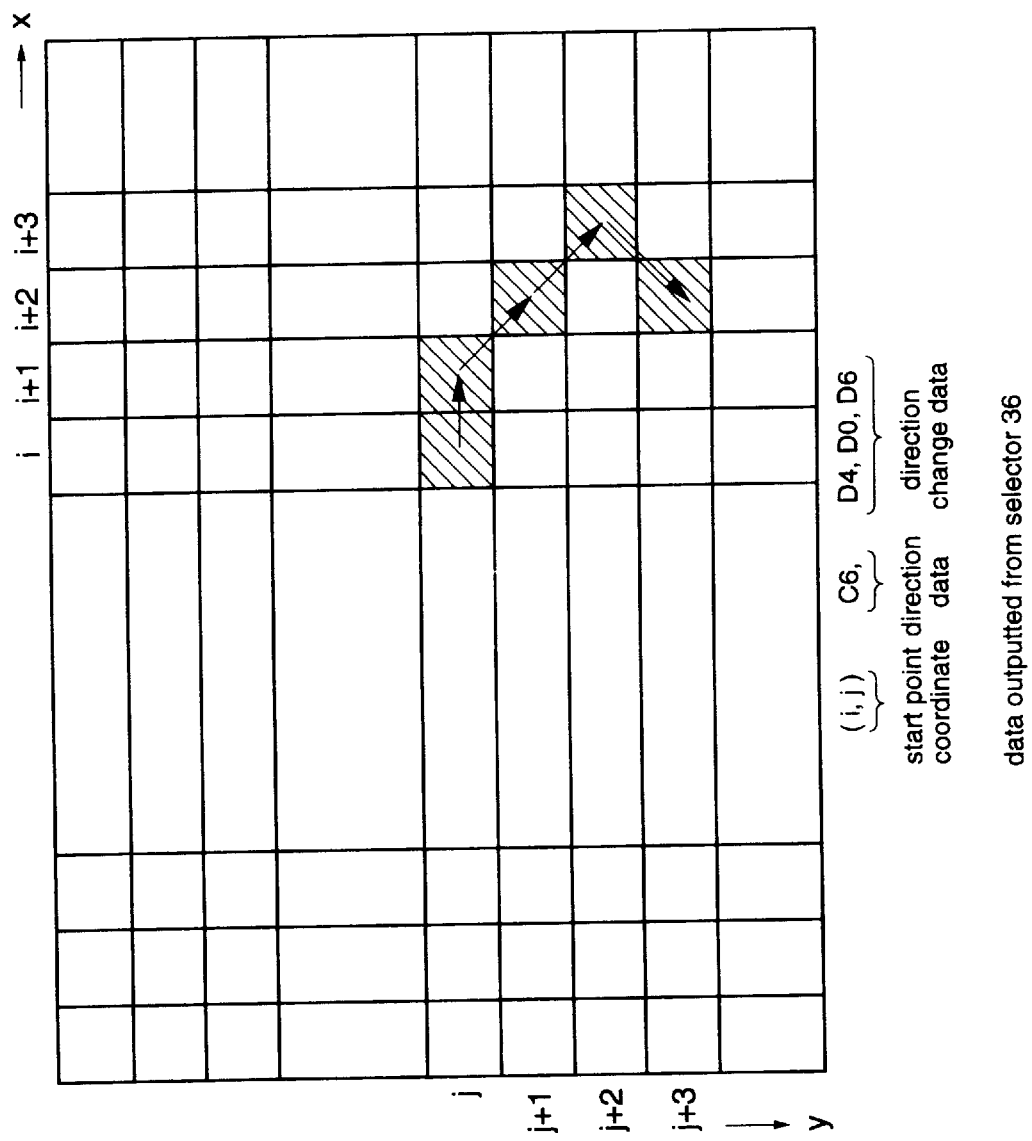
FIG. 17 is a view illustrating data outputted from the selector 36 shown in FIG. 3.

Next, outputting from the selector 36 is described with reference to FIG. 17. When, as shown in FIG. 17, a chain comprising five linked characteristic points (the portion in FIG. 17 shaded with inclined lines) exists, the characteristic point positioned at the coordinate (i, j) is the first to be seen when viewed in line scan order. The state when the characteristic point is the first found is "0". The coordinates (i, j) of this characteristic point outputted by the direction searcher 23 are therefore outputted from the selector 36 as the start point coordinates. After this, the state is taken to be state 1, and the characteristic point (i+1, j) adjacent to the characteristic point positioned at coordinates (i, j) (hereinafter referred to as the characteristic point (i, j)) is detected. This characteristic point (i+1, j) is positioned in the right direction from the characteristic point (i, j) found the previous time. Further, the state is a state 1 and direction data C6 (FIG. 10) showing the right direction outputted from ROM 33 is therefore outputted from the selector 36. Then, in this case, the state is put to a state 2.

Next, the characteristic point (i+2, j+1) neighboring the characteristic point (i+1, j) is detected. In this case, direction change data expressing the difference between the direction with regards to the characteristic point found the previous time and the direction with regards to the characteristic point found this time is outputted from the selector 36 because the state is a state 2. Namely, the direction with regards to the characteristic point (i+1, j) found the previous time is a right direction expressed by the direction data C6 as described previously, and the direction with regards to the characteristic point (i+2, j+1) found this time is expressed by the direction data C7 because this characteristic point (i+2, j+1) is positioned in the lower right direction from the characteristic point (i+1, j). The direction change data D4 listed in the corresponding table shown in FIG. 15 at the right-hand column of the line having C6 and C7 as the previous direction data and direction data respectively, is therefore outputted from the selector 36.

The characteristic point (i+3, j+2) is adjacent to the characteristic point (i+2, j+1) and this characteristic point (i+3, j+2) is therefore detected. The direction of positioning of this characteristic point (i+3, j+2) is in the same lower-right direction as the direction displayed by the direction data C7 for the characteristic point (i+2, j+1) found the previous time. The direction for the characteristic point (i+3, j+2) found this time is therefore expressed by the direction data C7. Further, the state is a still a state 2. Therefore, in this case, the direction change data D0 listed in the corresponding table shown in FIG. 14 at the right column of the line having the previous direction data and the direction data both as C7 is outputted from the selector 36.

The same processing is then carried out for a characteristic point (i+2, j+3) adjacent to the characteristic point (i+3, j+2) as was carried out for the characteristic point (i+3, j+2), with the direction change data D6 then being outputted from the selector 36 as a result.

When a chain exists on the image, the coordinates of the characteristic point at the start of this chain and the quantization coefficient of this characteristic point are first multiplexed and then outputted from a chain encoder 12. After this, direction data regarding the characteristic point neighboring this start point and the quantization coefficient occurring at this characteristic point are multiplexed and then outputted. When a characteristic point (excluding the start point) adjacent to this characteristic point exists, i.e. when characteristic points from the third onwards exist, direction change data regarding these characteristic points and quantization coefficients occurring at these characteristic points are multiplexed and outputted in order.

Chain encoded data outputted from the chain encoder 12 is provided to RAMs $14_1$ to $14_N$ via the selector 13 (FIG. 2) so that the nth frame of chain encoded data is stored at the RAM $14_N$. When chain encoded data is stored at all of the RAMs $14_1$ to $14_N$, i.e. when N frame portions of chain encoded data are stored, this data is read by the similar chain detector 15 and the process described in detail below is carried out.

Figure 18:
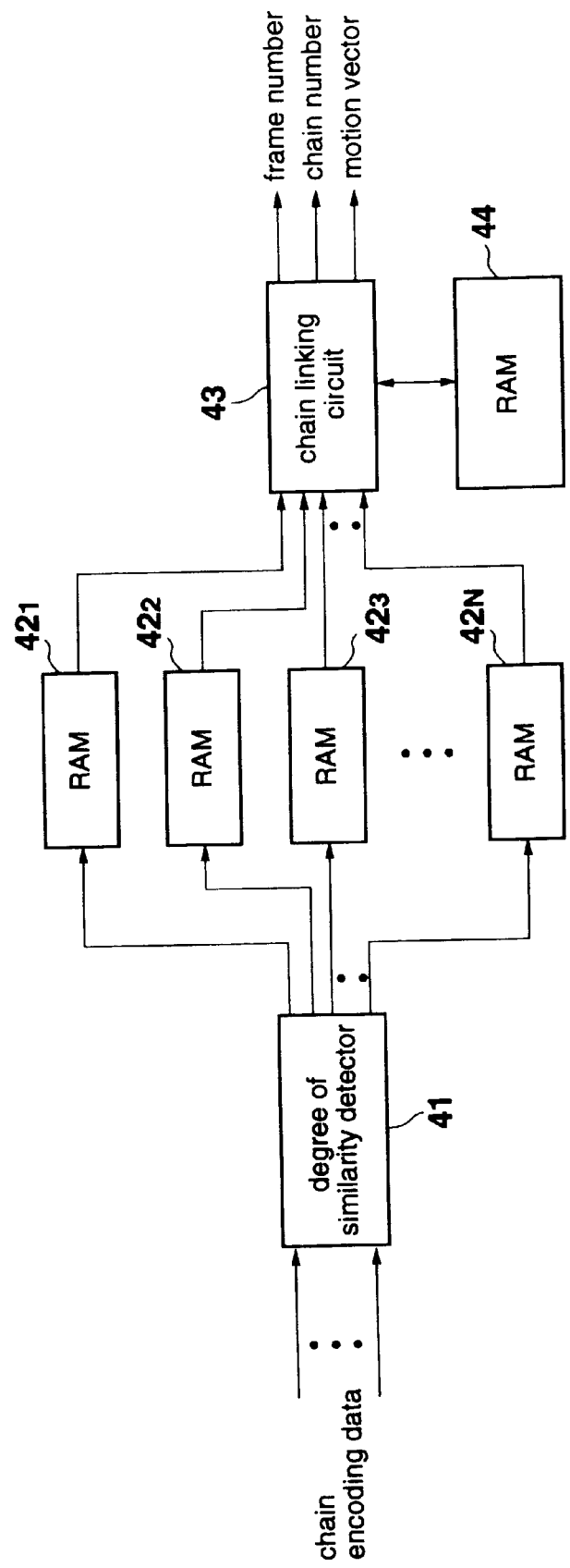
FIG. 18 is a block diagram showing an example of the structure of the similar chain detector 15 shown in FIG. 2.

FIG. 18 shows an example structure of the similar chain detector 15 of FIG. 2. When a degree of similarity detector 41 stores chain encoded data in all of the RAMs $14_1$ to $14_N$, i.e. when N frame portions of chain encoded data are stored, the chain encoded data for each frame is read out the RAMs $14_1$ to $14_N$, respectively, and information relating to chains of a high degree of similarity between neighboring frames is provided to RAMs $42_1$ to $42_N$ and stored, with information relating to the nth frame being stored in RAM $42_N$.

Information relating to chains for the first to nth frames is stored at RAMs $42_1$ to $42_N$. A chain linking circuit 43 reads this information and then detects chain motion vectors while linking similar chains existing in neighboring frames based on this information. This chain linking circuit 43 stores information relating to linked chains in a RAM (connection RAM) 44 in order, and outputs the chain number of a prescribed chain, the frame number of the frame having this chain and the detected motion vector of the detected chain when processing for one chain is complete.

Figure 19:
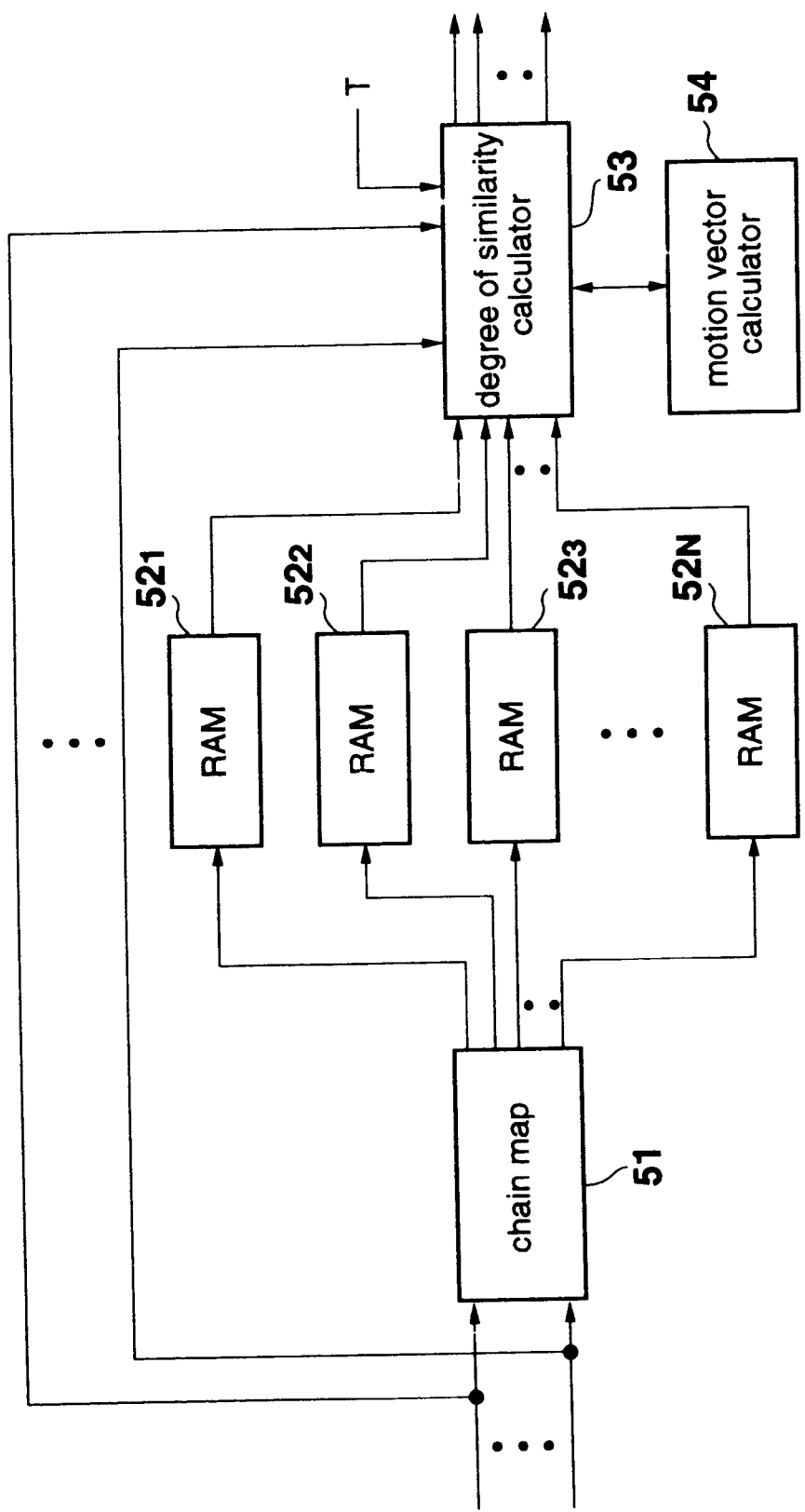
FIG. 19 is a block diagram showing an example of the structure of a degree of similarity detector 41 shown in FIG. 18.

FIG. 19 shows an example structure of the degree of similarity detector 41 of FIG. 18. The chain encoded data for each frame stored in the RAM $14_1$ to $14_N$ is provided to a chain mapping circuit 51 and a degree of similarity calculator 53. The chain mapping circuit 51 receives the chain encoded data for each frame and refers to the start point coordinates, direction data and direction change data (hereafter collectively referred to as chain direction components). The chains existing in each frame are then each given unique chain numbers and are put on the RAM (Map RAM) $52_1$ to $52_N$.

Figure 20:
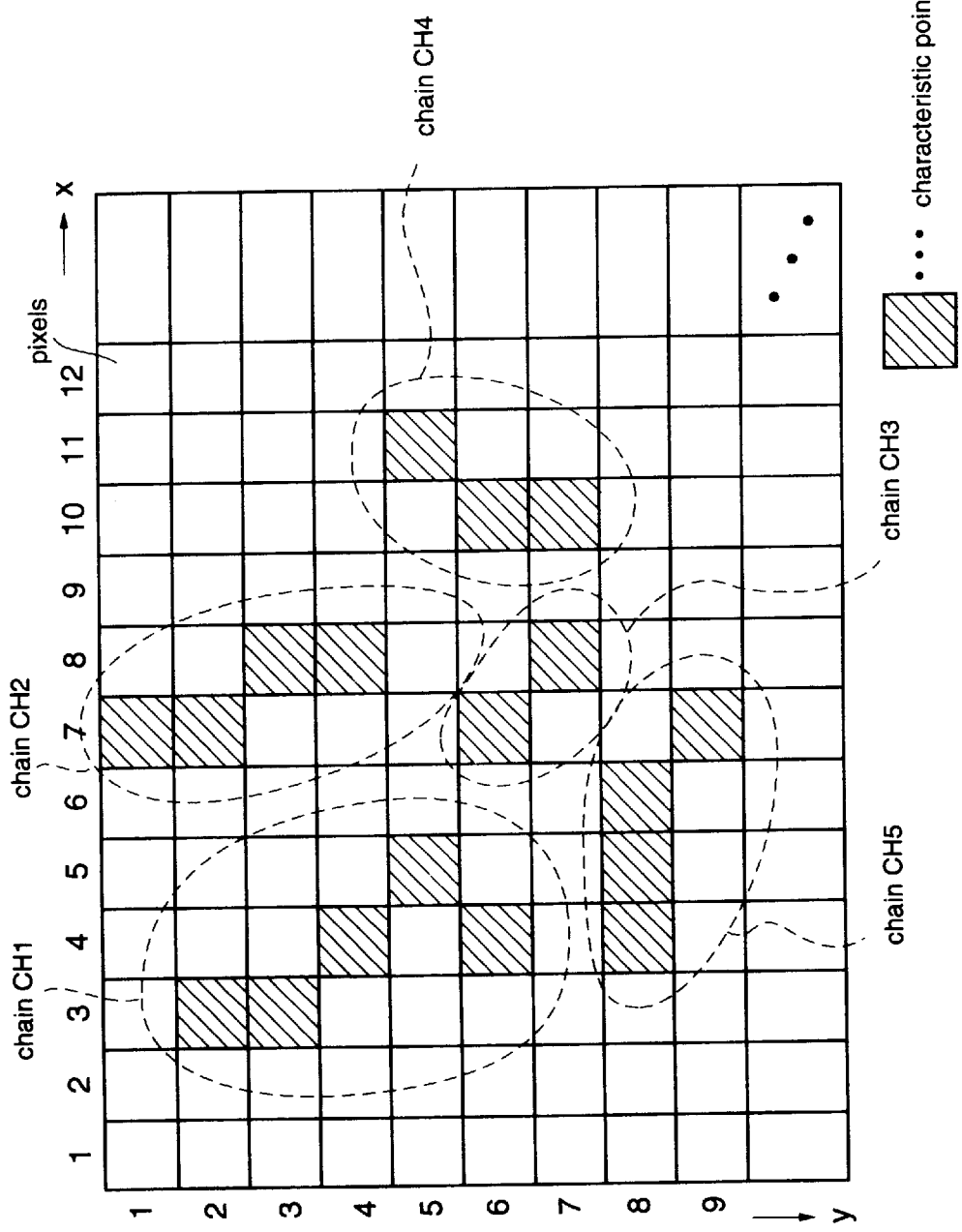
FIG. 20 is a view showing an example of a chain existing on an image.

When, for example, as shown in FIG. 20, chains CH1 to CH5 exists at n frames, the chain mapping circuit 51 gives unique chain numbers to the chains CH1 to CH5, respectively. Then, as shown in FIG. 21, each of the chain numbers given are stored at the addresses of the RAM $52_n$ so as to correspond to the positions where the chains CH1 to CH5 exist. In the embodiment in FIG. 21, the chain numbers 0, 10, 14, 43 and 123 are given to the chains CH1 to CH5. The chain mapping circuit 51 then stores a value (−1 in the embodiment of FIG. 21) at the address of the RAM $52_n$ to be used as a chain number corresponding to positions where chains do not exist.

The chain mapping circuit 51 develops the chain where the nth frame exists on the RAM $52_n$ as a chain number-dependent bit-map.

It is preferable for the chain number to be unique with regards to chains existing at each of the frames. However, the chain numbers may also be unique with regards to all of the chains existing at the N frames present as processing units for the similar chain detector 15.

Figure 22:
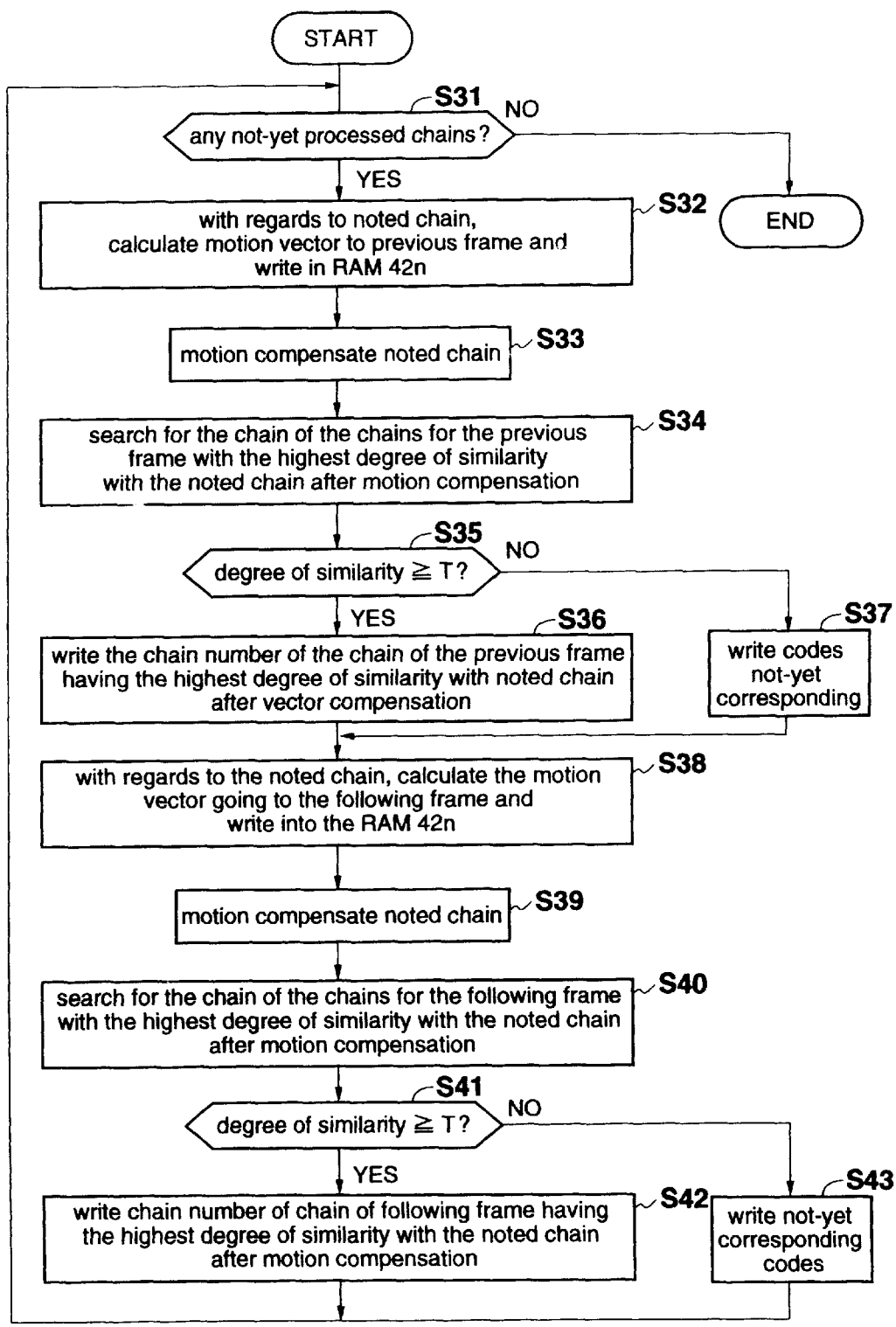
FIG. 22 is a flowchart illustrating the operation of the degree of similarity calculator 53 shown in FIG. 19.

When chains for the first to Nth frames are put on the RAM $52_1$ to $52_N$, the degree of similarity calculator 53 carries out processing with regards to the chains for each of the frames stored at the RAM $52_1$ to $52_N$, respectively, in accordance with the flowchart shown in FIG. 22.

First, in step S31, a determination is made as to whether or not an unprocessed chain (a noted chain not having been taken as a noted chain, to be described later) exists in the frame currently being taken as the processing target (hereinafter referred to as the "noted frame"). When a determination is made in step S31 that an unprocessed chain does exist, this chain (when a plurality of unprocessed chains exist, this chain is one chain from the plurality) is taken as the processing target (hereinafter referred to as the "noted chain"), and the process from step S32 onwards is carried out. Here, unless stated otherwise, a process taking the nth frame as the noted frame is adopted.

In step S32, a motion vector going to a frame (hereinafter referred to as the "previous frame", in this case, the n−1th frame) one frame before the frame where the noted chain exists is detected (calculated) at a motion vector calculator 54. In step S32, the degree of similarity calculator 53 recognizes the noted chain based on the nth frame chain encoded data provided from the RAM $14_n$, reads the chain bitmap of the n−1th frame present at the previous frame from the RAM $52_{n-1}$ and provides this data to the motion vector calculator 54. In this way, the motion vector of the noted chain going to the previous frame is detected at the motion vector calculator 54.

When the motion vector going to the previous frame for this noted frame is calculated, this motion vector corresponds to the chain number of the noted chain and is outputted to and stored in the RAM $42_n$ (FIG. 18). Step S33 is then proceeded to and the noted vector is motion-compensated in accordance with the motion vector calculated in step S32. Step S34 is then proceeded to, and the chain of the chains existing in the previous chain having the highest degree of similarity with the noted chain is detected using the motion-compensated noted chain.

The degree of similarity of the noted chain with a certain chain CH existing in the previous frame is calculated at the degree of similarity calculator 53 in step S34 in the following way. The degree of similarity calculator 53 detects the chain within pixels (characteristic points) forming the noted chain after motion compensation with refering RAM $52_{n-1}$ for which the distance to the chain CH within the chain existing at the n−1th frame of the previous frame is the shortest. This count value is then subtracted from the number of pixels forming the noted chain, with the subtraction result then being taken as the degree of similarity of the chain CH with respect to the noted chain.

The chain positioned nearest to the pixels forming the noted chain after motion compensation is then selected in step S34 from the chains stored at the RAM $52_{n-1}$ and the chain for which the number of times of selection is the greatest is then detected as the chain having the highest degree of similarity with respect to the noted chain. The degree of similarity at this time is then obtained by subtracting the number of selections from the number of pixels forming the noted chain.

When the chain (hereinafter referred to as a "high degree of similarity chain") with the highest degree of similarity with the noted chain existing in the previous frame is detected, step S35 is proceeded to and a determination is made as to whether or not this degree of similarity is greater than or equal to a threshold value. If it is determined in step S35 that the degree of similarity of the high degree of similarity chain for the noted chain is equal to or greater than the prescribed threshold value T, step S36 is proceeded to and the chain number of this high degree of similarity chain is made to correspond to the chain number of the noted chain and outputted to and stored in the RAM $42_n$. Step S38 is then proceeded to. The chain number of the noted chain was made to correspond to the motion vector (motion vector of the noted chain, going to the previous frame) in step S32 and is therefore already stored in the RAM $42_n$. Because of this, the chain numbers of the high priority chains correspond to these and are therefore stored at the RAM $42_n$ in step S36.

On the other hand, in step S35, when the degree of similarity of high degree of similarity chain for the noted chain is not greater than or equal to the prescribed threshold value T, step S36 is proceeded to. It is then taken that chains capable of being linked with the noted chain do not exist at the previous frame (chains exhibiting the same outline (object) as the noted chain do not exist). A non-compatible code (in this embodiment this is, for example, −1 as shown in FIG. 24, to be described later) indicating this point is then made to correspond to the chain number of the noted chain. This code is stored in the RAM $42_n$ and step S38 is proceeded to.

In step S38, with regards to this noted chain, a motion vector to a frame (hereinafter referred to as the following frame, in this case being the nth+1 frame) one frame after the frame where this noted chain exists is detected (calculated) at the motion vector calculator 54 in the same way as in step S32 above. Then, in step S38, the motion vector of the noted chain going to the following frame is made to correspond to the chain number of the noted chain and is outputted to and stored in the RAM $42_n$. After this, step S39 is proceeded to and the noted chain is motion compensated in accordance with the motion vector calculated in step S38. Then, in step S40, the chain of the chains existing in the following frame having the highest degree of similarity with the noted chain is detected using the motion compensated noted chain in the same way as in step S34.

After this, step S41 is proceeded to and a determination is made as to whether or not the degree of similarity of the high degree of similarity chain for the noted chain is equal to or greater than the prescribed threshold value T. When a determination is then made in step S41 that this degree of similarity is equal to or greater than the prescribed threshold value T, step S42 is proceeded to. The chain number of this high degree of similarity chain is then made to correspond to the chain number of the noted chain and is outputted to and stored in the RAM $42_n$. Further, when it is determined in step S41 that the degree of similarity of the high degree of similarity chain for the noted chain is not greater than or equal to the prescribed threshold value T, step S43 is proceeded to. It is then taken that chains linkable with the noted chain do not exist at the following frame and a non-compatible code indicating this point is made to be compatible with the chain number of the noted chain and stored in the RAM $42_n$ in the same way as in step S37.

Step S31 is returned to after the processes in both step S42 and S43, with the process from step S31 to S43 being repeatedly ran through until it is determined in step S31 that there are no unprocessed chains. When it is determined in step S31 that there are no unprocessed chains, the process is complete. After this, the nth frame currently taken as the noted frame is replaced with the n+1th frame as the new noted frame and the process shown in FIG. 22 is repeated. In other words, the above process is carried out for the N frame portion of chain encoded data stored at the RAM $14_1$ to $14_N$.

Figure 23:
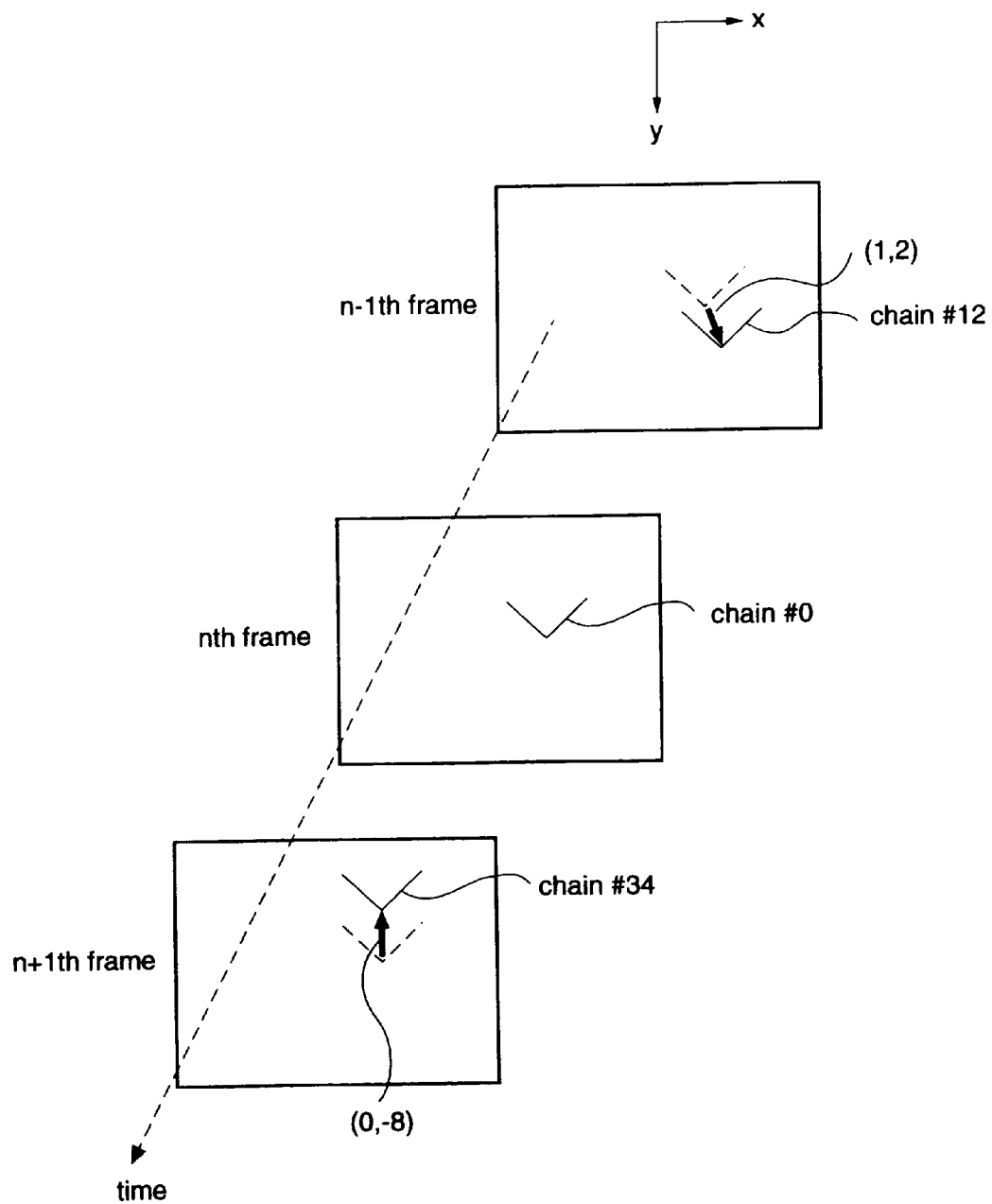
FIG. 23 is a view illustrating the process shown in the flowchart of FIG. 22.

Information relating to the following kind of chain is stored in the RAM $42_n$ as a result of the above process. Namely, as shown, for example, in FIG. 23, the chain #0 (the character after # is the frame number) exists at the nth frame. As shown in FIG. 24 (the leading line of FIG. 24), the motion vector (0, −8) to the following frame, the motion vector (1, 2) to the previous frame, the chain number (the number of the chain in the previous frame of the highest degree of similarity) 12 of the chain #12 of a high degree of similarity existing at the previous frame and the chain number (the number of the chain in the following frame of the highest degree of similarity) 34 of the chain #34 of a high degree of similarity existing at the following frame are stored at the RAM $42_n$ so as to correspond with the chain number 0 of chain #0 when high degree of similarity chains #12 and #34 of a degree of similarity with regards to chain #0 equal to or greater than T exist in the previous and following frames respectively, and when the motion vectors for the noted chain going to the previous frame and the following frame are (1, 2) and (0, −8) respectively.

Information relating to all of the chains existing at the nth frame is stored at the RAM $42_n$ every chain. A "−1" in the column for the chain number of the chain of a high degree of similarity existing in the previous frame (the number of the chain in the previous frame having the highest degree of similarity) and the column for the chain number of the chain of a high degree of similarity existing in the following frame (the number of the chain in the following frame having the highest degree of similarity), i.e. a non-compatible code, means that there are no chains in the previous or following frames capable of being linked with the chain corresponding to the chain number of this line.

Figure 25:
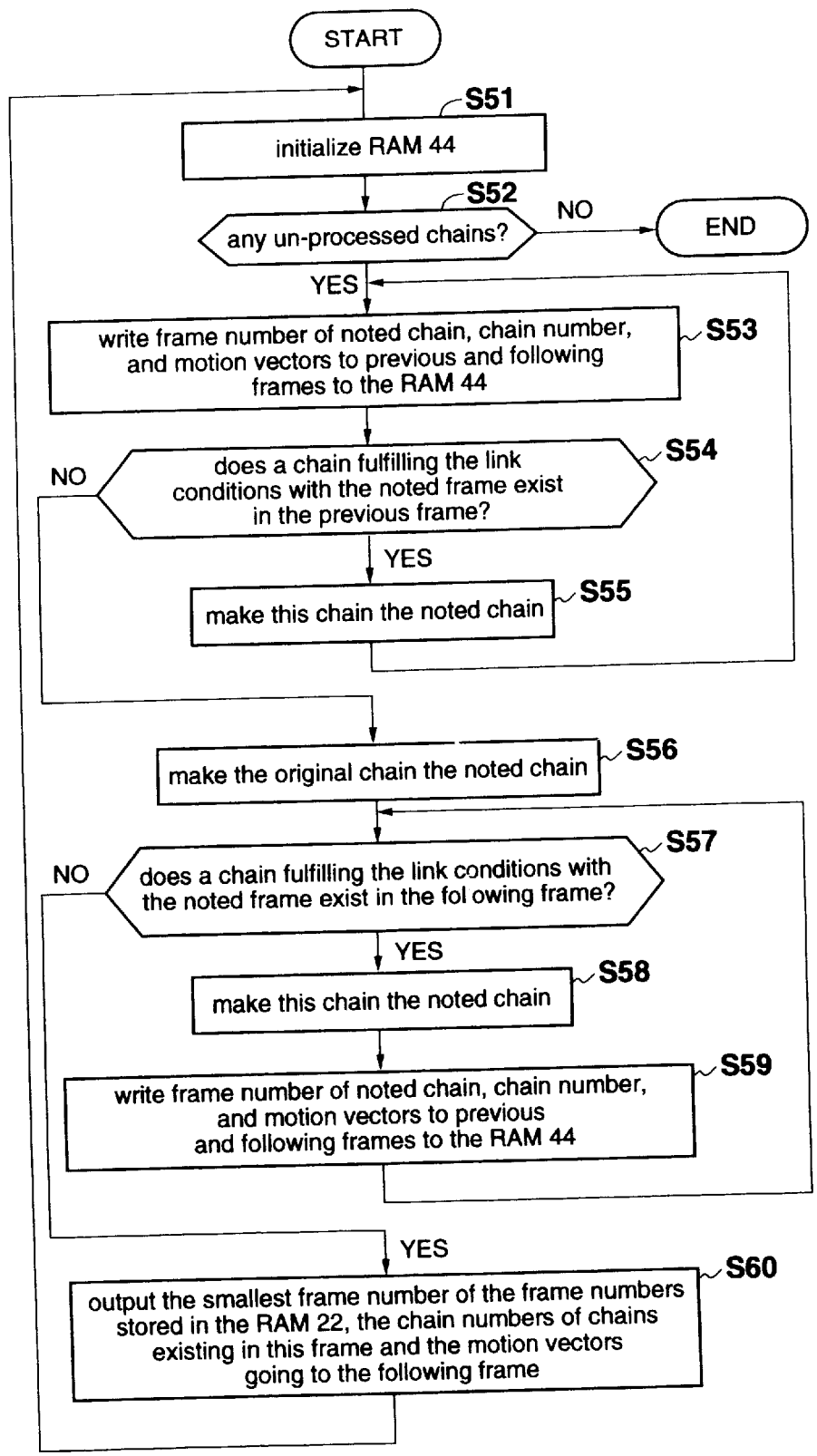
FIG. 25 is a flowchart illustrating the operation of the chain linking circuit 43 shown in FIG. 18.

Next, FIG. 25 is a flowchart illustrating the process for the chain linking circuit 43 of FIG. 18. When information relating to chains for the first to Nth frames is stored at the RAM $42_1$ to $42_N$ at the chain linking circuit 43, the RAM 44 is initialized in step S51. The step S52 is then proceeded to and a determination is made as to whether or not any unprocessed chains are stored in the RAM $42_1$ to $42_N$. This determination is carried out by searching for unprocessed chains in the order of, for example, chain number or frame number.

When it is determined in step S52 that an unprocessed chain exists, this chain is taken as the noted chain and step S53 is proceeded to. The chain number of the noted chain, the motion vector to the previous frame corresponding with this chain number and the motion vector to the following frame are then read-out from the RAM 42 (one of the RAMs $42_1$ to $42_N$). These are then in step S53 made to correspond with the frame number of the frame where the noted chain exists (equal to the suffix n of the RAM $42_n$ where the noted chain is stored) and outputted to and stored in the RAM 44.

The step S54 is proceeded to, and a determination is made as to whether or not a chain fulfilling prescribed conditions for linking with the noted chain exists at the previous frame. If, for example, in step S54, a chain having a high degree of similarity with respect to the noted chain exists in the previous frame, this high degree of similarity chain is not yet taken as a noted chain. A determination is first made as to whether or not the high degree of similarity chain existing in the frame (the following frame as viewed from the high degree of similarity chain existing at the previous frame (i.e. the noted frame)) following this high degree of similarity chain is a noted chain by referring to the RAM 42.

When a chain fulfilling conditions for connection with the noted chain exists in the previous frame, step S55 is proceeded to, this chain is taken as the new noted chain, and step S53 is returned to. In this case, the chain number of the new noted chain, the motion vector going to the previous frame corresponding to this chain number and the motion vector going to the following frame are read from the RAM 42. These are then made to correspond to the frame number of the frame where the new noted chain exists, and are outputted to and stored in the RAM 44. In this way, the chain taken as the noted chain the previous time and the newly noted chain are linked. Namely, the chain taken as the noted chain the previous time and the newly noted chain are made to correspond in such a manner as to express the same outline.

The chain (high degree of similarity chain) stored at the RAM 42 has a degree of similarity with respect to the noted chain of the threshold value of T or more, as illustrated in FIG. 22. Therefore, according to the above process, the chain A existing at a certain frame and the chain B existing at a certain frame are linked when the degree of similarity SA of the chain A with respect to the chain B and the degree of similarity SB of the chain B with respect to the chain A are both greater than or equal to the prescribed threshold value T.

On the other hand, when it is determined in step S54 that a chain fulfilling conditions for linking with the noted chain does not exist in the previous frame, step S56 is proceeded to. The chain taken as the noted chain is then again taken as the noted chain and step S57 is proceeded to directly after determining in step S52 that an unprocessed chain exists. In step S57, a determination is made as to whether or not a chain fulfilling prescribed conditions for linking with the noted chain exists in the following frame. Namely, in step S57, a determination as to whether or not a chain having a high degree of similarity with respect to the noted chain exists in the following frame with this high degree of similarity chain not yet having been taken as a noted chain, and moreover, whether or not the high degree of similarity chain existing in the previous frame (the previous frame when viewing from the high degree of similarity chain existing at the following frame, i.e. the noted frame) with respect to this high degree of similarity chain is a noted chain is determined by referring to RAM 42.

When a chain fulfilling the conditions for connection with the noted chain exists in the following frame, step S58 is proceeded to, this chain is taken as the new noted chain, and step S59 is proceeded to. In step S59, the chain number of the newly noted chain, the motion vector going to the previous frame corresponding with this chain number and the motion vector going to the following frame are read from the RAM 42. These are then made to correspond to the frame number of the frame where this new noted chain exists and are outputted to and stored in the RAM 44. In this way, the chain taken as the noted chain the previous time and the new noted chain are linked.

On the other hand, when it is determined in step S57 that a chain fulfilling conditions for linking with the noted chain does not exist in the following frame, step S60 is proceeded to. The smallest frame number (hereinafter referred to as "the smallest frame number") of the frame numbers stored in the RAM 44, the chain number corresponding to this smallest frame number (hereinafter referred to as the smallest chain number) and the motion vector going to the following frame are all outputted to the select multiplexer 16 (FIG. 2).

Namely, the chain where the frame number corresponds to the minimum frame is decided upon as the foundation chain and all of the motion vectors going to the following frame are decided upon as the motion vectors to be multiplexed. The frame number of where the foundation chain exists, chain number, and motion vector to the following frame are all then outputted from the select multiplexer 16.

With the above process, when the storage contents of the RAM $42_n$ are as shown, for example, in FIG. 26A, the information shown in FIG. 26B is stored at the RAM 44 and the information shown in FIG. 26C is outputted from the chain linking circuit 43. Namely, when the chain #56 (chain for which the chain number is 56) existing at the sixth frame shown in FIG. 26A is taken to be the noted frame in step S52, the frame number 6, chain number 56 motion vector to the following frame (−3, −6), and motion vector (0, 2) to the previous frame are stored in the RAM 44 in step S53 (FIG. 26B).

Chain number 273 is then listed in the column for the "number of the chain in the previous frame with the highest degree of similarity" for the chain #56. The chain #273 is therefore present as the chain with the highest degree of similarity with respect to chain #56 in the fifth frame previous to the sixth frame. Further, chain number #56 is listed (FIG. 26A) in the column "number of chain having highest degree of similarity in the following frame" for this chain #273. If it is then taken that this chain #273 is not taken to be a noted chain, the chain #273 is then determined to fulfill the connection conditions in step S54. In this case, the frame number 5 of this chain #273, the chain number 273, the motion vector (−1, 3) to the following frame and the motion vector (3, 6) to the previous frame are stored in the RAM 44 (FIG. 26B).

This chain #273 fulfilling the connection conditions is then taken to be the new noted chain in step S55. However, a non-compatible code (−1) is listed in the column for "the number of the chain with the highest degree of similarity in the previous frame" and a frame fulfilling the connection conditions with the chain #273 therefore does not exist at the previous frame.

Because of this, the chain #56 is again taken to be the noted chain in step S56. The chain number #24 is then listed in the column for "the number of the chain with the highest degree of similarity in the previous frame" for this chain #56. A chain #24 then exists as a high degree of similarity chain for the chain #56 at the seventh frame following the sixth frame. Further, the chain number #56 (FIG. 26A) is listed in the column for the "number of the chain of the highest degree of similarity in the previous frame" for this chain #24. If it is then taken that the chain #24 is not a noted chain, the chain #24 is determined to fulfill the connection conditions in step S57. Therefore, in this case, the frame number 7 of this chain #24, the chain number 24, the motion vector (0, −2) to the following frame and the motion vector (3, 9) to the previous frame are stored in the RAM 44 (FIG. 26B).

The chain #24 fulfilling the connection conditions is taken as the new noted chain in Step S58. However, a non-compatible code (−1) is listed in the column for "the number of the chain of the highest degree of similarity in the following chain" for this chain #24 and a chain fulfilling connection conditions with the chain #24 does not exist in the following frame.

Therefore, up until now, the smallest frame number, the smallest chain number and the motion vector going to the following frame of the information recorded in the RAM 44 have all been read-out and outputted in step S60.

Namely, when the storage contents of the RAM 44 have been as shown in FIG. 26B, a minimum frame number of 5, a chain number corresponding to this chain number of 273 and motion vectors going to the following frame of (−1, −3), (−3, −6) and (0, 2) are outputted from the similar chain detector 15 (chain linking circuit 43) to the select multiplexer 16, as shown in FIG. 26C.

Then, at the select multiplexer 16, as described above, chain encoded data for the chain of the smallest chain number existing at the frame of the minimum frame number n is read from the RAM $14_n$. Multiplexed chain encoded data is then obtained and outputted by multiplexing this chain encoded data and all of the motion vectors from the similar chain detector 15.

For example, as shown in FIG. 27, when chains $CH_n$ to $CH_N$ existing at the nth to Nth frames, respectively, are taken to be connected, the chain encoded data for chain $CH_n$ and all of the motion vectors going from chain $CH_n$ to the following frames until chain $CH_{N-1}$ are multiplexed and then outputted from the select multiplexer 16.

Therefore, chains (chains similar when viewed with respect to time) connected across a plurality of frames are outputted as chain encoded data for a certain chain (foundation chain) and motion vectors for shifting (motion compensation) this chain and restoring this chain with respect to other chains, i.e. chains similar across a plurality of frames are connected together in groups. A foundation structure can then be constructed taking this kind of chain as a node. Then, chain encoded data relating to one of these chains which is taken as a node is outputted, with motion vectors being outputted with regards to other chains. When this is then compared with the case for the related art where chains existing at each frame are outputted as chain encoded data, the amount of time consumed can be reduced and the efficiency with which an image can be compressed can therefore be increased.

This means that the transmission of moving images using transmission lines of limited transmission bandwidth and the recording of moving images on recording mediums of low recording capacity becomes possible.

The chain existing at the frame for which the frame number is the highest or another arbitrary chain can also be taken as the foundation chain, rather than taking the foundation chain as the chain existing at the frame of the smallest frame number of the connected chains. When the foundation chain is taken, for example, as the chain existing at the frame of the highest frame number, motion vectors outputted from the similar chain detector 15 (chain linking circuit 43) can be taken as all the motion vectors going to the previous frame.

Next, FIG. 28 shows a further example of a structure for the similar chain detector 15 of FIG. 2. A multi-chain degree of similarity detector 61 stores the chain encoded data in the RAMs $14_1$ to $14_N$, in the same way as the degree of similarity detector 41 (note: there is also a reliable point calculator 41) of FIG. 18. The chain encoded data for each of the frames is then read from the RAMs $14_1$ to $14_N$ and information relating to chains existing at neighboring frames is provided to and stored in the RAM 62.

However, with the degree of similarity detector 41, when a chain has the highest degree of similarity with respect to the noted chain and has a degree of similarity greater than or equal to the threshold value T (high degree of similarity chain) exists in a neighboring frame, the motion vector to the following frame, the motion vector to the previous frame, the chain number of the high degree of similarity chain existing at the previous frame and the chain number of the high degree of similarity chain existing at the following frame are made to correspond to the chain number of the noted chain and are stored in the RAM 42 (FIG. 24) . However, with the multi-chain degree of similarity detector 61, if a chain having a degree of similarity with the noted chain of greater than "0" (chains having a degree of similarity with respect to the noted chain, hereinafter referred to as "chains having a degree of similarity") exist in a neighboring frame, the motion vector going to the following frame, the motion vector going to the previous frame, the chain numbers of all of the chains having a degree of similarity existing in the previous frame and the chain numbers of all of the chains having a degree of similarity existing in the following frame are made to correspond to the chain number of the noted frame and then stored in the RAM 62. Further, the degree of similarity of the noted chain with respect to this chain is made to correspond to the chain number of the chain having a degree of similarity and is stored at the RAM 62.

FIG. 29 shows the storage contents of the RAM $62_n$. The line for chain number #0 of the embodiment of FIG. 29 has the motion vector to the following frame and the motion vector to the following frame for the chain #0 existing at the nth frame as (0, −8) and (1, 2), respectively, and shows the existence of the chains #12, #8 and #44 having a degree of similarity at the previous frame and the existence of the chains #109 and #69 having a degree of similarity at the following frame. Further, the degree of similarity of the noted chain with respect to the chains #12, #8 and #44 existing at the previous frame is shown as 0.7, 0.23 and 0.06, with the degree of similarity of the noted chain with respect to the chains #109 and #69 existing at the following frame being shown as 0.7 and 0.1, respectively.

When a chain having a degree of similarity does not exist in the previous frame or the following frame, "−1", for example, is listed at the columns for the chain number of the previous frame and the chain number of the following frame and the columns for the degrees of similarity to indicate this.

The line for chain number #1 has a motion vector going to the following frame and a motion vector going to the previous frame for the chain #1 existing at the nth frame of (7, 7) and (2, 1), respectively, and shows a chain #121 having a degree of similarity taken to be 0.92 existing in the previous frame and a chain #39 having a degree of similarity taken to be 0.97 existing in the following frame. Further, the line for the chain number #N2 has the motion vector going to the following frame and the motion vector going to the previous frame for the chain #N2 existing a the nth frame as (−5, −5) and (0, −1), respectively, and shows that a chain #2 having a degree of similarity taken to be 0.2 exists in the previous frame and that a chain having a degree of similarity does not exist in the following frame.

Figure 30:
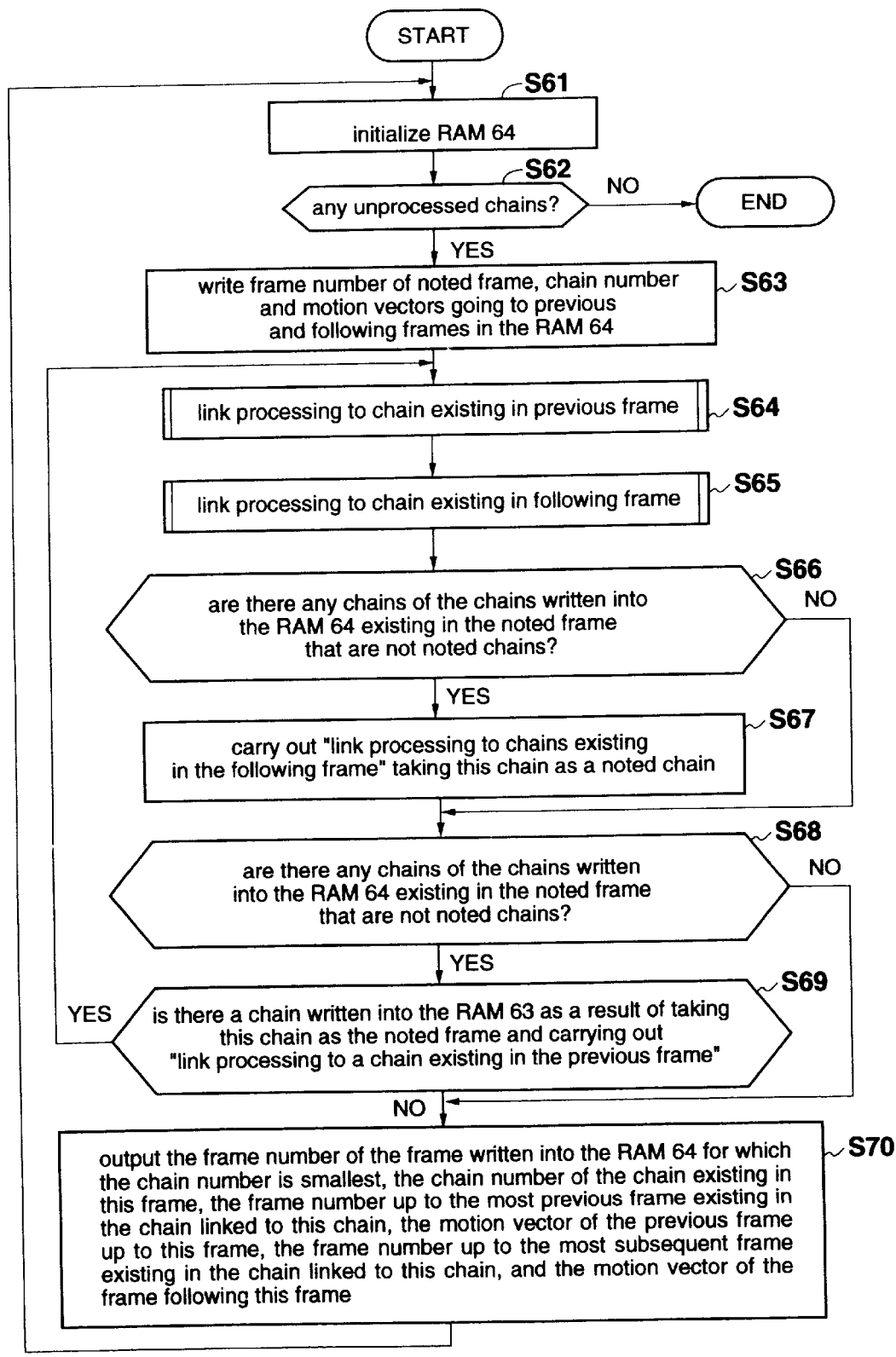
FIG. 30 is a flowchart illustrating the operation of the multi-chain connector 63 shown in FIG. 28.

When information relating to chains for the first to Nth frames is stored at the RAM $62_1$ to $62_N$, a process in accordance with the flowchart shown in FIG. 30 is carried out at a multi-chain connector 63. First, at the multi-chain connector 63, the RAM (connection RAM) 64 is initialized in step S61. Step S62 is then moved onto and a determination is made as to whether or not an unprocessed chain is stored in RAM $62_1$ to $62_N$. This determination is carried out by searching for unprocessed chains in, for example, order of chain number or in order of frame number, in the same way as the case in step S52 of FIG. 25.

When it is determined in step S62 that an unprocessed chain does exist, this chain is taken as the noted chain and step S63 is proceeded to. The chain number of the noted chain, the motion vector going to the previous frame corresponding to this chain number and the motion vector going to the following chain are then read from the RAM 62. Then, in step S63, these are made to correspond to the frame number of the frame where the noted chain exists and are outputted to and stored in the RAM 64.

Step S64 is then proceeded to and connection processing to the chain existing in the previous frame is carried out. Namely, a chain existing in the previous frame to be connected to the noted chain is searched for, and is then connected to the noted chain.

Figure 31:
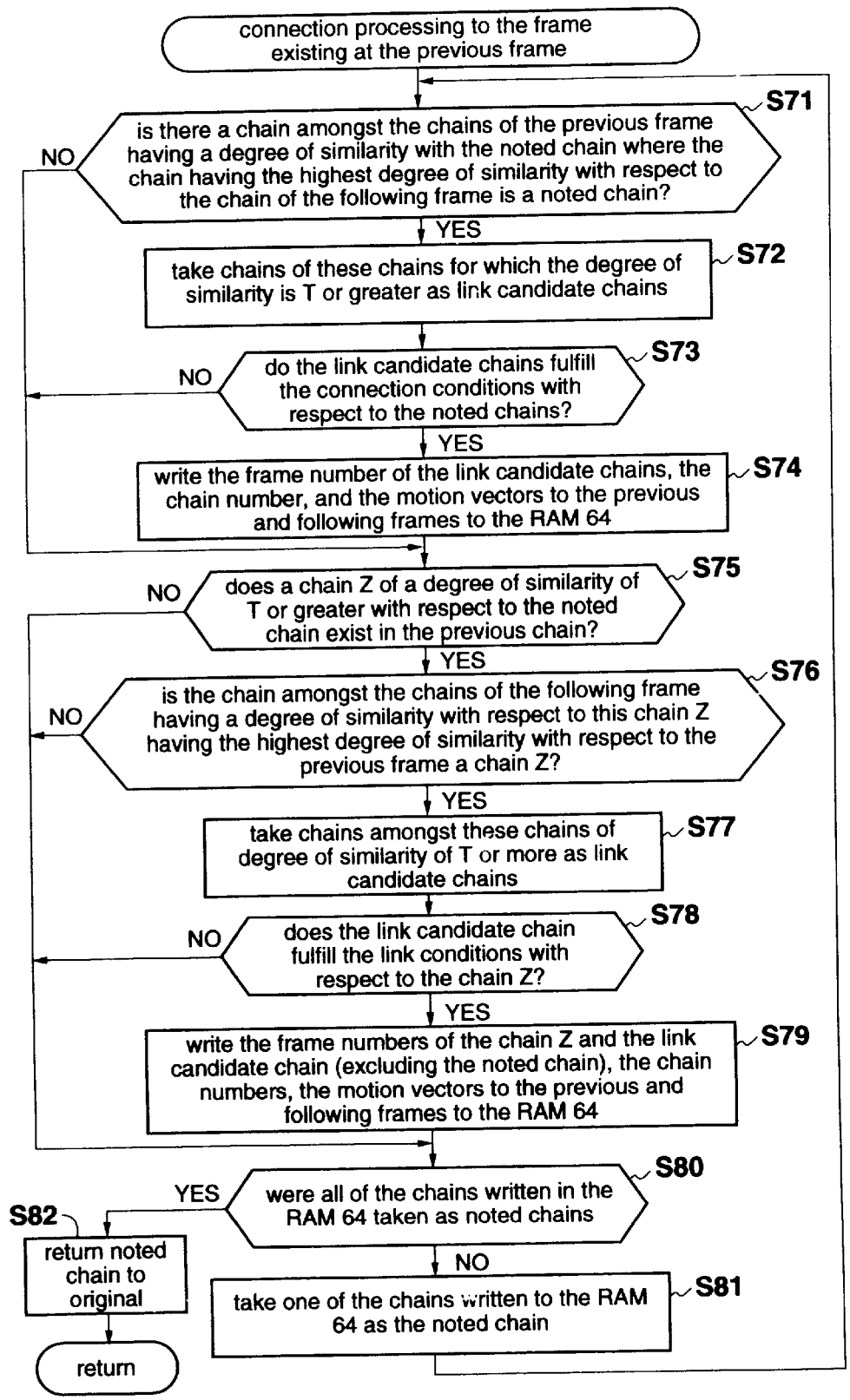
FIG. 31 is a flowchart illustrating the details of the process of step S64 in FIG. 30.

More specifically, as shown in FIG. 31, a determination is made first in step S71 as to whether or not the chain of the chains having a degree of similarity with respect to the noted frame existing in the previous frame (chains having a degree of similarity) having the highest degree of similarity with respect to the chain of the following frame (the following frame when viewed from the previous frame (i.e. the noted frame)) is a noted chain. When it is determined in the step S71 that the chain of the chains having a degree of similarity in the previous frame having the highest degree of similarity with respect to the chain of the following frame is not a noted chain, steps S72 to S74 are skipped and step S75 is proceeded to.

When it is determined in step S71 that the chain of the chains having a degree of similarity in the previous frame having the highest degree of similarity with respect to the chain of the following frame is a noted chain, step S72 is proceeded to. Items of this chain (chains having a degree of similarity) having a degree of similarity with respect to the noted chain equal to or greater than the prescribed threshold value T are then taken as connection candidate chains which may be capable of being connected with the noted chain. When a plurality of chains having a degree of similarity with respect to the noted chain of greater than or equal to the prescribed threshold value T exist in the previous frame, all are taken as connection candidates. Further, when no chains having a degree of similarity with respect to the noted chain of greater than or equal to the prescribed threshold value T exist in the previous frame, steps S73 and S74 are skipped and step S75 is proceeded to, although this is not shown in FIG. 31.

After obtaining a connection candidate chain, a determination is made in step S73 as to whether or not the connection candidate chain fulfills the connection conditions with respect to the noted chain. Namely, in step S73, when the degree of similarity with respect to the connection candidate for the noted chain (this is the total of the degrees of similarity with respect to these connection candidate chains when a plurality of candidate chains exist) is greater than or equal to the prescribed threshold value T, it is determined that the connection candidate chain fulfills the connection conditions with respect to the noted chain.

When the connection candidate does not fulfill the connection conditions with respect to the noted chain in step S73, step S74 is skipped and step S75 is proceeded to. When the connection candidate does fulfill the connection conditions with respect to the noted chain (hereinafter, a connection chain candidate fulfilling the connection conditions is simply referred to as a "connection chain"), step S74 is proceeded to. The chain number of this connection chain, the motion vector going to the previous frame and the motion vector going to the following frame are then made to correspond to the number of the frame at which the connection chain exists while referring to the RAM 62 and are outputted to and stored in the RAM 64. When there is a plurality of connection chains, information relating to all of the connection chains is stored in the RAM 64. Namely, the noted chain and the connection chain are made to correspond so as to express the same outline.

Figure 32:
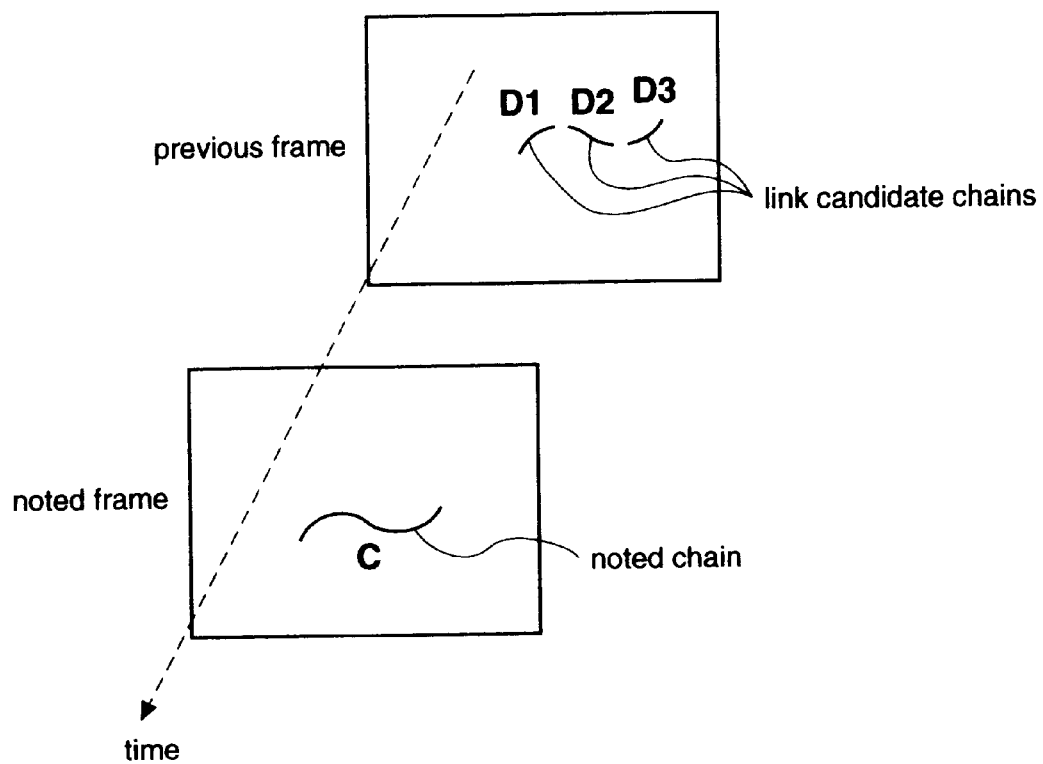
FIG. 32 is a view illustrating the process of step S71 to S74 in FIG. 31.

According to step S71 to step S74 of the above process, in the case where, for example, three divided chains D1, D2 and D3 exist for the noted chain C in the previous frame, as shown in FIG. 32, when the sum of degrees of similarity SC1, SC2 and SC3 of the noted chain C with respect to the chains D1, D2 and D3 respectively is the threshold value T or greater, and the degrees of similarity SD1, SD2 and SD3 of the chains D1, D2 and D3 with respect to the chain C are all equal to or greater than the threshold value T, the noted chain C and the chains D1, D2 and D3 are connected.

Returning to FIG. 31, a determination is made in step S75 as to whether or not a chain Z having a degree of similarity of greater than or equal to the threshold value T with respect to the noted chain exists in the previous frame. If it is determined in step S75 that a chain Z having a degree of similarity of greater than or equal to the threshold value T with respect to the noted chain does not exist in the previous frame, step S76 to step S79 are skipped and step S80 is proceeded to. Further, if it is determined in step S75 that a chain Z having a degree of similarity of greater than or equal to the threshold value T with respect to the noted chain does exist in the previous frame, step S76 is proceeded to. A determination is then made while referring to the RAM 62 as to whether or not the chain of the chains having a degree of similarity with respect to this chain Z existing at the following frame (the following frame when viewed from the frame Z (i.e. the noted frame)) having the highest degree of similarity with respect to the chain of the previous frame is a chain taken as a chain Z.

When it is determined in step S76 that the chain of the chains existing at the following frame when viewing from the chain Z of the highest degree of similarity with respect to the previous frame is not a chain taken to be a chain Z, step S77 to S79 are skipped and step S80 is proceeded to.

Further, when it is determined in step S76 that the chain of the chains existing at the following frame when viewing from the chain Z of the highest degree of similarity with respect to the previous frame is a chain taken to be a chain Z, step S77 is proceeded to. Chains of these chains for which the degree of similarity with respect to the chain Z is greater than or equal to the prescribed threshold value T are then taken as connection candidate chains which may be capable of being connected with the chain Z. When a plurality of chains having a degree of similarity with respect to the chain Z of greater than or equal to the prescribed threshold value T exist in the following frame, step S78 and step S79 are skipped and step S80 is proceeded to, although this is not shown in FIG. 31.

A determination is then made in step S78 as to whether or not the connection candidate chains fulfill the connection conditions with respect to the chain Z. Namely, in step S78, the connection candidate chain is determined to have fulfilled the connection conditions with respect to the chain Z when the degree of similarity (this is the total degree of similarity with respect to these connection candidate chains when a plurality of connection candidate chains exist) with respect to the connection candidate for the chain Z is greater than or equal to the prescribed threshold value T.

When the connection candidate chains are determined not to have fulfilled the connection conditions with respect to the chain Z in step S78, step S79 is skipped and step S80 is proceeded to. Further, when the connection candidate chains are determined in step S78 to have fulfilled the connection conditions with respect to the chain Z (hereinafter, connection candidate chains fulfilling the connection conditions will also be referred to as connection chains), step S79 is proceeded to. The chain number of the connection chain, motion vector going to the previous frame and motion vector going to the following frame are then made to correspond to the number of the frame where the connection chain exists while referring to the RAM 62 and are then outputted to and stored in the RAM 64.

When there is a plurality of connection chains, information relating to all of the connection chains is stored in the RAM 64. Further, the noted chain is included in the connection chain but information relating to the noted chain has already been written to the RAM 64 in step S29 of FIG. 30 and this writing is therefore not carried out in step S79.

In step S79, refering RAM 62, the chain number of the chain Z, the motion vector going to the previous frame and the motion vector going to the following frame are made to correspond to the number of the frame where the chain Z exists and are then outputted to and stored in RAM 64.

In this way, the chain Z and the connection chain are connected, i.e. chain Z and the connection chain are made to correspond so as to express the same outline.

Figure 33:
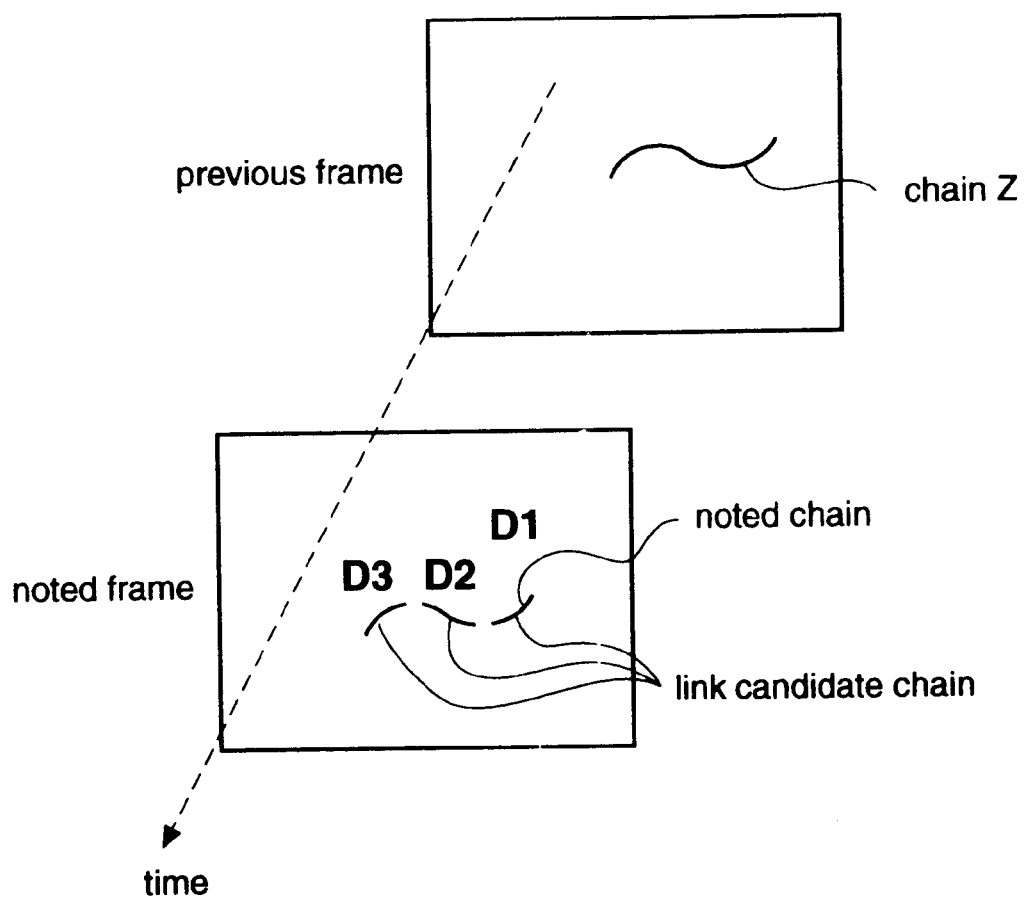
FIG. 33 is a view illustrating the process of step S75 to S79 in FIG. 31.

According to the process of step S75 to step S79, as shown, for example, in FIG. 33, when the noted chain D1 is one of chains D1, D2 and D3 existing in a previous frame divided up from a chain Z, the sum of the degrees of similarity SZ1, SZ2 and Sz3 of the chain Z with respect to the chains D1, D2 and D3 is greater than or equal to T, and the degrees of similarity of the chains D1, D2 and D3 including the noted chain (chain D1 in the embodiment of FIG. 33) with respect to the chain Z are all greater than or equal to the threshold value T, the chain Z and the chains D1, D2 and D3 including the noted chain are connected.

After the process in step S79, step S80 is proceeded to and a determination is made as to whether or not any chains which have not yet been taken as noted chains exist within the chains (excluding the chain where the noted chain exists) stored at the RAM 64 in step S81 to be described later. If it is determined in step S80 that there are still chains recorded at the RAM 64 that have not yet been taken as noted chains, step S81 is proceeded to and a chain which has not yet been taken as a noted chain is taken as the new noted chain and step S71 is returned to, with the process from step S71 onwards then being repeated for the new noted chain. In this way, the aforementioned basic structure is then constructed taking a chain existing at a frame more previous than (previous with respect to time) the frame of the chain taken as the object in step S62 of FIG. 30.

When it is determined in step S80 that there are no chains yet to be taken as noted chains amongst the chains stored at the RAM 64, i.e. when all of the chains stored at the RAM 64 have been taken as noted chains, step S82 is proceeded to. The chain taken as the noted chain when connection processing to the chain present at the previous frame started is then again taken as the noted chain. Connection processing to the chain existing at the previous frame is the finished and step S65 of FIG. 30 is returned to.

In step S65, connection processing to chains existing in the following frame is carried out. Namely, in step S65, chains existing in the following frame to be connected with the noted chain are detected and connected with the noted chain.

Figure 34:
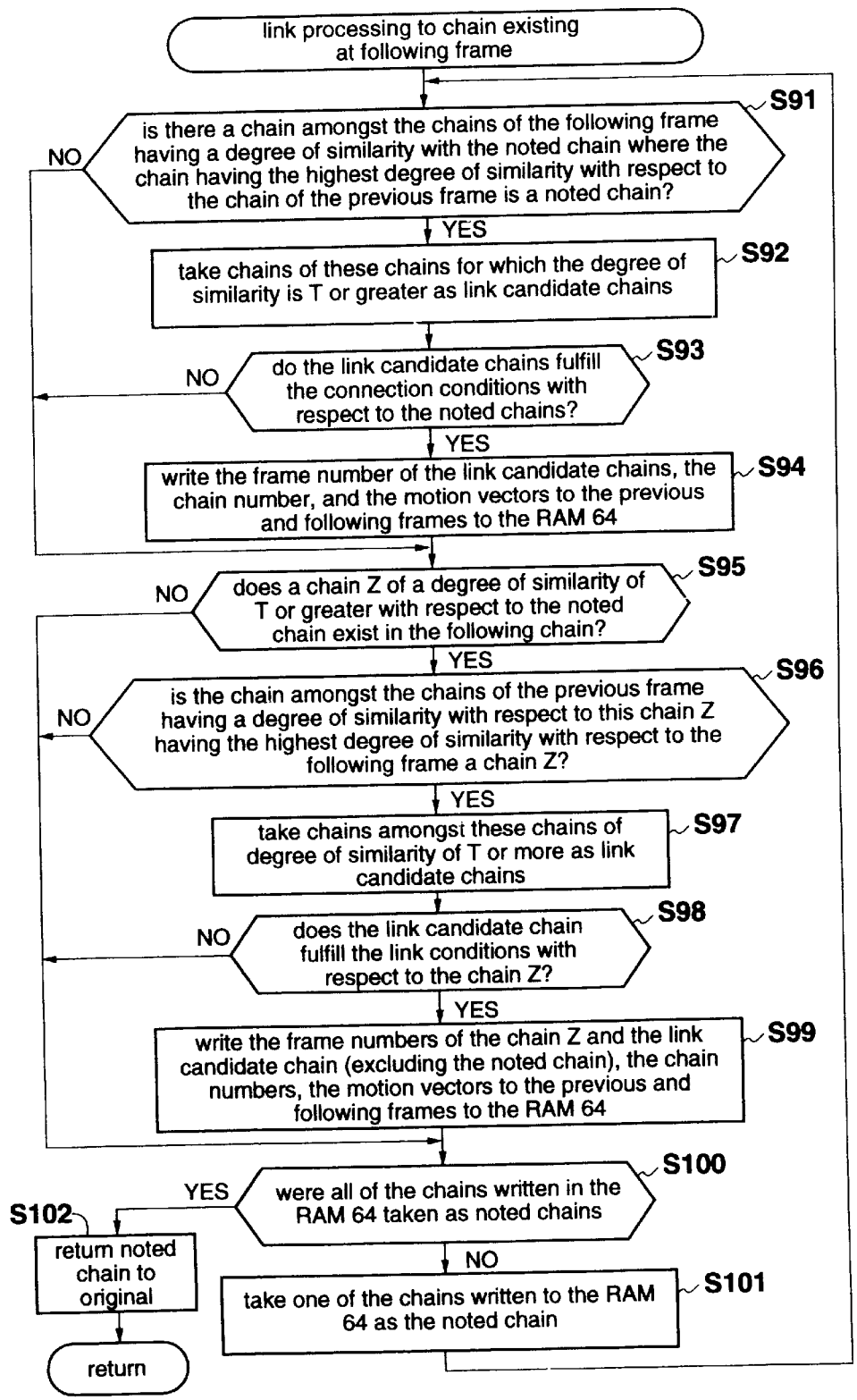
FIG. 34 is a flowchart illustrating the process of step S65 of FIG. 30.

The flowchart of FIG. 34 shows the details of the process for connecting chains existing in the following frame. In steps S91 to S102 of the connection process to the chain existing at the following fame shown in FIG. 34, the same process is carried out as in step S71 to step S82 of FIG. 31. However, connection with the noted chain was carried out in steps S71 to S82 of FIG. 31 taking the chain existing in the previous frame as the target but in FIG. 34 connection processing with the noted chain is carried out taking the chain existing in the following frame as the object.

Figure 35:
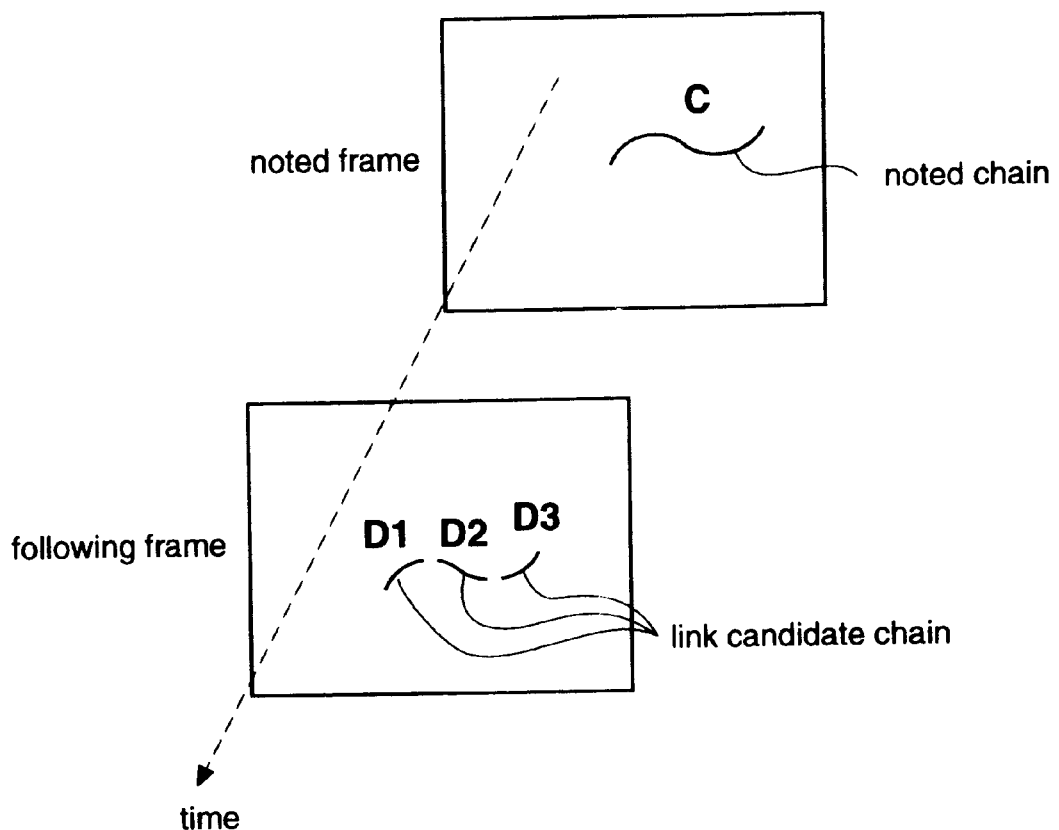
FIG. 35 is a view illustrating the process of step S91 to S94 in FIG. 34.

According to step S91 to step S94 of the above process, in the case where, for example, three divided chains D1, D2 and D3 exist for the noted chain C in the following frame, as shown in FIG. 35, when the sum of degrees of similarity SC1, SC2 and SC3 of the noted chain C with respect to the chains D1, D2 and D3 respectively is the threshold value T or greater, and the degrees of similarity SD1, SD2 and SD3 of the chains D1, D2 and D3 with respect to the chain C are all equal to or greater than the threshold value T, the noted chain C and the chains D1, D2 and D3 are connected.

Figure 36:
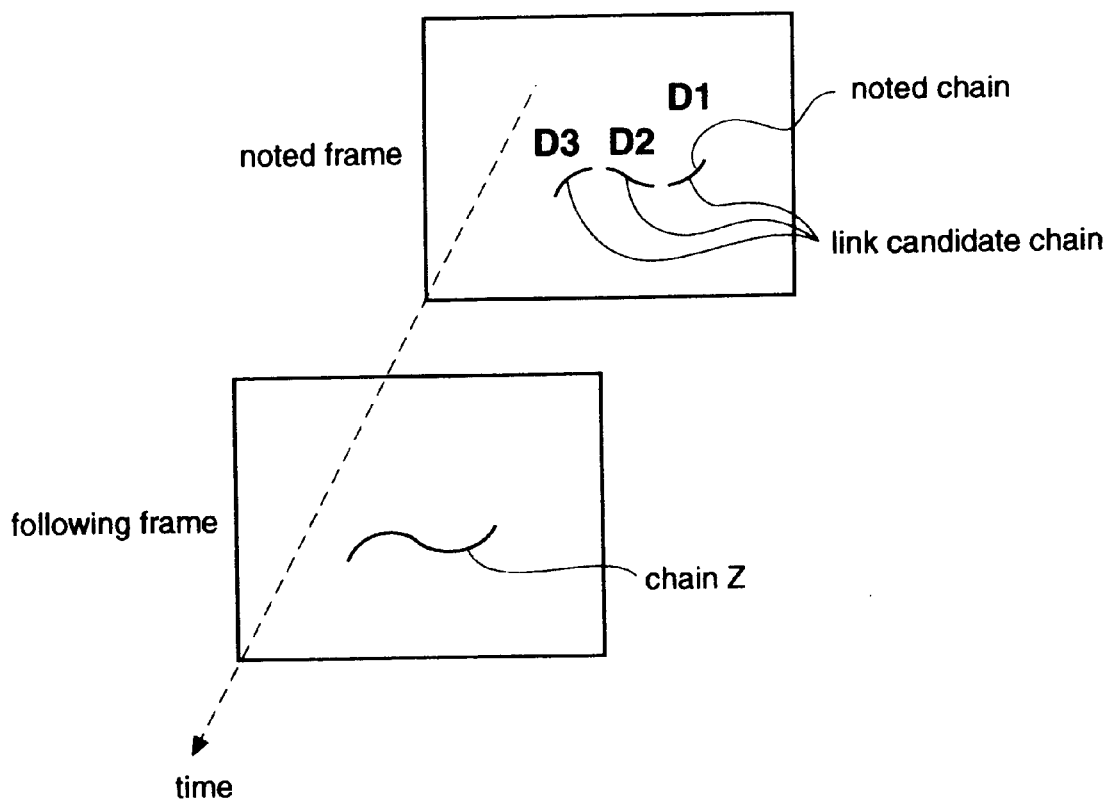
FIG. 36 is a view illustrating the process of step S95 to S99 in FIG. 34.

According to the process of step S95 to step S99, as shown, for example, in FIG. 36, when the noted chain D1 is one of chains D1, D2 and D3 existing in a following frame divided up from a chain Z, the sum of the degrees of similarity SZ1, SZ2 and SZ3 of the chain Z with respect to the chains D1, D2 and D3 is greater than or equal to T, and the degrees of similarity of the chains D1, D2 and D3 including the noted chain (chain D1 in the embodiment of FIG. 36) with respect to the chain Z are all greater than or equal to the threshold value T, the chain Z and the chains D1, D2 and D3 including the noted chain are connected.

As a result of this, the basic structure taking the similar chain as a node is constructed taking a chain existing in a frame later than (following with respect to time) the frame of the chain taken as the noted chain in step S62 of FIG. 30.

Returning to FIG. 30, when connection processing to the chains existing at the following frame occurring at step S65 is completed, step S66 is proceeded to. A determination is then made as to whether or not any noted chain-existing frames i.e. chains existing at noted frames (excluding the noted chain) exist amongst the chains stored at the RAM 64. If it is determined in step S66 that chains amongst the chains stored at the RAM 64 existing at noted frames which have not been taken as noted chains do not exist, step S67 is skipped and the process proceeds to step S68. However, if it is determined in step S66 that chains amongst the chains stored at the RAM 64 existing at noted frames which have not been taken as noted chains do exist, step S67 is proceeded to, this chain is taken to be a noted chain and connection processing to the chain existing at the following frame of FIG. 34 is carried out.

If there is a plurality of chains amongst the chains stored at the RAM 64 existing at noted frames, which have not been taken as noted chains, this plurality of chains is changed in noted-chain order and connection processing to the chain existing at the following frame is carried out in step S67.

Step S68 is then proceeded to and a determination is made in the same way as in step S66 as to whether or not any chains (excluding the noted chain) of the chains stored in the RAM 64 existing at noted frames which have not yet been taken as noted chains exist.

When it is determined in step S68 that there are no chains of the chains stored at the RAM 64 existing at noted frames that have not yet been taken as noted chains, step S69 is skipped and step S70 is proceeded to. Further, when it is determined in step S68 that there are chains of the chains stored at the RAM 64 existing at noted frames that have not yet been taken as noted chains, step S69 is proceeded to. This chain is then taken as a noted chain, and a determination is made as to whether or not there are any chains stored in the RAM 64 by carrying out connection processing to the chain existing at the previous frame of FIG. 31.

In step S69, when chains of the chains stored at the RAM 64 existing at noted frames which have not yet been taken as noted chains are taken as noted chains and it is determined that chains are stored at the RAM 64 by carrying out connection processing to the chains existing at the previous frame, these chains (chains of the chains stored at the RAM 64 existing at noted frames which have not yet been taken as noted chains) are taken as noted chains and step S64 is returned to. When there is a plurality of these chains, one of these chains is taken as a noted chain.

On the other hand, in step S69, when chains of the chains stored at the RAM 64 existing at noted frames which have not yet been taken as noted chains are taken as noted chains and it is determined that chains are not stored at the RAM 64 by carrying out connection processing to the chains existing at the previous frame, step S70 is proceeded to and the information stored in the RAM 64 is outputted to the select multiplexer 16 (FIG. 2).

In step S70, the chain existing at the frame for which the number of frames is the fewest (hereinafter referred to as the "fewest frame") of the information stored at the RAM 64 is decided upon as the foundation chain. The frame number of the fewest frame, the chain number corresponding to this frame number, the number of frames from the fewest frame to the frame of the smallest frame number, all of the motion vectors for between these frames going to the previous frame, the number of frames from the fewest frame to the frame of the largest frame number and the motion vectors between these frames going to the following frames are read from the RAM 64 (however, the aforementioned frame number is equal to the number of motion vectors and can therefore be known by counting the number of motion vectors) and outputted to the select multiplexer 16 (FIG. 2).

The number of frames from the fewer frame to the frame of the smallest frame number, all of the motion vectors going to the previous frames between these frames, the number of frames from the fewer frame to the frame of the largest frame number and the motion vectors going to the following vectors between these frames are multiplexed and outputted.

Figures 38A, 38B:
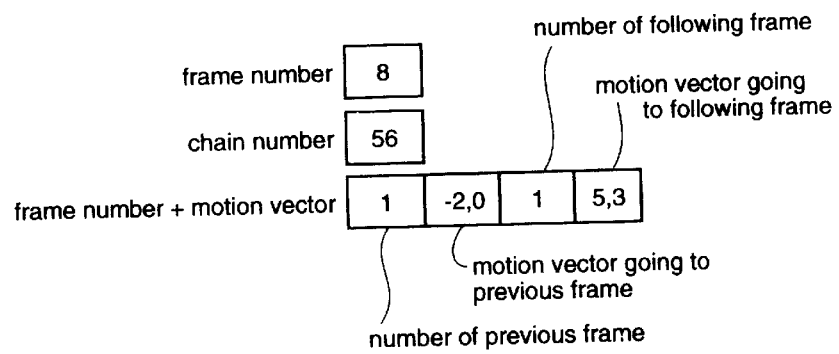
FIG. 38A and FIG. 38B are views illustrating the process shown in the flowchart of FIG. 30.

With the above process, when the storage contents of the RAM $62_n$ are as shown, for example, in FIG. 37, the information shown in FIG. 38A is stored at the RAM 64 and the information shown in FIG. 38B is outputted from the multi-chain connector 63. Namely, when the chain #56 existing at the eighth frame shown in FIG. 38A is taken as the noted chain in step S62, in step S63, this frame number 8, chain number 56, motion vector (5, 3) to the following frame and motion vector (−2, 0) to the previous frame are stored in the RAM 64 (FIG. 38A).

With regards to the chains #36 and #151 of the previous frame (seventh frame) which the chain #56 has a degree of similarity with, the chain having the highest degree of similarity with respect to the chain of the following frame is the chain #56, i.e. the noted chain (FIG. 37). If the threshold value T is taken to be, for example, 0.8, the degree of similarity of the chains #36 and #151 with respect to the chain #56 is 0.97 and 0.91, respectively. Further, the degree of similarity of the chain #56 with respect to the chains #36 and #151 is 0.96 and 0.91, respectively. The degrees of similarity of the chains #36 and #151 with respect to the chain #56 are therefore both equal to or greater than the threshold value T. Further, the total degree of similarity of the chain #56 with respect to the chains #36 and #151 is also greater than or equal to the prescribed threshold value T.

The frame number 7 for the chains #36 and #151 of the seventh frame, the chain numbers 36 and 151, the motion vectors (0, −2) going to the following frame and the motion vectors (3, 9), and (3, 1) of the previous frame are therefore stored in the RAM 64 (FIG. 38A).

The chains #36 and #151 stored in the RAM 64 are taken as the new noted chains in step S81 but there is no chain in the previous frame (sixth frame) having a degree of similarity with the chains #36 and #151 (FIG. 37) so the chain #56 is therefore again taken as the noted chain in step S82.

Then, with regards to the chains #24 and #25 of the following frame (ninth frame) with which the chain #56 has a high degree of similarity, the chain of the highest degree of similarity with the chain of the previous frame in both cases is the chain #56 (FIG. 37) i.e. the noted frame. In this case, the degree of similarity of the chains #24 and #25 with respect to the chains #56 is 0.95 and 0.90 respectively. Further, the degree of similarity of the chain #56 with respect to the chains #24 and #25 is 0.99 and 0.92. The degree of similarity of the chains #24 and #25 with respect to the chain #56 are therefore both equal to or greater than the threshold value and the total degree of similarity of the chain #56 with respect to the chains #24 and #25 is equal to or greater than the threshold value T.

The frame number 9 of the chains #24 and #25 of the ninth frame, the chain numbers 24 and 25, the motion vector (1, −1) going to the following frame and the motion vectors (4, 0) and (4, 2) going to the previous frame are therefore stored in the RAM 64 (FIG. 38A).

The chains #24 and #25 stored in the RAM 64 are taken as the new noted chains but a chain having a degree of similarity with the chains #24 and #25 does not exist (FIG. 37) in the following frame (tenth frame). The chain #56 is therefore again taken as the noted chain in step S102.

At this stage, chains which have not been taken to be noted chains do not exist amongst the chains stored at the RAM 64 at the eighth frame taken as the noted frame. The chain existing at the fewer frame is therefore taken as the foundation frame and information is read out and outputted in step S70 from the information stored at the RAM 64 up until now taking this fewer frame as a base. Namely, the frame number of the fewer frame, the chain number of the foundation chain, the number of frames from the fewer frame to the frame of the smallest frame number, all of the motion vectors going to the previous frames between these frames, the number of frames from the fewer frame to the frame of the largest frame number and all of the motion vectors going to the following frame between these frames are read-out and outputted in step S70.

More specifically, when the storage contents of the RAM 64 are as shown in FIG. 38A, the frame with the fewest chains is the eighth frame and this therefore becomes the fewer frame. Therefore, as shown in FIG. 38B, the frame number 8 of the fewer frame, the chain number 56 corresponding to this frame number, the number of frames 1 from the fewer frame to the frame of the smallest frame number 7, the motion vector (−2, 0) to the previous frame between these frames, the number of frames 1 from the fewer frame to the frame of the largest frame number 9 and the motion vector (5, 3) to the following frame between these frames are outputted from the similar chain detector 15 (multi-chain connector 63) to the select multiplexer 16.

At the select multiplexer 16, the chain encoding data for the chain existing at the frame of frame number n received from the similar chain detector 15 is read from the RAM $14_n$ by referring to the chain number. The chain encoded data, frame number from the similar chain detector 15 and all of the motion vectors are then multiplexed before being outputted as the multiplexed chain encoded data.

Figure 39:
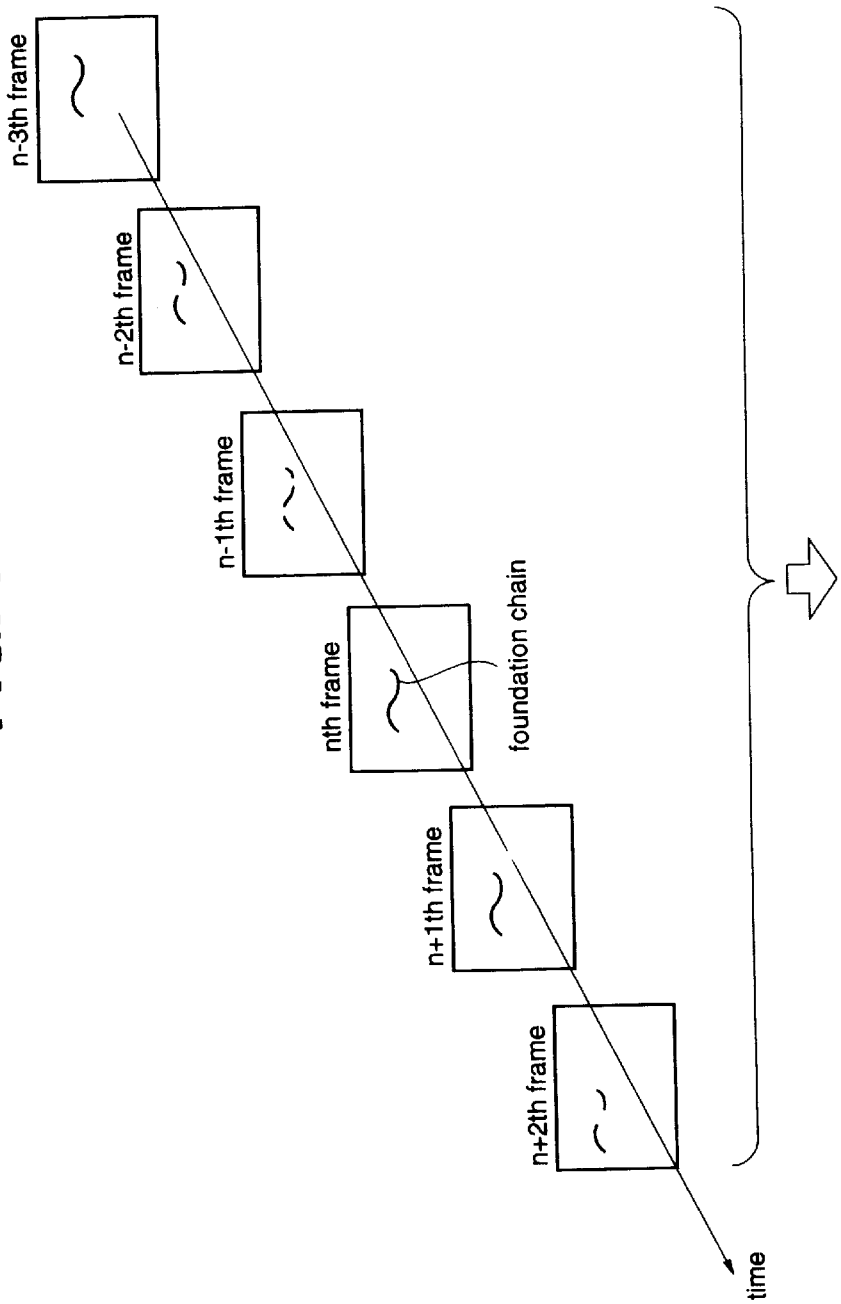
FIG. 39 is a view illustrating the multiplexed chain encoded data outputted by the select multiplexer 16 shown in FIG. 2.

Namely, as shown in FIG. 39, when one chain existing at the n−3rd frame, two chains existing at the n−2th frame, three chains existing at the n−1th frame, one chain existing at the nth frame, one chain existing at the n+1th frame and two chains existing at the n+2th frame are connected taking the chain existing at the nth frame as a foundation chain, the chain encoded data for the foundation chain of the nth frame, the number of frames from the nth frame to the n−3th frame and the motion vectors to the previous frames in-between, and the number of frames from the nth frame to the n+2th frame and the motion vectors to the following frames in-between are multiplexed at and then outputted from the select multiplexer 16.

Chains (similar chains when viewed with respect to time) connected across a plurality of frames are also outputted as chain encoded data for a certain chain (foundation chain) and motion vectors for shifting (motion compensating) this chain and restoring other chains when using the similar chain detector 15 of FIG. 28 in the same way as when the similar chain detector 15 of FIG. 18 is used. The amount of time consumed can therefore be reduced with the effect that the efficiency of the image compression is increased.

Further, according to the similar chain detector 15 of FIG. 27, as shown in FIG. 32, FIG. 33, FIG. 35 and FIG. 36, there is only a single chain at a certain frame. However, at other frames, for whatever cause, chains divided into a plurality of parts are connected. It is therefore possible to achieve improved compression efficiency when comparisons are made with the case of FIG. 18.

In the above, the chain existing at the frame having the smallest number of chains stored at the RAM 64 was taken as the foundation chain. However, frames of other chains can also be taken as the foundation chain. However, with regards to the foundation chain, from the point of view of raising the compression efficiency, it is preferable for there to be less chain encoded data because the chain encoded data is outputted. For these reasons, it is preferable to take the chain existing at the frame having the smallest number of frames as the foundation chain.

In the embodiment shown in FIG. 39, three chains exist at, for example, the n−1th frame. In this kind of case the motion vectors to the previous frame (n−2th frame) and the following frame are different for these three chains. In this kind of case it is preferable for motion vectors from the three chains existing at the n−1th frame going to the previous frame i.e. three motion vectors, to be outputted. However, from the point of view of improving the efficiency of the compression, it is also possible to take, for example, an average value or just one value for the motion vectors going from the three chains existing at the n−1th frame to the previous frame and output this value as a typical value for the motion vectors going from the three chains existing at the n−1th frame to the previous frame.

Figure 40:
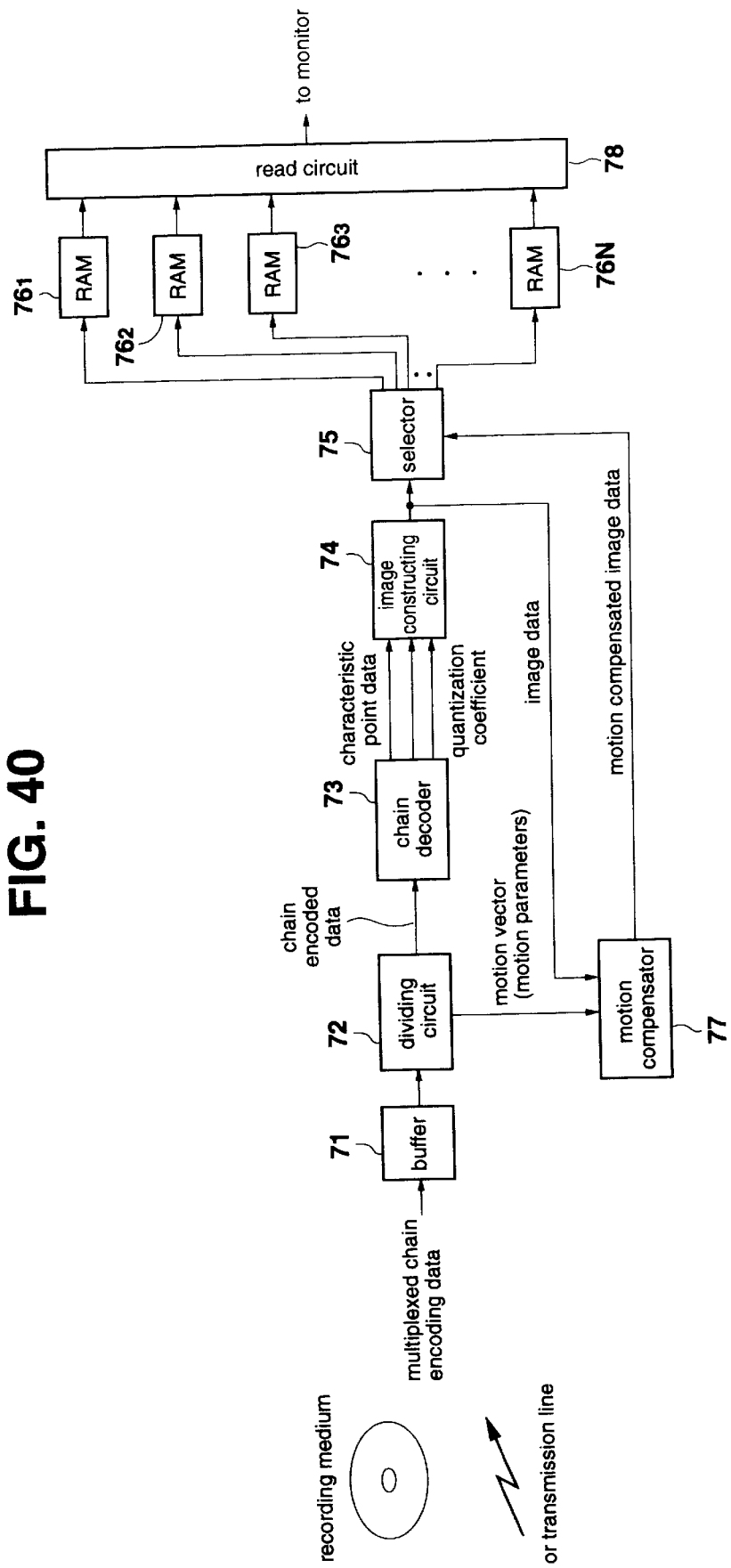
FIG. 40 is a block diagram showing the structure of the first embodiment of the present invention applied to an image decoding device.

FIG. 40 is a view showing the structure of an embodiment of an image decoding device for decoding multiplexed chain encoded data outputted from the image encoding device of FIG. 2 to the original moving picture. Multiplexed chain encoded data outputted from the image encoding device of FIG. 2 is provided to and then temporarily stored in a buffer 71 via a transmission line or by being played-back from the recording medium 18. A separator 72 then reads the multiplexed chain encoded data stored at the buffer 71 and extracts from this data chain encoded data and motion vectors. The chain encoded data and the motion vectors are then outputted to a chain decoder 73 and a motion compensator 77, respectively.

The chain decoder 73 gets the characteristic points and the quantization coefficients occurring at these characteristic points by chain decoding the chain encoded data and outputs these characteristic points and quantization coefficients to an image constructor 74. The image constructor 74 constructs (reconstructs) the original image from the characteristic points and quantization coefficients from the chain decoder 73, i.e. the image constructor 74 obtains image data by inverse quantizing the quantization coefficients and image data forming the foundation chain is generated by arranging this image data (hereinafter referred to as foundation chain data) about the characteristic point. This foundation chain data is then outputted to a selector 75 and the motion compensator 77.

The selector 75 outputs and stores the foundation chain data outputted from the image constructor 74 in one RAM $76_1$ to $76_N$ forming the frame memory. The selector 75 also outputs and stores image data outputted from the motion compensator 77 to one of RAM $76_1$ to $76_N$ in the same way. In this way, data for the nth frame of the N frames of image data present as processing units for the similar chain detector 15 shown in FIG. 2 is stored at the RAM $76_n$. The motion compensator 77 then performs motion compensation on the foundation chain data outputted from the image constructor 74 in accordance with motion vectors outputted by the separator 72 and outputs the results to the selector 75. When a read circuit 78 stores N frame portions of image data in RAM $76_1$ to $76_N$, this image data is read out in the order of RAM $76_1$ to $76_N$ and outputted to and displayed on a monitor not shown in FIG. 40.

Next, the operation will be described with reference to the flowchart of FIG. 41. First, multiplexed chain encoded data inputted to the buffer 71 is temporarily stored in the buffer 71. In doing so, the multiplexed chain encoded data stored at the buffer 71 is read at the separator 72 and divided into chain encoded data and motion vectors in step S111. The chain encoded data is then outputted to the chain decoder 73 and the motion vectors are outputted to the motion compensator 77.

At the chain decoder 73, the chain encoded data is chain decoded in step S112 so as to obtain and output to the image constructor 74 the characteristic points and quantization coefficients. The foundation chain data (image data comprising the foundation chain) is then generated at the image constructor 74 in step S113 based on the characteristic points and quantization coefficients (decoding data) from the chain decoder 73. This foundation chain data is then provided to the selector 75.

When the similar chain detector 15 of the image encoding device is constructed in the way shown in FIG. 18, chain encoded data is data regarding chains existing at the smallest frame, as described previously. In this case, when the selector 75 receives foundation data from the image constructor 74, this foundation chain data is outputted to and stored in the RAM $76_n$ being suffixed with the frame number n of the smallest frame. In the select multiplexer 16 shown in FIG. 2, the frame number of the smallest frame is included in the multiplexed chain encoded data. Then, although not shown in FIG. 40, the frame number of the smallest frame is separated from the multiplexed chain encoded data at the separator 72 and provided to the selector 75. Then, at the selector 75, the foundation chain data is stored in the RAM 76 (one of RAM $76_1$ to $76_N$) based on the frame number from the separator 72.

Further, foundation chain data outputted by the image constructor 74 is also provided to the motion compensator 77 as well as the selector 75. When the foundation chain data from the image constructor 74 is then received at the motion compensator 77, motion compensation is carried out on this foundation chain data in step S114 in accordance with motion vectors outputted by the separator 72.

Motion vectors outputted by the separator 72 are motion vectors going to the following frames between frames where chains connected to the foundation chain exist. Image data (hereinafter referred to as "first chain data") for the chain existing at the next frame (following frame) for the frame at which the foundation frame exists is therefore generated at the motion compensator 77 by motion compensating the foundation chain data in accordance with the first motion vector from the separator 72. Moreover, image data (hereinafter referred to as "second chain data") for the chain existing at the next following frame (the following frame for the frame existing at the first chain data) following after the frame following the frame at which the foundation chain exists is generated by motion compensating the first chain data at the motion compensator 77 in accordance with the second motion vector from the separator 72.

Motion compensation is carried out at the motion compensator 77 using all of the motion vectors outputted from the separator 72. Therefore, when the number of motion vectors outputted from the separator 72 in M (where M<N), first to Mth chain data is generated at the motion compensator 77.

The first to Mth chain data generated at the motion compensator 77 is sequentially outputted to the selector 75. When the selector 75 receives the first to Mth chain data, this data is sequentially stored in the RAM 76 from after the RAM $76_n$ stored with the foundation chain data, i.e. the selector 75 sequentially stores the first to Mth chain data in RAM $76_{n+1}$ to $76_{N+M}$.

When the data for all of the frames existing at the N frames is stored in RAM $76_1$ to $76_N$, the read circuit 78 sequentially reads data from RAM $76_1$ to $76_N$ and outputs this data to a monitor for displaying.

The RAM $76_1$ to $76_N$ comprises two banks capable of storing, for example, one frame portion of image data. When a certain N-frame portion of image data is stored at one bank and is being read-out, the next N-frame portion of image data is stored in the other bank. When the reading-out of image data stored in the one bank is then completed, the reading out of image data stored in the other bank starts and the next N-frame portion of image data is stored in the one bank. The image can therefore be displayed continuously without interruptions at the monitor by switching-over banks in this way.

Figure 42:
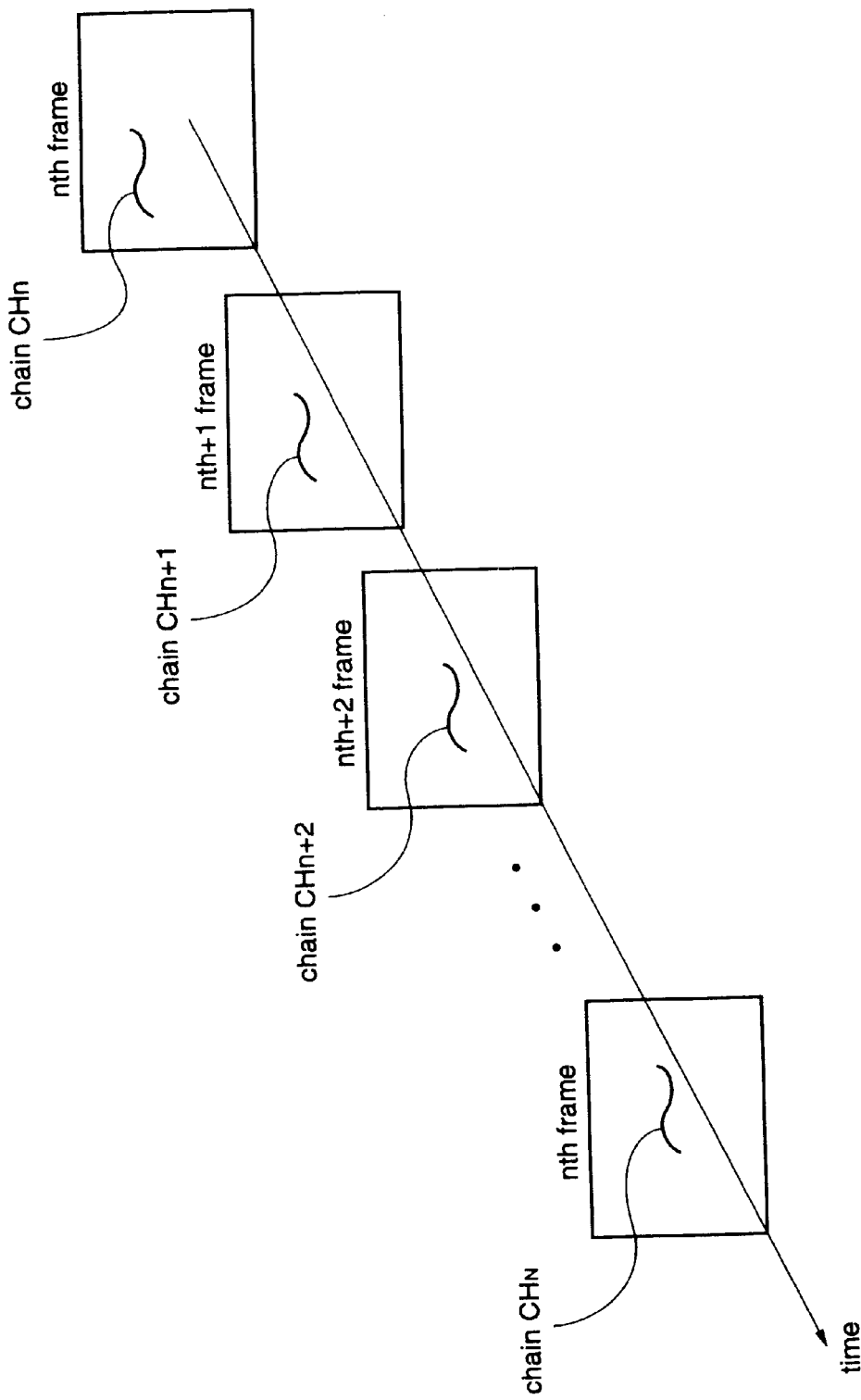
FIG. 42 is a view illustrating the decoded image outputted by the image decoding device of FIG. 40.

FIG. 42 shows the decoded image obtained by decoding the multiplexed chain encoded image obtained by taking the chain $CH_n$ existing at the nth frame as the foundation chain as described in FIG. 27. The chain $CH_n$ of the nth frame present at the foundation chain can be obtained by chain decoding the chain encoded data included in the demultiplexed chain encoded data. Further, the chain $CH_{n+1}$ of the n+1th frame can be obtained by motion compensating the decoded chain $CH_n$ in accordance with the motion vector going from the chain $CH_n$ to the following frame included in the multiplexed chain encoding data. Further, the chain $CH_{n+2}$ of the n+2th frame can be obtained by motion compensating the chain $CH_{n-1}$, obtained by motion compensating the chain $CH_n$, in accordance with the motion vector going from the chain $CH_{n+1}$ to the following frame included in the multiplexed chain encoded data. The chains up to the chain $CH_N$ of the Nth frame connected with the foundation chain $CH_n$ are obtained in the same way.

Next, the chain encoded data is data for chains existing at the fewer frame when the similar chain detector 15 of the image encoding device is constructed in the way shown in FIG. 28. In this case, the when the selector 75 received foundation chain data from the image constructor 74, this foundation data is outputted to and stored at the RAM $76_n$ being suffixed with the frame number n of the fewer frame. The frame number of the fewer frame can be included in the multiplexed chain encoded data at the select multiplexer 16 of FIG. 2. Then, although this is not shown in FIG. 40, the frame number of the fewer frame is then separated from the multiplexed chain encoded data at the separator 72 and provided to the selector 75. Then, at the selector 75, the foundation chain data is stored at the RAM 76 (one of RAM $76_1$ to $76_N$) based on the frame number from the separator 72.

Further, foundation chain data outputted by the image constructor 74 is also provided to the motion compensator 77 as well as the selector 75. When the foundation chain data from the image constructor 74 is then received at the motion compensator 77, motion compensation is carried out on this foundation chain data in step S114 in accordance with motion vectors outputted by the separator 72.

Namely, motion vectors (hereinafter referred to as "previous direction motion vectors") intervening up until the most previous frame with respect to time at which chains connected with the foundation chain exist and motion vectors going to the following frames (hereinafter referred to as "following direction motion vectors") intervening up until the most following frame with respect to time existing at a chain which is connected to the foundation frame are outputted from the dividing circuit 72. Then, at the motion compensator 77, image data (hereinafter referred to as the "first previous frame chain data") for the chain existing at the previous frame of the frame existing at the foundation frame is generated by motion-compensating (the foundation chain) in accordance with the first previous direction motion vector from the separator 72. Further, image data (hereinafter referred to as the "second previous frame chain data") for the chain existing at the next previous frame (i.e. the previous frame for the frame at which the first previous frame chain data exists) previous to the frame previous to the frame at which the foundation chain exists can be generated by motion compensating the first previous frame chain data at the motion compensator 77 in accordance with the second previous direction motion vector from the separator 72.

In the same way, motion compensation processing is carried out at the motion compensator 77 using all of the previous direction motion vectors outputted from the separator 72. First to M1th previous frame chain data is therefore generated at the motion compensator 77 when the number of previous direction motion vectors outputted from the separator 72 is M1 (where M1<N).

Further, at the motion compensator 77, image data for the chain existing at the frame following the frame at which the foundation chain exists (hereinafter referred to as the "first following frame chain data") is generated by motion-compensating the foundation chain in accordance with the first forward direction motion vector from the separator 72. Moreover, image data for the chain existing at a further following frame (i.e. the frame following the frame at which the first following frame chain data exists) following the frame following the frame at which the foundation chain exists is generated at the motion compensator 77 by motion-compensating the chain vector for the first following frame in accordance with the second following direction motion vector from the divider 72.

Motion compensation processing is then carried out at the motion compensator 77 using all of the following direction motion vectors outputted from the separator 72. Therefore, when the number of following direction motion vectors outputted from the separator 72 is M2 (where M2<N), first and second following frame chain data is generated at the motion compensator 77.

When the similar chain detector 15 of the image encoding device is constructed in the way shown in FIG. 28, the previous direction motion vector number M1 and the forward direction motion vector number M2 are included in the multiplexed chain encoded data, as can be seen from that described in FIG. 38B and FIG. 39. These numbers M1 and M2 are separated from the multiplexed chain encoded data at the separator 72 and provided to the motion compensator 77. In this way, motion compensation processing due to the previous direction motion vectors is carried out only M1 times and motion vector compensation processing is carried out only M2 times.

The first to M1th previous frame chain data and the first to M2th following frame chain data generated by the motion compensator 77 is outputted to the selector 75. When the selector 75 receives the first to M1th previous frame chain data and the first to M2th following frame chain data, the first to M1th previous frame chain data is stored in RAM $76_{n-1}$ to $76_{n-M1}$, respectively, and the first to M2th following frame chain data is stored in RAM $76_{n+1}$ to $76_{n+M2}$, respectively.

The continuous M1+M2+1 frames of chain data (n−M1th frame to n+M2 frames of chain data, respectively) are stored in RAM $76_{n-M1}$ to $76_{n+M2}$, respectively.

When data for all of the chains existing at the N-frames is stored in RAM $76_1$ to $76_N$, data is read out from RAM $76_1$ to $76_N$ in order by the read circuit 78, outputted to the monitor, and displayed.

Figure 43:
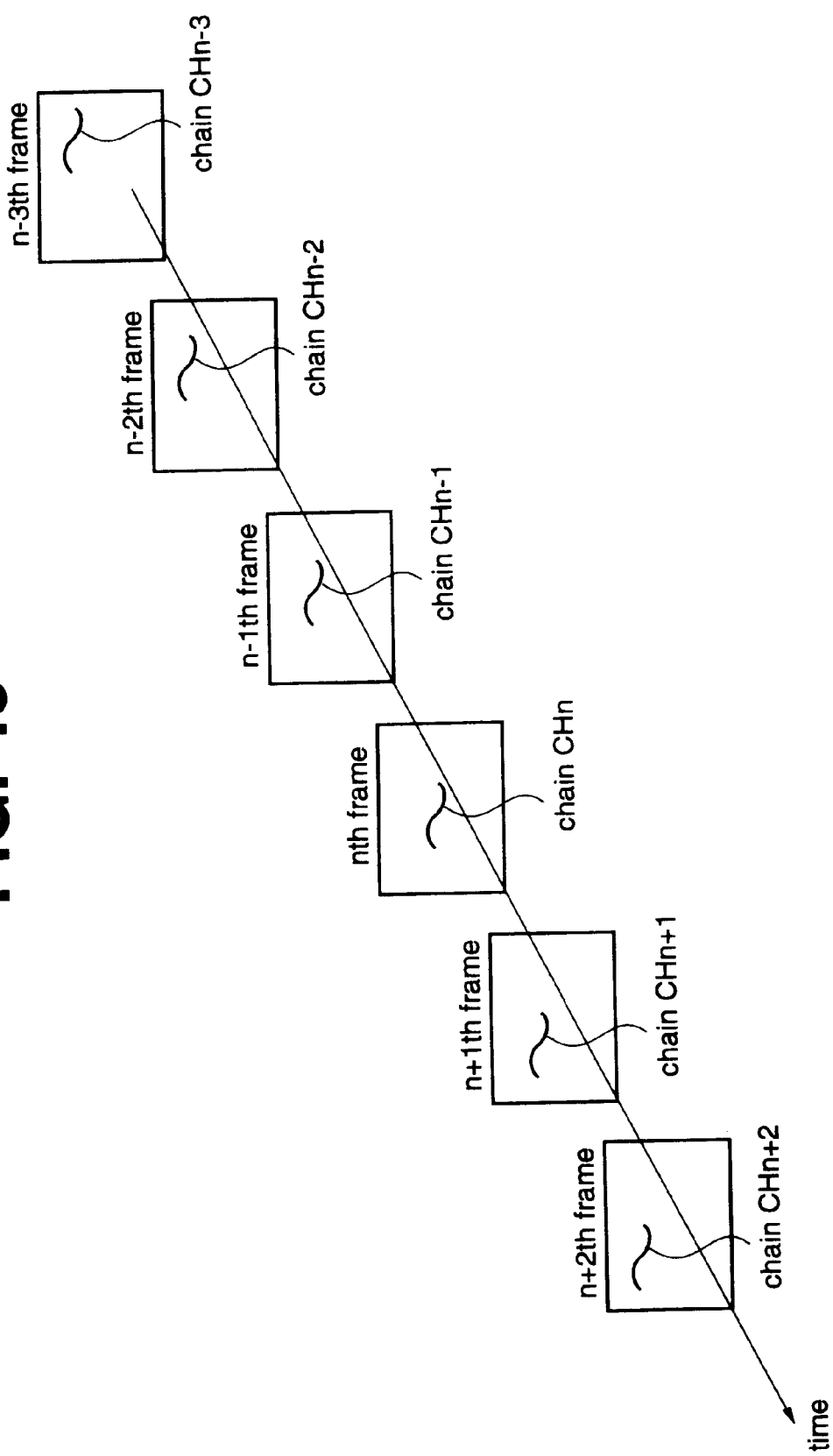
FIG. 43 is a view illustrating the decoded image outputted by the image decoding device of FIG. 40.

FIG. 43 shows decoded images obtained by decoding multiplexed chain encoded data obtained by taking the chain $CH_n$ existing at the nth frame as the foundation chain, as described in FIG. 39. The chain $CH_n$ of the nth frame present at the foundation chain can be obtained by chain decoding chain encoded data included in the multiplexed chain encoded data. Further, The chain $CH_{n-1}$ of the n−11th frame can be obtained by motion-compensating the decoded chain $CH_n$ in accordance with the motion vector from the chain $CH_n$ to the previous frame, included in the multiplexed chain encoded data. Moreover, the chain $CH_{n-2}$ of the n−2th frame can be obtained by motion-compensating the chain $CH_{n-1}$ obtained by motion compensating the chain $CH_n$ in accordance with the motion vector from the chain $CH_{n-1}$ to the previous frame, included in the multiplexed chain-encoded data. Similarly, the chain $CH_{n-3}$ of the n−3th frame can be obtained by motion compensating the chain $CH_{n-2}$ obtained by motion-compensating the chain $CH_{n-1}$ in accordance with the motion vector from the chain $CH_{n-2}$ to the previous frame, included in the multiplexed chain-encoded data.

Still further, the chain $CH_{n+1}$ of the n+1th frame can be obtained by motion compensating the decoded chain $CH_n$ in accordance with the motion vector from the chain $CH_n$ to the following frame, included in the multiplexed chain encoded data. Moreover, the chain $CH_{n+2}$ of the n+2th frame can be obtained by motion compensating the chain $CH_{n+1}$ obtained by motion compensating the chain $CH_n$ in accordance with the motion vector from the chain $CH_{n+1}$ to the following frame, included in the multiplexed chain encoded data.

As shown in FIG. 39, the chains included in the original image are divided up into two chains at the n−2th frame, three chains at the n−1th frame and two chains at the n+2th frame. However, according to the image decoding device of FIG. 40, motion compensation is carried out based around a foundation chain. Therefore, as shown in FIG. 43, the two chains of the n−2th frame, the three chains of the n−1th frame and the two chains of the n+2th frame are all decoded as one chain. However, chains decoded in this way are connected at the image encoding device in such a manner as to comprise the same outline. In this way, problems with regards to viewing do not occur even when decoding (these chains) as a single chain. Rather, in this case, a chain which has been divided into two or more for whatever reason is displayed as a single chain and the outline of the image is therefore clear.

Second Embodiment

Figure 44:
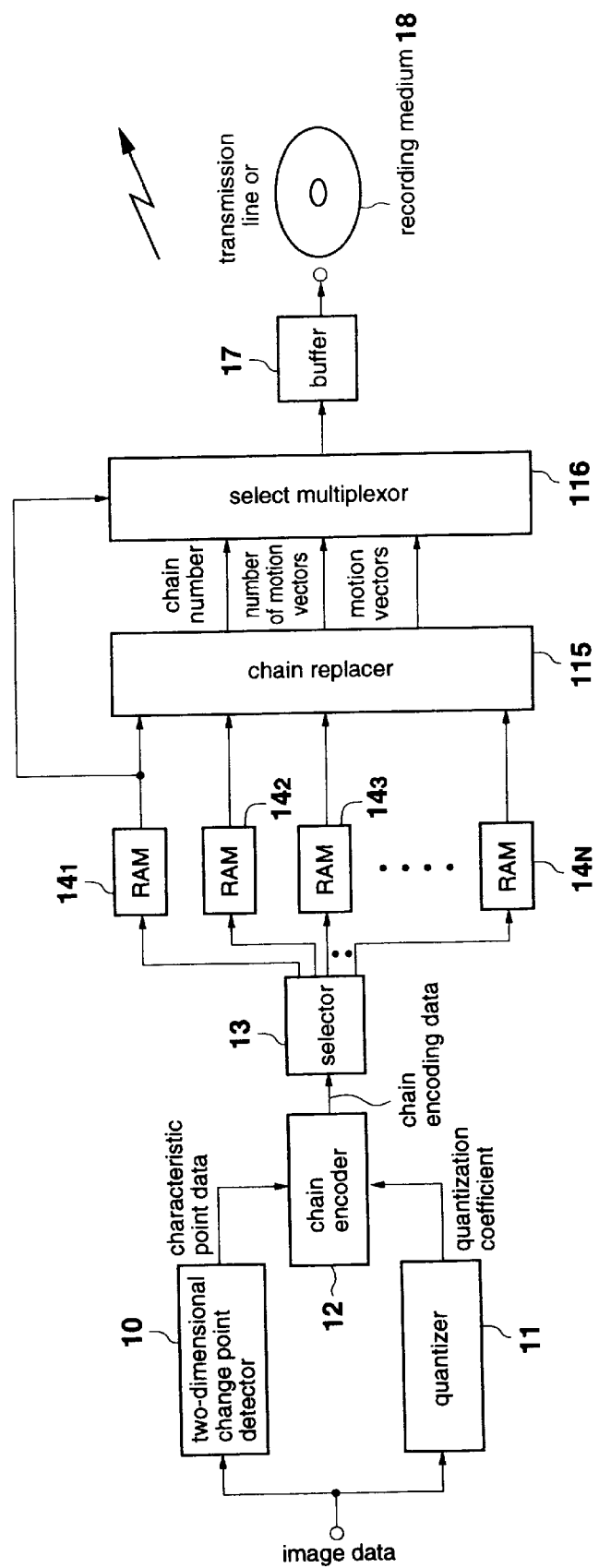
FIG. 44 is a block diagram showing the structure of a second embodiment of the present invention applied to an image decoding device.

FIG. 44 shows the structure of a second embodiment of the present invention applied to an image encoding device. Portions corresponding to portions occurring in the case in FIG. 2 are given the same numerals. Namely, a chain replacer 115 and a select multiplexer 116 are provided in place of the similar chain detector 15 and the select multiplexer 16, with other aspects of this image encoding device being the same as for the image encoding device of FIG. 2.

At the chain replacer 115, a certain chain (i.e. a certain chain stored in the RAM 141) existing at the first frame is shifted in accordance with a motion vector going from this chain to the following frame and a degree of importance (visual significance) showing the visual significance of this chain at the following frame after this chain (hereinafter referred to as the shifted chain) has been shifted is calculated. Further, when the degree of importance is greater than or equal to the prescribed threshold value T1, the chain replacer 115 replaces this shifted chain with a chain of the chains existing in the following frame at the periphery of this shifted chain and then carries out the same processing taking this following frame as a target until the degree of importance is no longer greater than or equal to the threshold value T1 or until the process has been carried out for the N frames. After this, the chain replacer 115 decides upon the chain encoded data corresponding to the chain for the first frame used first and the motion vectors going to interceding following frames from the first frame to the last frame for which chain replacing has been carried out as the items to be multiplexed at the select multiplexor 116 and outputs the chain number of the chain for the first frame used first, the number of chains for which chain replacing has been carried out, and the motion vectors from the first frame until the final frame for which chain replacement has been carried out to the select multiplexer 116.

The select multiplexer 116 reads chain encoded data for the chain corresponding to the chain number from the chain replacer 115 from the RAM 141, produces multiplexed chain encoded data by multiplexing this chain encoded data, motion vectors from the chain replacer 115 and the number of these vectors and outputs this multiplexed chain encoded data to the buffer 17.

Figure 45:
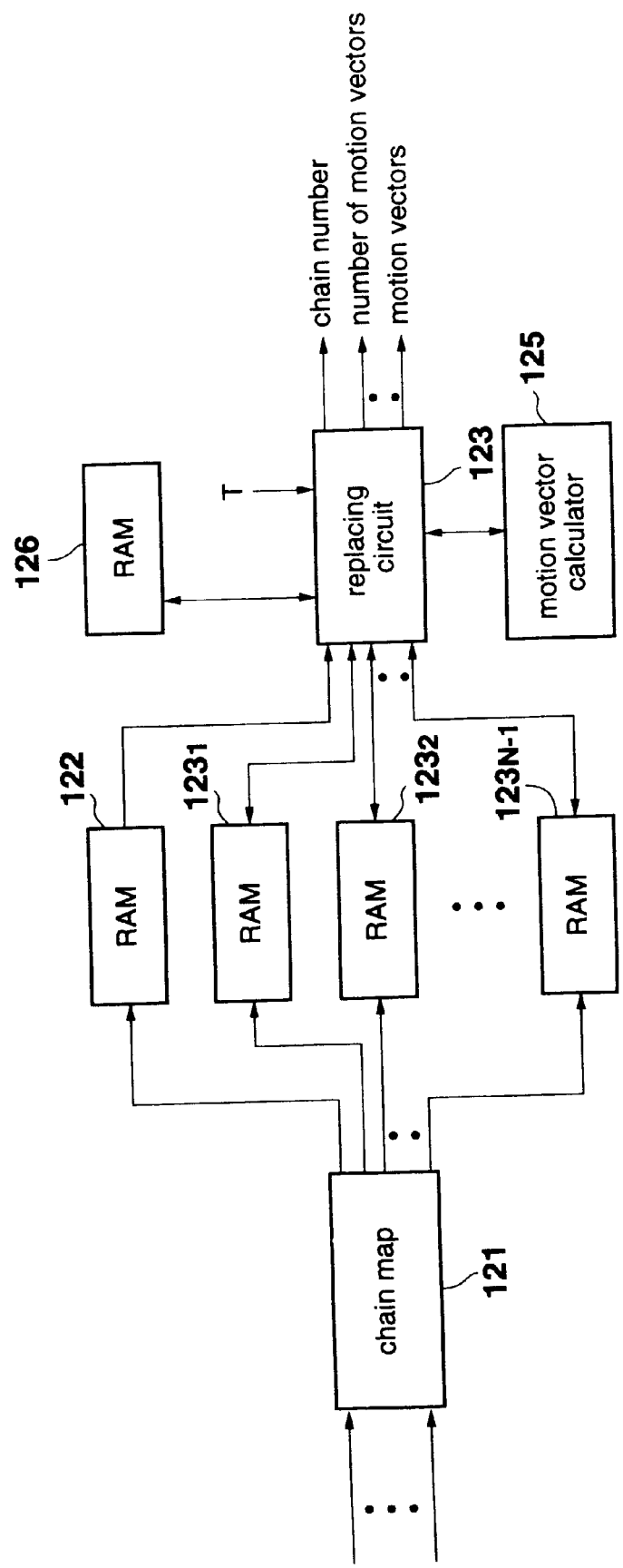
FIG. 45 is a block diagram showing an example of the structure of the chain replacing circuit 115 shown in FIG. 44.

FIG. 45 is a view showing an example of the structure for the chain replacer 115 shown in FIG. 44. When a chain mapping circuit 121 stores N-frame portions of chain encoded data in the RAM $14_1$ to $14_N$, chain encoded data for the first frame is read from the RAM $14_1$ and provided to the RAM (chain RAM) 122. Further, the chain mapping circuit 121 develops the bitmap for the chains existing at the second to Nth frames at the RAM (Map RAM) $123_1$ to $123_{N-1}$ is the same way as the case for the bitmap 51 shown in FIG. 19.

At the chain mapping circuit 51, the chains were developed as a bitmap using chain numbers as described with reference to FIG. 21, with −1 being stored at addresses corresponding to positions (pixels) where chains do not exist. At the chain mapping circuit 121 shown in FIG. 45, "1" is stored, for example, at addresses corresponding to the position where a chain exists and "0" is stored at addresses corresponding to positions where chains do not exist. Namely, when chains CH1 to CH5 exist at the nth frame (where, in this case, n≠1) as shown, for example, in FIG. 20, the bitmap shown in FIG. 46 is developed at the RAM $123_{n-1}$.

Figure 47:
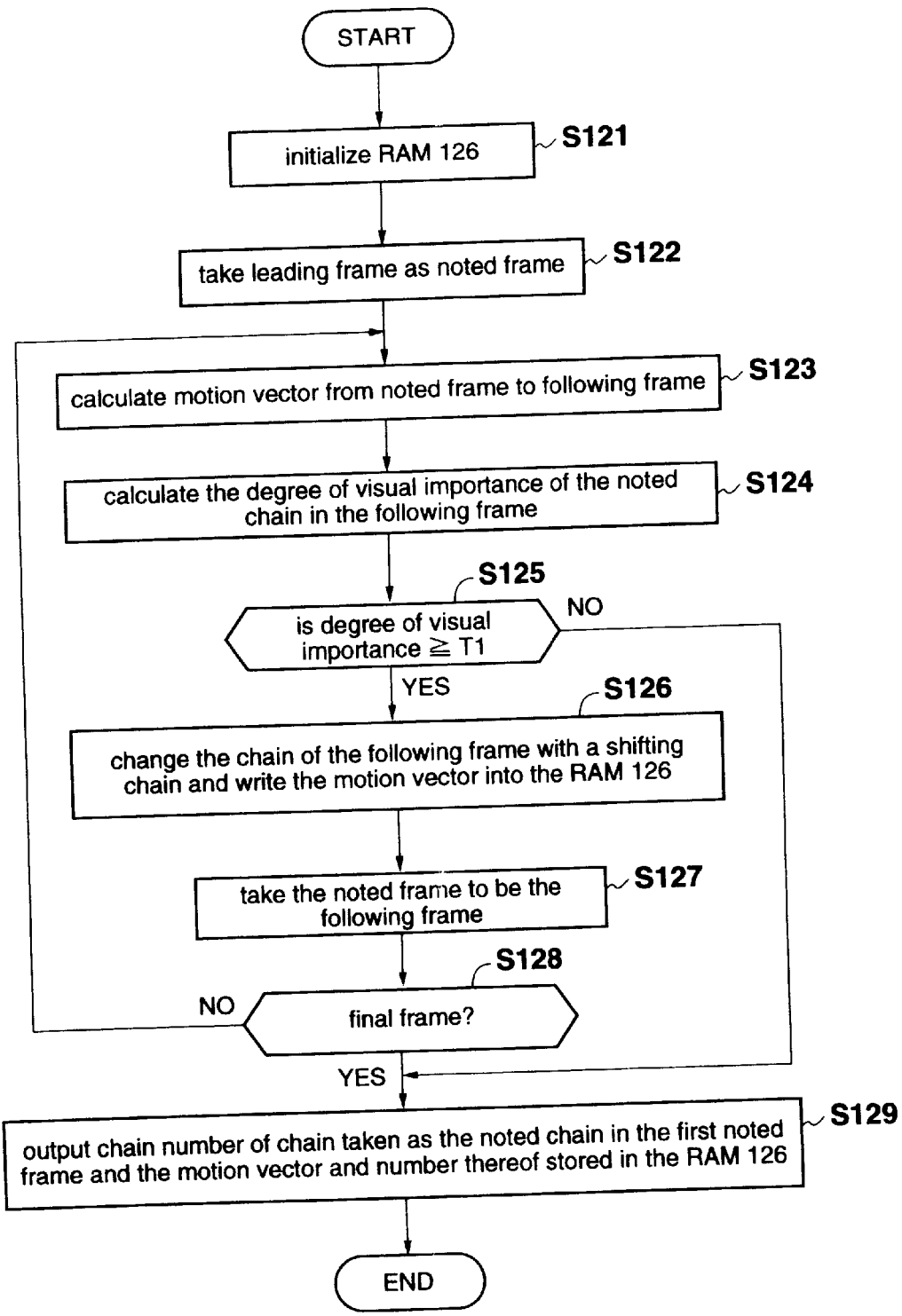
FIG. 47 is a flowchart illustrating the operation of the replacing circuit 124 shown in FIG. 45.

When chain encoded data for the first frame is stored at the RAM 122 and bitmaps for the second to Nth frames are developed at the RAM $123_1$ to $123_{N-1}$, a process in accordance with the flowchart of FIG. 47 is carried out for the chains existing at the first frame stored in the RAM 122 at a replacing circuit 124.

First, in step S121, the RAM (motion vector RAM) 126 is initialized, step S122 is proceeded to, the first frame (leading frame) is taken as the noted frame and step S123 is proceeded to. In step S123, a motion vector from a certain chain (noted chain) existing at the noted frame, i.e. the first frame, to a following frame is calculated. The motion vector calculation occurring in step S123 is carried out at a motion vector calculator 125 by the replacing circuit 124 reading and outputting to the motion vector calculator 125 the data necessary in this motion vector calculation from the RAMs 122 and 123 (any of RAMs $123_1$ to $123_N$).

Figure 48A:
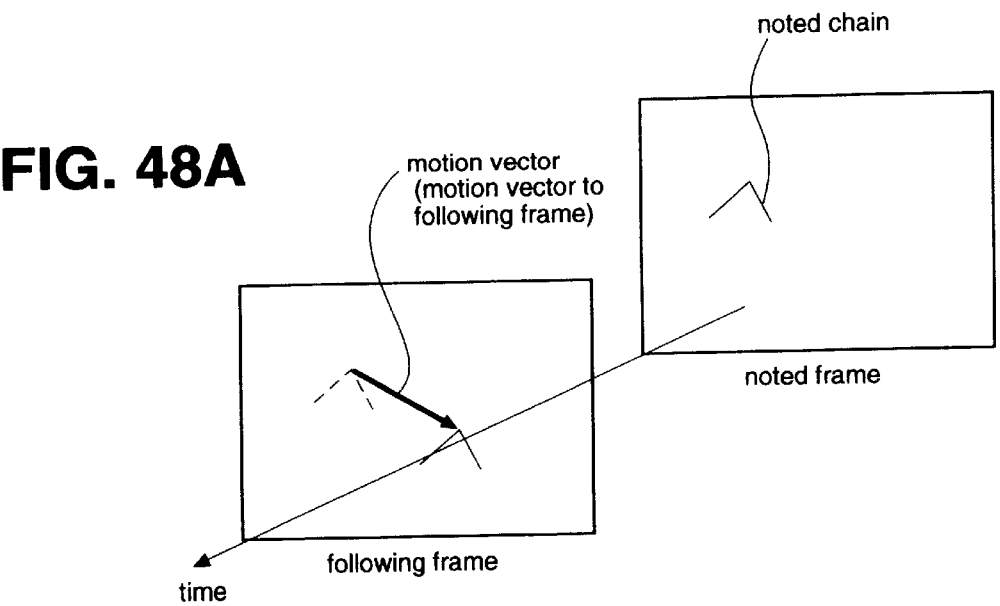
FIG. 48A and 48B are views illustrating the process of step S124 in FIG. 47.
Figure 48B:
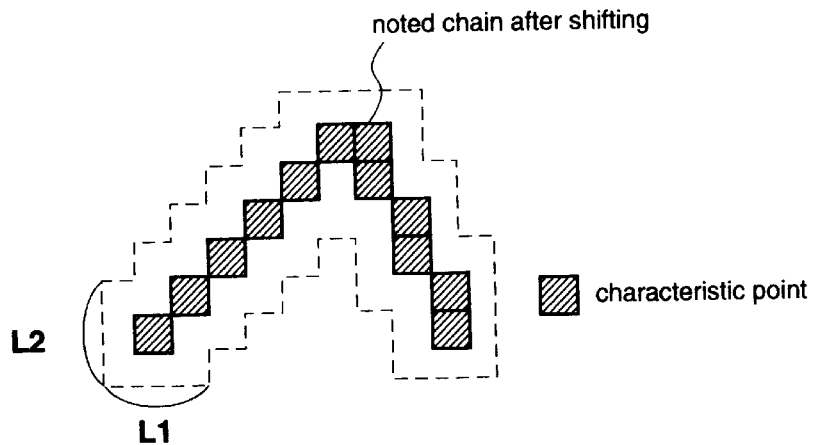

After the motion vector calculation, step S124 is proceeded to, and the degree of importance (visual significance) of the noted frame at the following frame is calculated. In step S124, as shown, for example, in FIG. 48A, the noted chain is shifted in accordance with the motion vector obtained in step S123. Then, at the following frame, as shown in FIG. 48B, the number of characteristic points existing in the L1×L2 pixel range (shown by the dotted line in the drawings) at which the pixels (portions in the drawings given inclined lines) comprising the noted chain after shifting (shifted chain) are at the center of is obtained. Further, in step S124, after the number of characteristic points existing in the L1×L2 pixel range of which each of the pixels comprising the shifted chain are at center of is calculated, this average value (the total number of characteristic points existing at the range of the pixels L1×l2 at which each of the pixels comprising the shifted chain are positioned at the center) is obtained and is taken as the degree of importance.

Here, "1" is stored at addresses corresponding to pixels (characteristic points) comprising chains existing at the n+1th frame at RAM $123_n$, as shown in FIG. 46, with "0" being stored at other addresses. When the frame currently taken as the noted frame is then taken to be the nth frame, in step S124, the bitmap stored in the RAM $123_n$ is referred to and the number of characteristic points existing at the range of the L1×L2 pixels taking each of the pixels comprising the shifted chain as center is calculated for the following frame (in this case, the n+1th frame) by calculating the total of the values stored in addresses corresponding to the range of the L1×L2 pixels (for example, L1=L2=3) taking each of the pixels comprising the shifted chain as center.

The degree of importance calculated above gives the density of the characteristic points existing at the range of the L1×L2 pixels centered about each of the pixels comprising the shifted chain and can also be adopted for amounts other than the density of these kinds of characteristic pixels.

For example, at the following frame, the number of pixels of the pixels comprising the shifted chain existing within the L1×L2 pixel range centered about each of the pixels comprising the shifted chain is subtracted from the number of pixels comprising the chain and the value obtained can then be taken as the degree of significance. Further, image data for the second to Nth frames is stored, for example, at the RAM $123_1$ to $123_{N-1}$. This data is then referred to and the edge intensities (the edge intensities of pixels existing at shifted chains of the following frame) of the pixels corresponding to each of the pixels comprising the shifted chain are calculated for the following frame. It is also possible to then take the average value of these edge intensities as a degree of importance, etc.

After calculating the degree of importance, step S125 is proceeded to and a determination is made as to whether or not this degree of importance is equal to or greater than a prescribed threshold value T1. When a determination is made in step S125 that the degree of importance is not equal to or greater than the prescribed threshold value T1, it is taken that a chain connected to the noted chain (roughly overlapping with the noted chain after shifting) does not exist in the following frame, step S126 to S128 are skipped and step S129 is proceeded to. When it is determined in step S125 that the degree of importance is equal to or greater than the prescribed threshold value T1, i.e. when a chain connected with the noted chain exists in the following frame, step S126 is proceeded to and the chain of the following frame is replaced with the shifted chain (this replacing is the confirming at the replacing circuit 124 that the chain of the following frame intended to be connected with the noted chain is replaced with the noted chain).

Further, in step S126, the motion vector going to the following frame calculated in step S123 is stored in the RAM 126 and step S127 is proceeded to. Also, in step S126, the update processing of the RAM 123 is carried out. Namely, when a chain to be connected to the noted chain exists in the following frame and this chain is replaced with the shifted chain, it is not necessary to take this chain as a processing target. Therefore, when, for example, in step S126, the currently noted frame is taken to be the nth frame, the values of the bitmap for the n+1th frame stored at the RAM $123_n$ stored at addresses corresponding to ranges of L1×L2 pixels taking each of the pixels comprising the shifted chain as centers are all taken to be "0". In this way, at the n+1th frame, the characteristic points within the L1×L2 pixel range centered about each of the pixels comprising the shifted chain are, so to speak, eliminated.

After this, the following frame is taken to be the new noted frame in step S127, step S128 is proceeded to and a determination is made as to whether or not the noted frame is the Nth frame (final frame). When the noted frame is determined not to be the Nth frame in step S128, step S123 is returned to, the chain replaced in step S126 (shifted chain) existing at the frame taken as the new noted frame in step S127 is taken as the noted chain and the process from step S123 onwards is carried out.

When it is determined in step S128 that the new noted frame is the Nth frame, step S129 is proceeded to. The chain taken as the first noted chain present in the chains of the frame (i.e. the first frame) taken as the noted frame in step S22 is taken as the foundation chain, and this chain number (number given to each chain when the chain encoded data is stored in the RAM 122), motion vector (motion vector going to following frame) stored in RAM 126 and number of this motion vector are outputted to the select multiplexer 116, and processing is complete.

As described above, the process shown in FIG. 47 is carried out for all of the chains existing in the first frame.

At the select multiplexer 116, as described above, chain encoded data for the foundation chain existing at the first frame is read from the RAM $14_1$. The chain encoded data, motion vectors from the chain replacer 115 and the number of vectors are then multiplexed and outputted as multiplexed chain encoded data.

For example, when the chains $CH_1$ to $CH_N$ present at the first to Nth frames are connected, as shown in FIG. 49, the chain encoded data for the chain $CH_1$, the motion vectors going from the chain $CH_1$ to the chain $CH_{N-1}$ and this number N−1 are multiplexed and then outputted.

Chains capable of replacing (connecting with) the noted chain of the first frame are outputted as chain encoded data for this noted chain (foundation chain) and motion vectors for shifting (motion compensating) this chain and decoding other chains. The amount of time consumed can therefore be reduced and the efficiency of the compression of the image can therefore be improved.

As shown in FIG. 45, it is also possible to develop the first bitmap on the RAM 122 in the same way as the case occurring at the RAM $123_1$ to $123_{N-1}$. In this case, the RAM 122 has to be a frame memory capable of storing a bitmap for one frame portion and must therefore have a large storage capacity. With regards to this, as described above, when chain encoded data existing at the first frame is stored at the RAM 122, the amount of data for one frame portion of chain encoded data is smaller than for a bitmap for one frame portion and a RAM having a small storage capacity can therefore be used for the RAM 122.

According to the image encoding device of FIG. 44, as described above, improvements in the efficiency of compressing image data can be achieved. However, the process shown in FIG. 47 can only be carried out for chains existing in the first frame. When chains are then first seen in frames from the second frame onwards (for example, when scenes change etc., in frames from the second frame onwards), information for these chains is not outputted from the select multiplexer 116 and decoding of these chains on the decoding side is therefore difficult.

Third Embodiment

Figure 50:
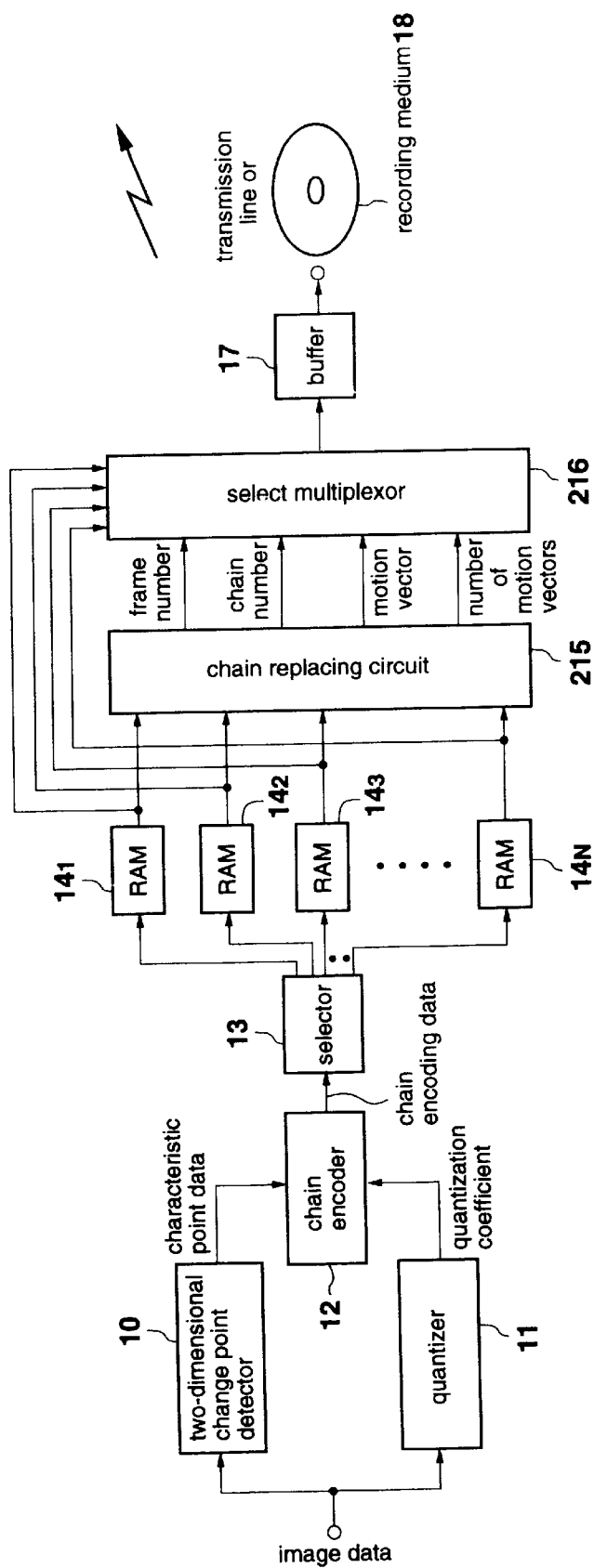
FIG. 50 is a block diagram showing the structure of a third embodiment of the present invention applied to an image encoding device.

FIG. 50 shows the structure of a third embodiment of the present invention applied to an image encoding device. Portions corresponding to portions in FIG. 44 are given the same numerals, i.e. other than a chain replacer 215 and a select multiplexer 216 being provided in place of the chain replacer 115 and the select multiplexer 216, the structure is the same as the structure of the image encoding device of FIG. 44.

The chain replacer 215 does not only carry out the same process for the chain replacer 115 shown in FIG. 44 for the chain existing in the first frame, but also carries out this process taking chains existing at the second frame onwards as targets and outputs the frame numbers, chain numbers, motion vectors and number of motion vectors to the select multiplexer 216.

The select multiplexer 216 reads chain encoded data for chains corresponding to chain numbers from the chain replacer 215 from RAM $14_n$ suffixed with the same frame number n from the chain replacer 215. This chain encoded data, is then multiplexed together with the motion vectors from the chain replacer 215 and the number of vectors and then outputted to the buffer 17 as multiplexed chain encoded data.

Figure 51:
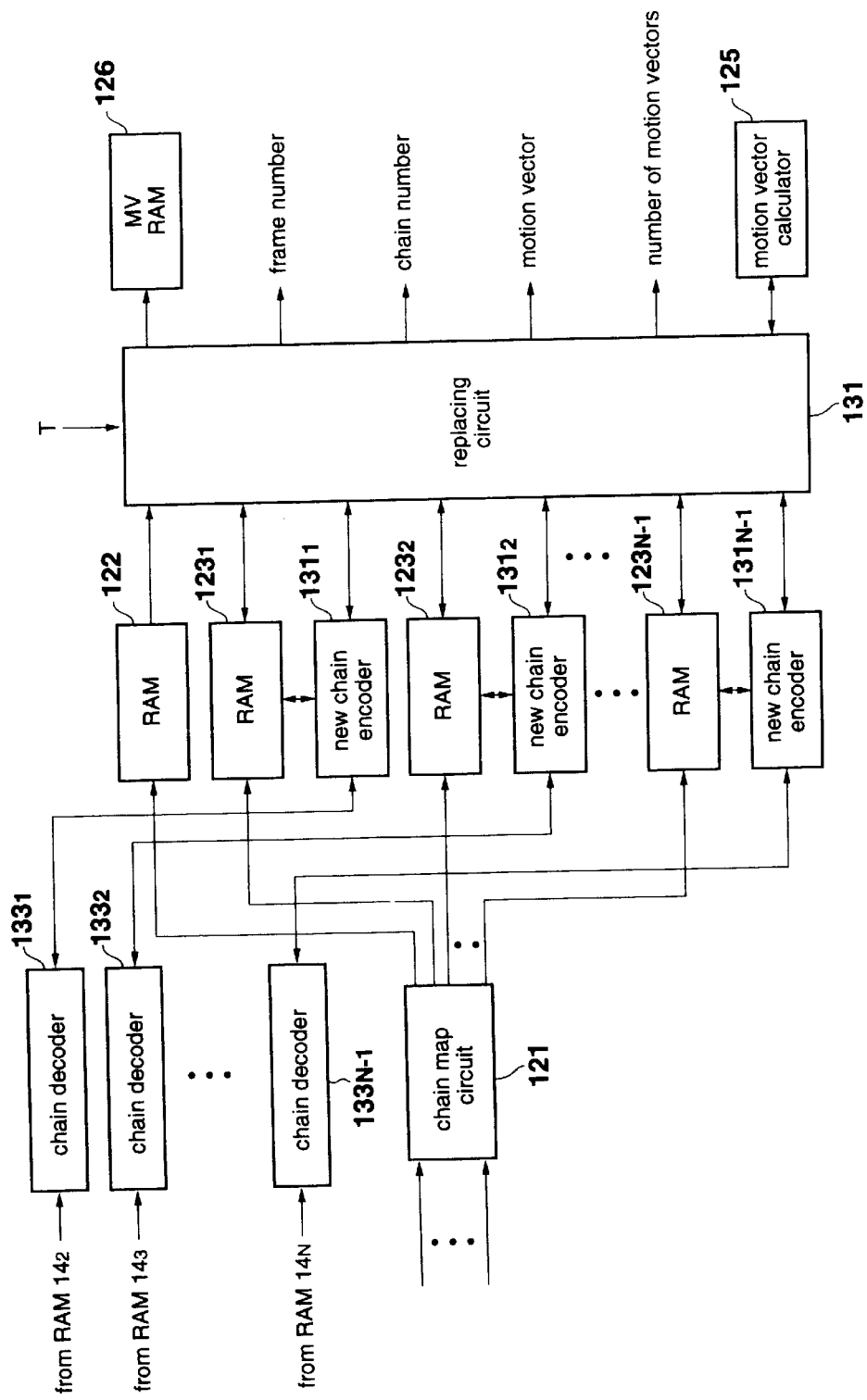
FIG. 51 is a block view showing an example of the structure of the chain replacing circuit 215 shown in FIG. 50.

FIG. 51 shows an example of the structure of the chain replacer 215 shown in FIG. 50. In FIG. 51, portions corresponding to the chain replacer 115 of FIG. 45 are given the same numerals. Namely, other than a replacing circuit 132 being provided in place of the replacing circuit 124 and new chain encoding circuits $131_1$ to $131_{N-1}$ and chain decoding circuits $133_1$ to $133_{N-1}$ being provided, the structure of chain replacer 215 is the same as for the chain replacer 115 of FIG. 45.

With the chain replacer 215 constructed in the above way, in the same way as the case of FIG. 45, the chain encoded data for the first frame is stored at the RAM 122 and the bitmaps for chains for the second to Nth frames are developed over RAM $123_1$ to $123_{N-1}$ respectively. Processing is then carried out at the replacing circuit 132 in accordance with the flowchart of FIG. 52.

First, in step S131, a variable n for counting the number of frames is initialized to "1" and step S132 is proceeded to, with replacement processing based on the nth frame then being carried out. When replacement processing based on this nth frame is complete, the variable n i incremented by "1" in step S133, step S134 is proceeded to and a determination is made as to whether or not the variable n is less than the processing unit frame number N. When n is determined to be less than N in step S134, step S132 is returned to and replacement processing is once again carried out based on the nth frame. Further, when the variable n is determined to be not less than N in step S134, the process is complete.

Figure 52:
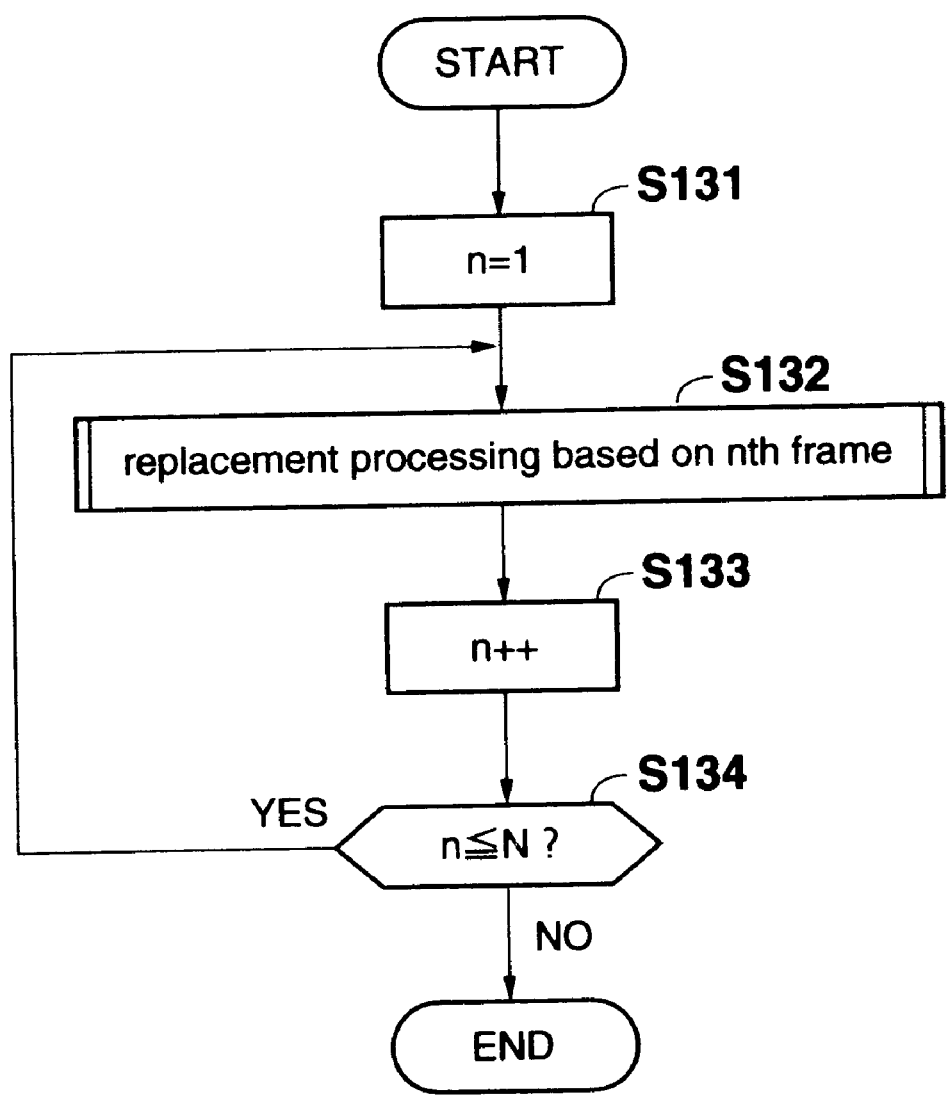
FIG. 52 is a flowchart illustrating the operation of the replacing circuit 132 shown in FIG. 51.
Figure 53:
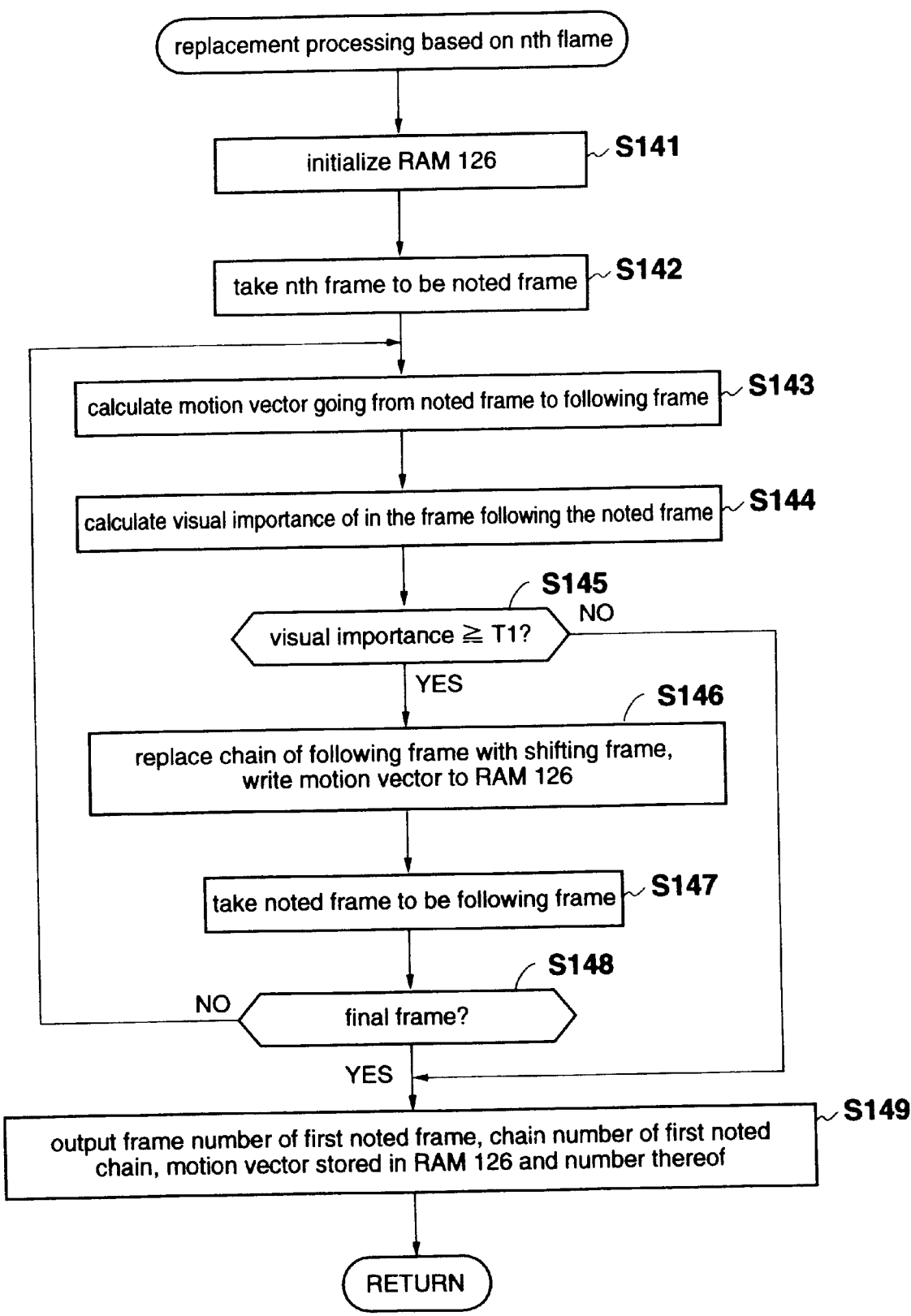
FIG. 53 is a flowchart illustrating the details of the process of step S132 in FIG. 52.

FIG. 53 is a flowchart showing the details of the replacement process based on the nth frame within FIG. 52. This replacement process based on the nth frame is the same as the process occurring in step S121 to S128 of FIG. 47, with the exception that, in step S142 of the process from step S141 to S148, the nth frame is taken as the noted frame, rather than the first frame.

Chain encoded data for the chain existing at the first frame is stored in the RAM 122. Chains existing at the first frame can therefore be identified using the chain encoded data stored at the RAM 122. Then, for example, in step S143, the motion vectors from these chains to the following frame can be calculated. However, with regards to chains existing at the frames from the second frame onwards, only bitmaps for which the value stored in the address corresponding to the position of the characteristic point comprising a chain is "1" are stored on the RAM $123_1$ to $123_{N-1}$. Therefore, in order to recognize chains existing at frames for the second frame onwards, the storage contents of the RAM 124 where the bitmaps for the noted frames are developed are skipped at the replacing circuit 132, re-structuring taking portions of consecutive one's is necessary and processing time is required.

The bitmaps stored at RAM $123_1$ to $123_{N-1}$ are updated in step S146 in the same way as the case in step S126 described in FIG. 47, but it is then necessary to verify these chains at the replacing circuit 132 after updating.

Then, in step S142, when a frame from the second frame onwards is taken as the noted frame, the replacing circuit 132 verifies the chains existing at the frame taken as the noted frame in the following way.

For example, in step S142, when the nth frame is taken as the noted frame (where n is taken to be a variable greater than or equal to 2 and less than or equal to N), the replacing circuit 132 outputs a control signal to the new chain encoding circuit $131_{n-1}$ constructed in the same way as the chain encoding circuit 12 described in FIG. 3. The new chain encoding circuit $131_{n-1}$ receives the control signal from the replacing circuit 132 and controls the chain decoding circuit $133_{n-1}$. In this way, the nth frame of chain encoded data are read from the RAM $14_n$ and the chains are decoded. The nth frame of image data obtained by chain decoding using the chain decoding circuit $133_{n-1}$ is then provided to the new chain encoding circuit $131_{n-1}$ and the new chain encoding circuit $131_{n-1}$ re-encodes the chain while referring to the storage contents of the RAM $123_{n-1}$.

Namely, in addition to the image data for the nth frame, the characteristic point for the nth frame obtained by decoding the chain encoded data for the nth frame is also provided from the chain decoding circuit $133_{n-1}$ to the new chain encoding circuit $131_{n-1}$. There is also a characteristic point for the nth frame from the chain decoding circuit $133_{n-1}$ at the new chain encoding circuit $131_{n-1}$. Points (pixels) corresponding to this characteristic point for which the value stored at the address for the RAM $123_{n-1}$ is "1" is taken as the right characteristic point. The nth frame image data provided from the chain encoding circuit $133_{n-1}$ is then chain encoded and the chain encoded data obtained as a result is outputted to the replacing circuit 132.

The chain encoded data for the nth frame outputted by the new chain encoding circuit $131_{n-1}$ is then used to update the contents of the RAM $131_{n-1}$.

The chains existing at the nth frame are therefore verified at the replacing circuit 132 based on the updated nth frame chain encoded data which updated the contents of the RAM $131_{n-1}$ provided from the new chain encoding circuit $131_{n-1}$.

A unique chain number is given to each chain at the replacing circuit 132 while the chains existing at the nth frame are being verified.

Then, at the replacing circuit 132, in step S149, in the same way as the case in step S129 of FIG. 47, the chain number of the chain first taken as the noted chain, the motion vectors (motion vectors going to the following frame) stored in the RAM 126, the number of motion vectors and the frame number of the frame (the frame taken as the noted frame in step S142) at which the first noted frame exists are outputted to the select multiplexer 216.

The process shown in FIG. 53 is then carried out for all of the chains existing at the nth frame taken as the noted frame in step S142.

As described above, the chain number of the frame number n, together with the motion vectors and number of motion vectors are outputted from the chain replacer 215. Further, chain encoded data for the chain (foundation chain) corresponding to the aforementioned chain number is read from the RAM $14_n$ suffixed with the aforementioned frame number. This chain encoded data, the motion vectors from the chain replacer 215 and the number of motion vectors are then multiplexed at the select multiplexer 216 and outputted as the multiplexed chain encoded data.

For example, as shown in FIG. 54, when chains $CH_1$ to $CH_N$ existing at the first to Nth frames, respectively, are connected, in the same way as the case in FIG. 49, the chain encoded data for the chain $CH_1$, the motion vectors to the following frames for chain $CH_1$ to chain $CH_{N-1}$, and this number N−1 are multiplexed at and then outputted from the select multiplexer 216. Further, as also shown in FIG. 54, when a chain CH2' is seen for the first time at the second frame, the chain CH2' is also connected to the chain (in the embodiment of FIG. 54, this is the chain CH3' of the third frame) to be connected to this chain by carrying out step S132 of FIG. 52 "replacement processing based on the second frame". As a result, the chain encoded data for the chain CH2', the motion vectors going to the following frame for the chain CH2' and this number multiplexed at and then outputted from the select multiplexer 216.

Therefore, in this case, decoding of chains on the decoding side is possible even when these chains are chains which are encountered for the first time at the second frame onwards.

Multiplexed chain encoded data outputted from the image encoding device according to the second and third embodiments of FIG. 44 and FIG. 50 are decoded in the same way as the case described above by the image decoding device described in FIG. 40.

Figure 55A:
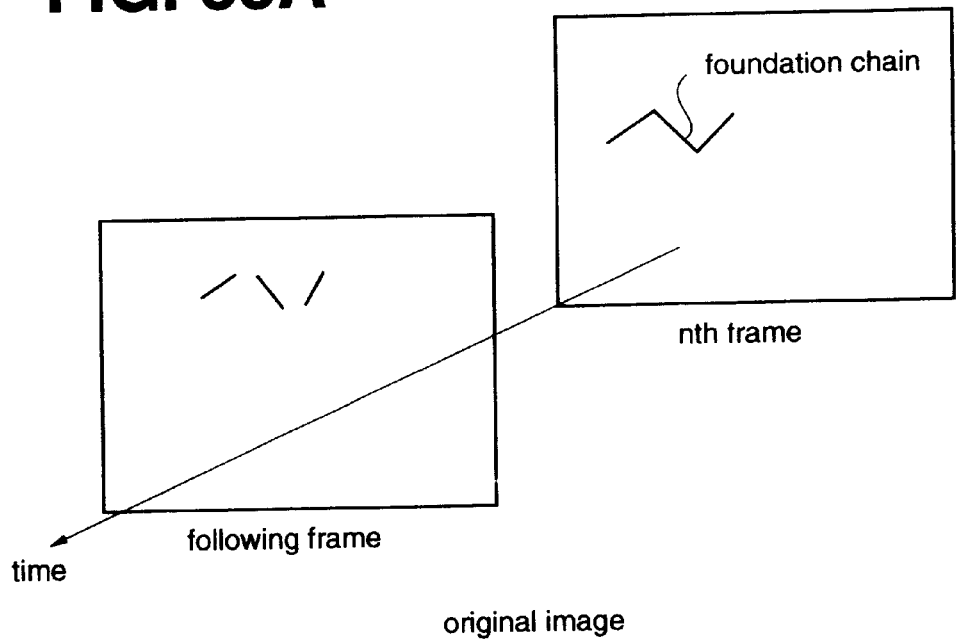
FIG. 55A and FIG. 55B are views illustrating a decoded image obtained by decoding multiplexed chain encoded data outputted by the image encoding device of the present invention.
Figure 55B:
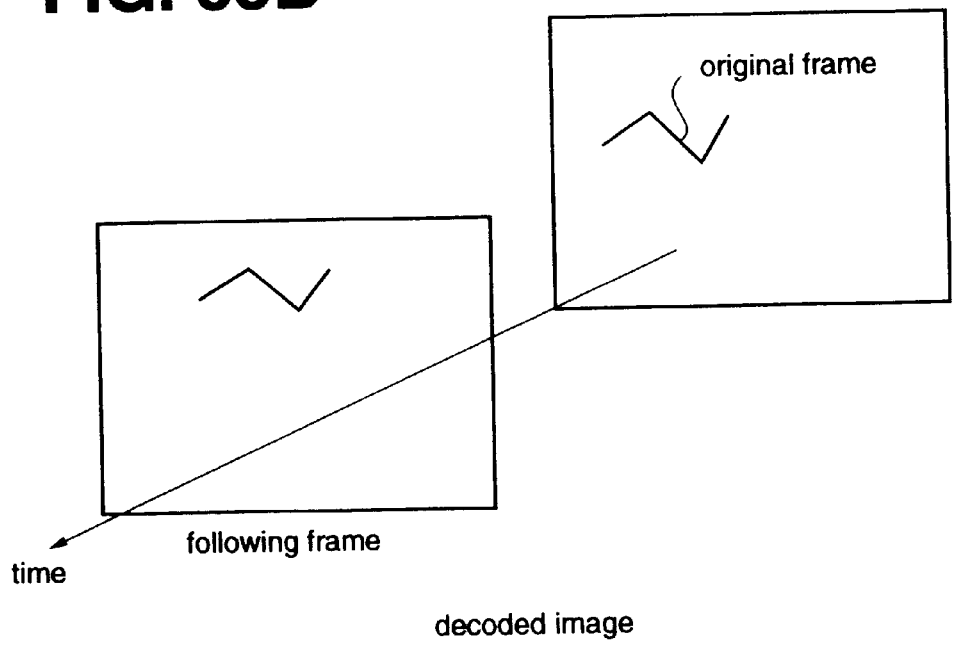
Figure 56A:
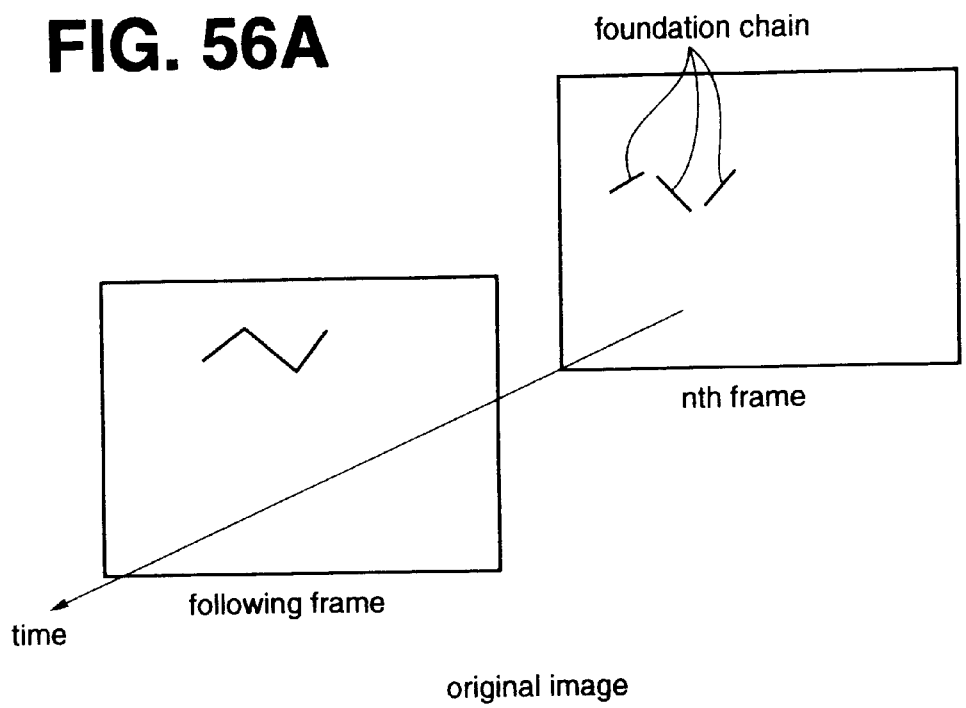
FIG. 56A and FIG. 56B are views illustrating the decoded image obtained by decoding multiplexed chain encoded data outputted by the image encoding device of the present invention.
Figure 56B:
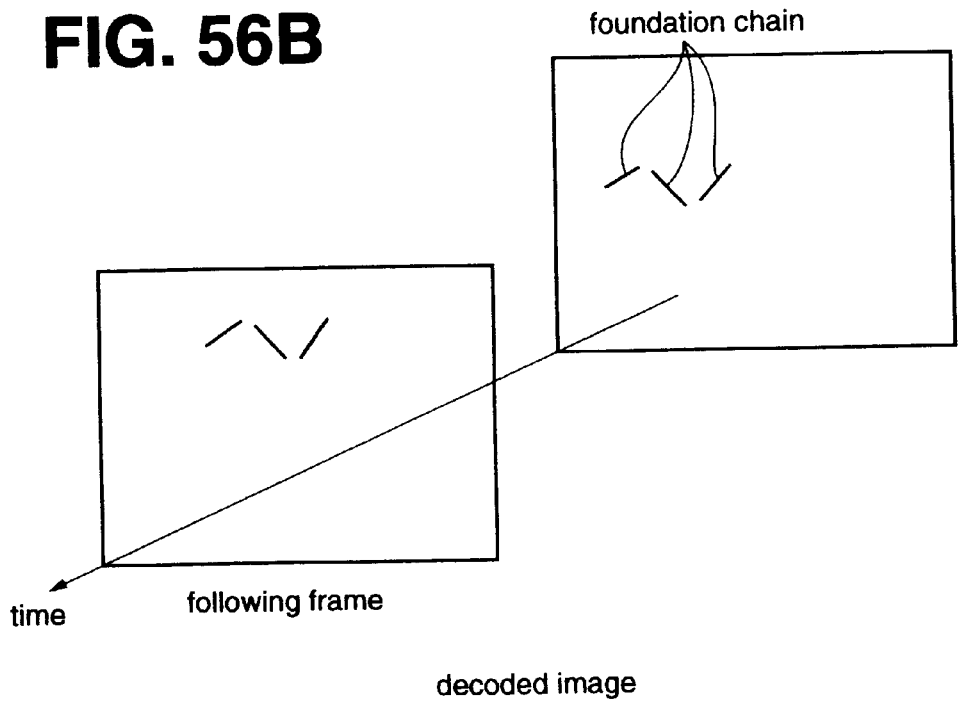

This decoded image is shown in FIG. 55A and FIG. 55B and FIG. 56A and FIG. 56B. Namely, if, for example, as shown in FIG. 55A, a certain frame exists in the original image at the nth frame, with this chain then existing at the following frame in such a manner as to be split-up into three chains, when a chain for the nth frame is taken as the foundation chain and connected (replaced) with the three chains of the following frame, the three chains of the following frame are decoded as one chain, as shown in FIG. 56B, because the chains of the following frame are decoded at the image decoding device by motion vector-compensating the foundation chain.

Further, as shown, for example, in FIG. 56A, if three frames exist at the nth frame of the original image and a single chain linked to this chain exists in the following frame, when the three chains of the nth frame are each respectively taken as foundation chains and linked with (replace) the one chain of the following frame, the one chain of the following frame is decoded as three chains, as shown in FIG. 56B, because the chain for the following frame is decoded at the image decoding device by motion-compensating the foundation chains.

Fourth Embodiment

Figure 57:
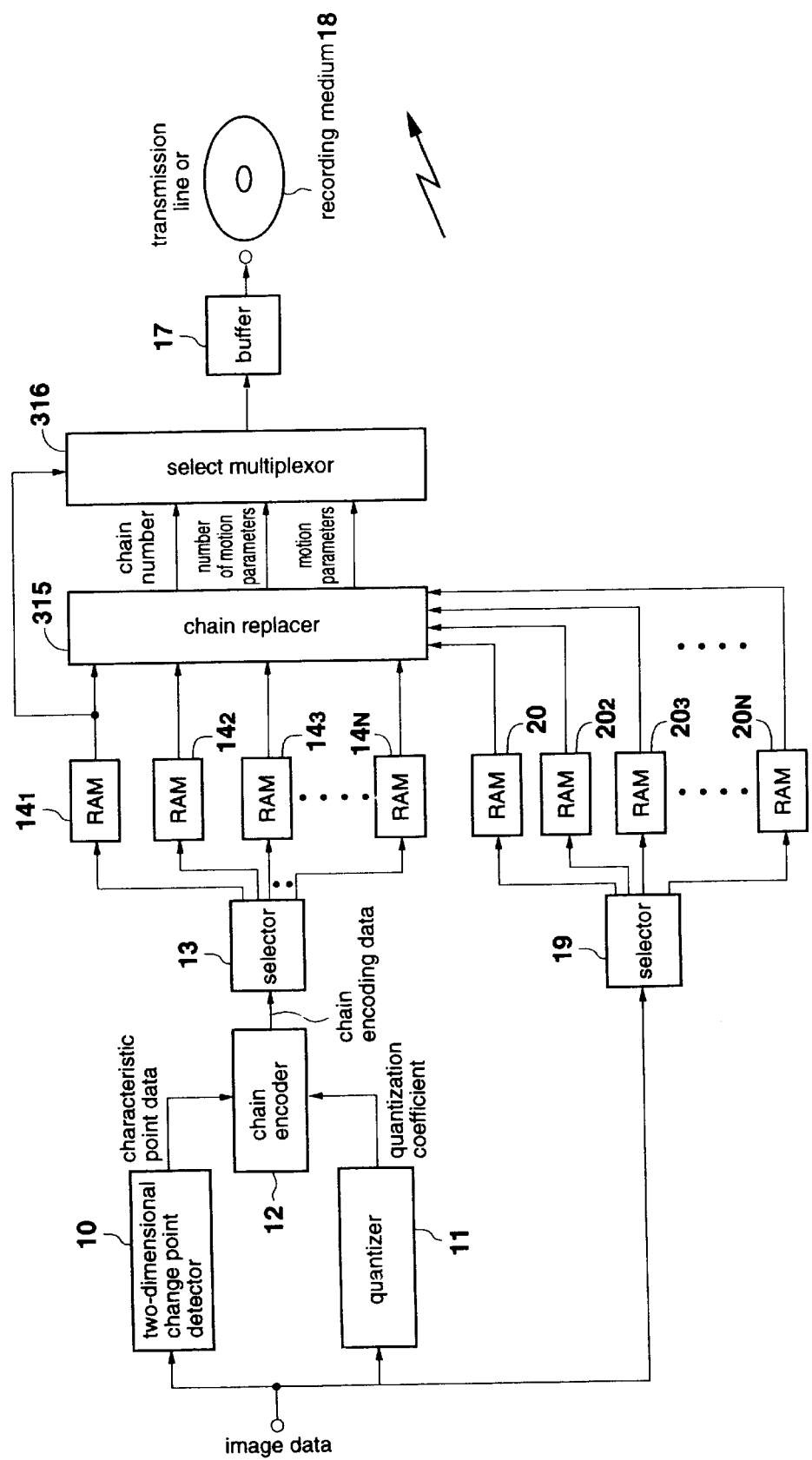
FIG. 57 is a block diagram showing the structure of a fourth embodiment of the present invention applied to an image decoding device.

FIG. 57 is a block view showing the structure of a fourth embodiment of the present invention applied to an image encoding device. The image encoding device of this fourth embodiment is an improvement on the image encoding device of the second embodiment and portions corresponding to the case of FIG. 44 are therefore given the same numerals. In FIG. 57, portions corresponding to the case in FIG. 44 are given the same numerals. In this fourth embodiment, motion parameters are transmitted instead of transmitting motion vectors as in the second embodiment. Before describing this fourth embodiment, the motion vectors and motion parameters of this application will be described.

A motion vector is a vector showing the amount of parallel shifting (more specifically, the amount of parallel shifting and the shifting direction) of a parallel-shifted body. A motion parameter, on the other hand, is a parameter showing not only the motion vector of the amount of shifting when a body is parallel shifted, but also the rate of reduction/enlargement when reduction/enlargement takes place and the amount of rotation when rotating takes place (more specifically, the amount of rotation and the direction of rotation (if one direction is decided for the rotation beforehand, direction of rotation is not necessary), etc.

This image encoding device compression encodes moving images using a structure extraction encoding method. Namely, inputted image data of, for example, moving picture image signals put into digital form is put into the form of chain encoded data by providing this data to a chain encoder 12 via a two-dimensional change point detector 10 and a quantizer 11, as shown in FIG. 1. The chain encoded data is then provided to the selector 13. The selector 13 then stores the chain encoded data in RAM (Chain Code RAM) $14_1$ to $14_N$ in frame units.

Processing is then carried out in N frame units (for example, 15 frame units, etc.) at a following similar chain detector 315 and select multiplexer 316, with the leading frame (first frame) of the N frame units of chain encoded data being stored at the RAM 141, the second frame of chain encoded data being stored at RAM 142, and the nth frame (where n=1, 2, . . . N) of chain encoded data being stored at RAM $14_n$, etc.

When the selector 13 stores the chain encoded data in the RAM 14, a chain number is given to each item of chain encoded data (each chain) as a unique number. The chain numbers accompanying each of these chains (chain encoded data) are then used at the image encoding device of FIG. 57 to identify each chain. The chain number can be a unique to chains existing at each frame, or can be unique to all of the chains existing at the N-frame processing units for the chain replacer 315.

At this image encoding device, the image data is also provided to the selector 19. The selector 19 then stores the image data in RAM $20_1$ to $20_N$ so that the nth frame of image data is stored in the RAM $20_n$, in the same way as the case for the RAM $14_n$.

The N-frame portion of chain encoded data stored at the RAM $14_1$ to $14_N$, the N-frame portion of image data stored in the RAM $20_1$ to $20_N$, and the chain encoded data stored at the RAM $14_n$ at the chain replacer 315 are read out as necessary. The motion parameters going to the following frame (motion parameters for the following frame) are then detected for a certain chain existing at the first frame (i.e. a certain chain stored at the RAM $14_1$). The detection of the motion parameters is carried out at the chain replacer 315 based on the image data stored at the RAM 20.

A degree of importance (visual significance) expressing the visual importance on the following frame of the chain after shifting (hereinafter referred to as the "shifted chain") is then calculated for the chain which has been shifted (not just parallel shifting, but also, rotation and reduction/enlargement, etc. (more specifically, the chain is to be "transformed")).

When the degree of importance is equal to or greater than the prescribed threshold value T, the chain replacer 315 changes chains at the periphery of the shifted chain of chains existing at the following frame over with this shifted chain, with the same process then being carried out taking a further following frame as a target using the chain after replacement in the same way until the degree of importance is no longer greater than or equal to T or until the Nth frame. After this, the chain replacer 315 outputs the chain number of the chain of the first frame used first, the motion parameters going to the following frames intervening between the first frame to the final frame for which chain replacement has been carried out and the number of these motion parameters (the number of frames from the first frame until the last frame for which chain replacement has been carried out) to the select multiplexer 316.

The selector 316 reads out the chain encoded data for the chain corresponding to the chain number from the chain replacer 315 from the RAM $14_1$, multiplexes this chain encoded data together with the motion parameters from the chain replacer 315 and the number of vectors and outputs the resulting multiplexed chain-encoded data. This multiplexed chain-encoded data is outputted to a transmission line or provided to a recording medium such as magnetic tape, an optical disc or a magneto-optical disc and recorded via the buffer 17. The structures of the two-dimensional change point detector 10, the quantizer 11, the chain encoder, the selector 13, the RAM $14_1$ to $14_N$ and the buffer 17 are the same as for the above-described embodiments and their descriptions are therefore omitted.

Figure 58:
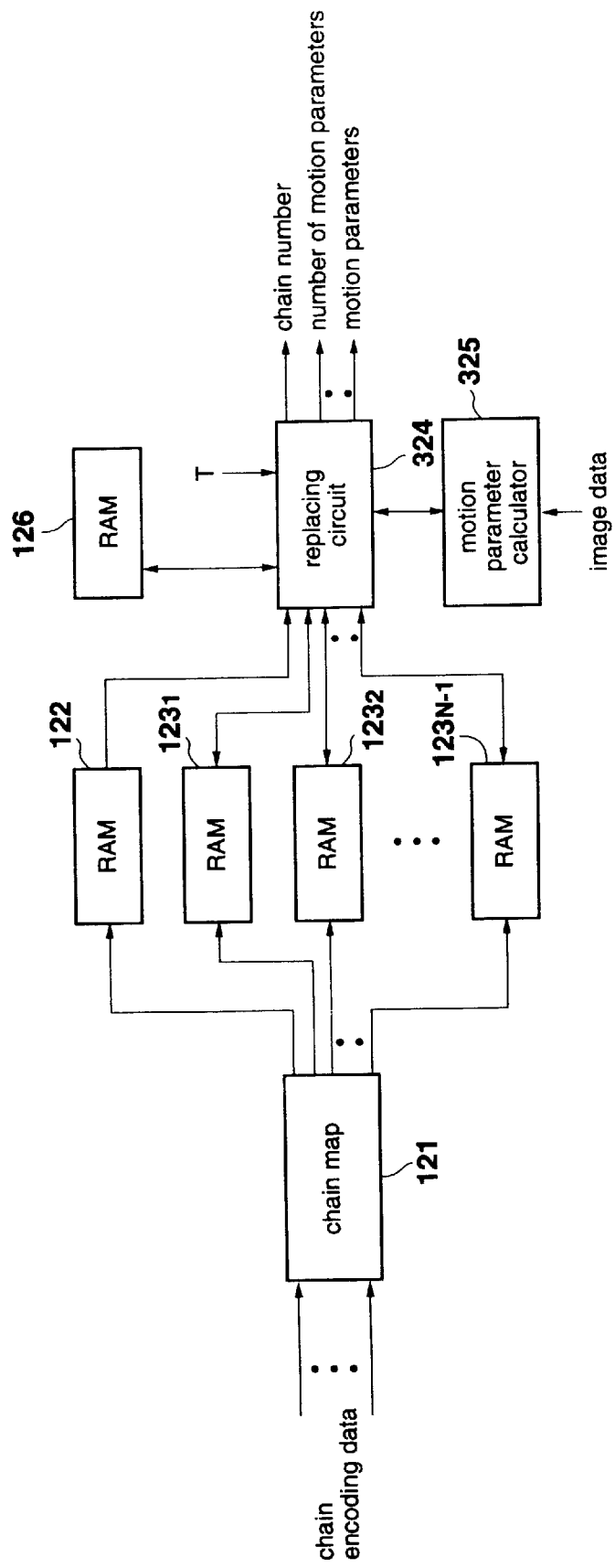
FIG. 58 is a block view showing an example of the structure of the chain replacer 315 shown in FIG. 57.

FIG. 58 shows an example of the structure of the chain replacer 315 shown in FIG. 57. The structure of this circuit is similar to the chain replacer 123 shown in FIG. 45 and portions in FIG. 58 corresponding to portions for the case in FIG. 44 are given the same numbers and their detailed description is omitted. When an N-frame portion of chain encoded data is stored at the RAM 141 to $14_N$, the chain encoded data is read from the RAM $14_1$ and provided to and stored at the RAM (chain RAM) 122.

Further, the chain mapping circuit 121 develops a chain (the chain is consecutive points within the image (strings of consecutive points) linking consecutive characteristic points existing at the second to Nth frames as a bitmap of consecutive points within the image on the RAM (Map RAM) $123_1$ to $123_{N-1}$ (the bitmap for the nth frame is developed on RAM $123_{n-1}$ (i.e. in this case, n is a variable greater than or equal to 2 and less than N) while referring to the start point coordinates, direction data and direction change data (hereafter referred to collectively as the direction components) included in the chain encoded data for the second to Nth frames.

The chain mapping circuit 121, as shown in FIG. 46, stores "1" at addresses of the RAM$123_{n-1}$ corresponding to positions of the nth frame where chains exist, and stores "0" at addresses corresponding to positions where chains do not exist.

Figure 59:
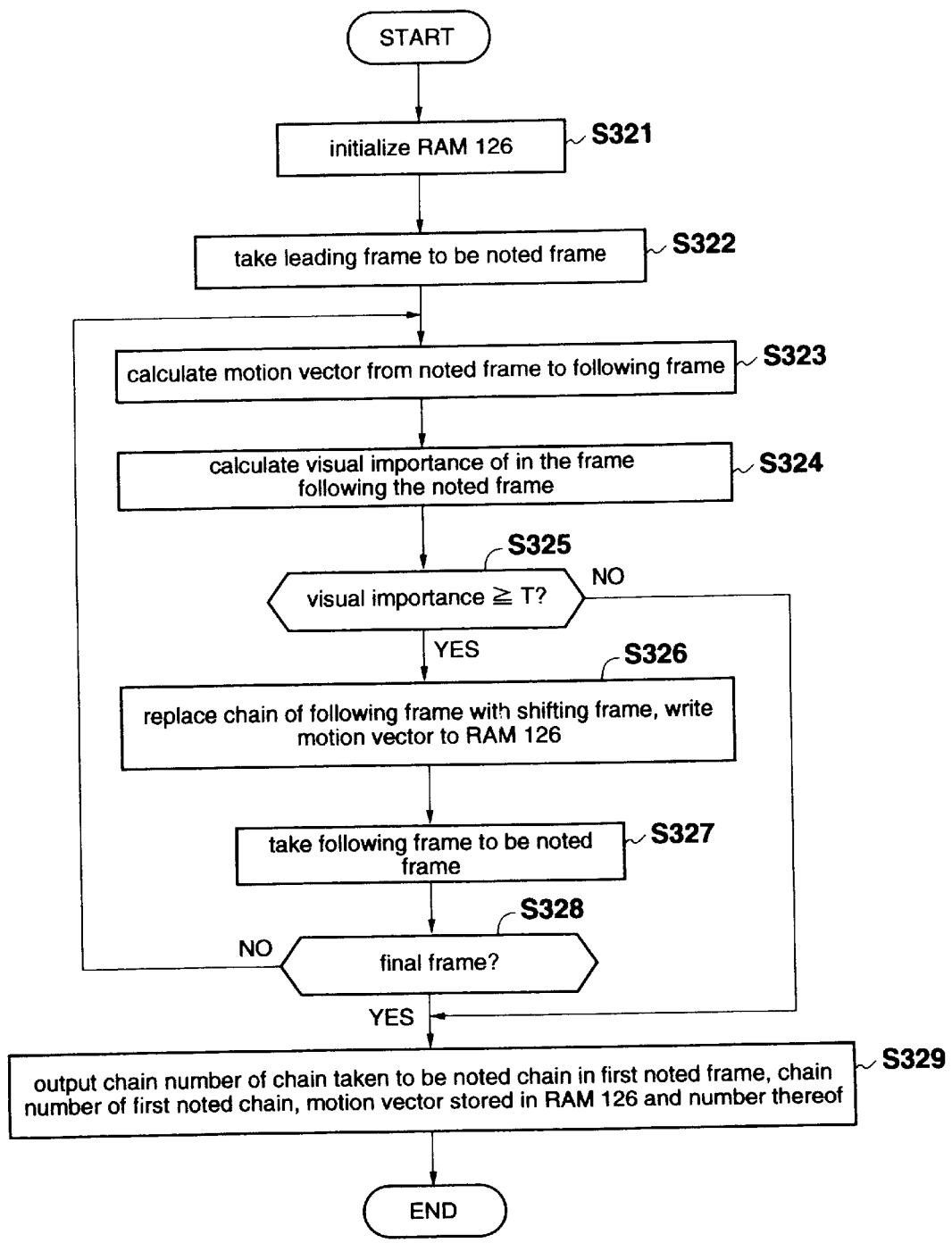
FIG. 59 is a flowchart illustrating the operation of the replacing circuit 324 shown in FIG. 58.

When chain encoded data for the first frame is stored at the RAM 122 and bitmaps for the second to Nth frames are developed at the RAM $123_1$ to $123_{N-1}$, a process in accordance with the flowchart of FIG. 59 is carried out for the chains existing at the first frame stored in the RAM 122 at a replacing circuit 324.

First, in step S321, the RAM (motion parameter RAM) 126 is initialized, step S322 is proceeded to, the first frame (leading frame) is taken as the noted frame and step S323 is proceeded to. In step S323, a motion parameter from a certain chain (noted chain) existing at the noted frame, i.e. the first frame, to a following frame (the frame following the noted frame) is calculated. The motion parameter calculation occurring in step S323 is carried out at a motion parameter calculator 325 by the replacing circuit 324 reading and outputting to the motion parameter calculator 325 the data necessary in this motion parameter calculation from the RAMs 122 and 123 (any of RAMs $123_1$ to $123_N$). The motion parameter calculator 325 is described in detail in the following with reference to FIG. 67 to FIG. 78.

Figure 60A:
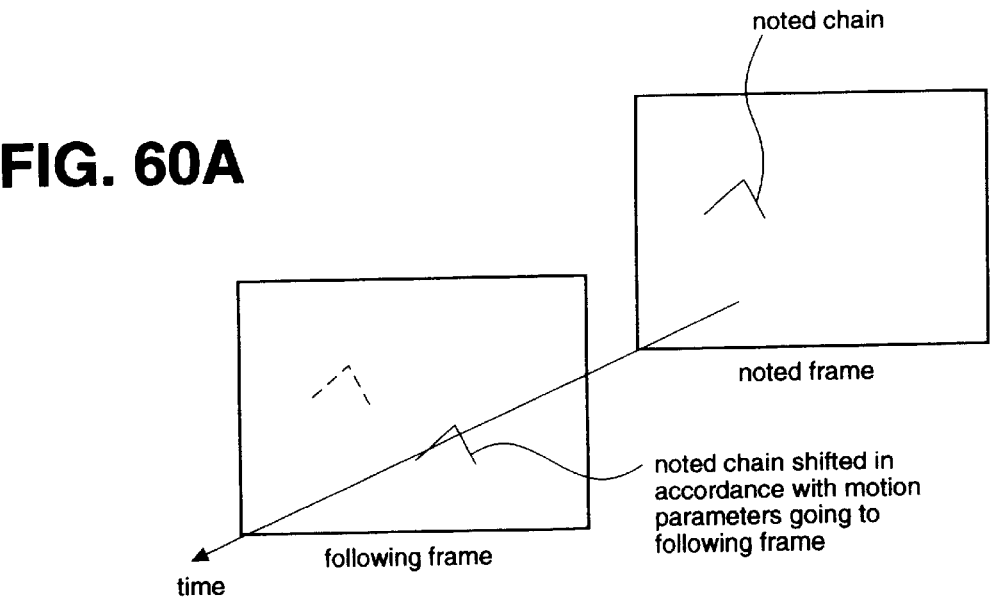
FIG. 60A and FIG. 60B are views illustrating the process of step S324 in FIG. 59.
Figure 60B:
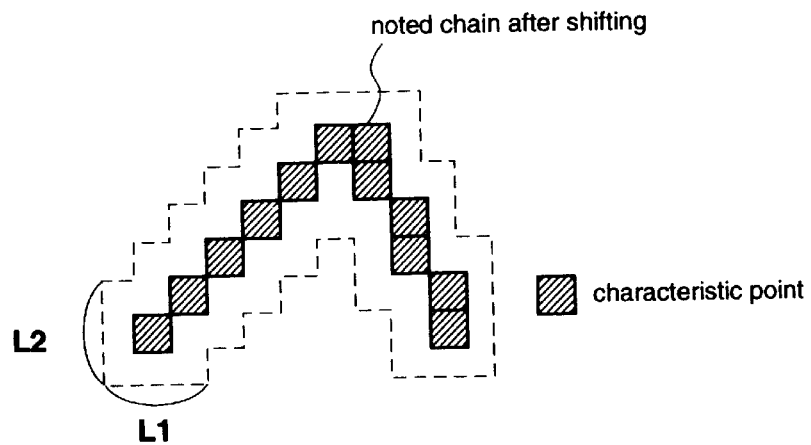

After the motion parameter calculation, step S324 is proceeded to, and the degree of importance (visual significance) of the noted frame at the following frame is calculated. In step S324, as shown, for example, in FIG. 60A, the noted chain is shifted (transformed) in accordance with the motion parameter obtained in step S323. Then, at the following frame, as shown in FIG. 60B, the number of characteristic points existing in the L1×L2 pixel range (shown by the dotted line in the drawings) at which the pixels (portions in the drawings given inclined lines) comprising the noted chain after shifting (shifted chain) are at the center of is obtained. Further, in step S324, after the number of characteristic points existing in the L1×L2 pixel range centered at each of the pixels comprising the shifted chain is calculated, this average value (the total number of characteristic points existing at the range of the pixels L1×l2 at which each of the pixels comprising the shifted chain are positioned at the center for the following frame) is obtained and is taken as the degree of importance.

Here, "1" is stored at addresses corresponding to pixels (characteristic points) comprising chains existing at the n+1th frame at RAM $123_n$, as shown in FIG. 46, with "0" being stored at other addresses. When the frame currently taken as the noted frame is then taken to be the nth frame, in step S324, the bitmap stored in the RAM $123_n$ is referred to and the number of characteristic points existing at the range of the L1×L2 pixels taking each of the pixels comprising the shifted chain as center is calculated for the following frame (in this case, the n+1th frame) by calculating the total of the values stored in addresses corresponding to the range of the L1×L2 pixels (for example, L1=L2=3) taking each of the pixels comprising the shifted chain as center.

The degree of importance calculated above gives the density of the characteristic points existing at the range of the L1×L2 pixels centered about each of the pixels comprising the shifted chain and can also be adopted for amounts other than the density of these kinds of characteristic pixels.

For example, in the following frame, the number of characteristic points of the pixels comprising the shifted chain existing as characteristic points within the L1×L2 pixel range centered about these pixels is subtracted from the number of pixels comprising the shifted chain and the value obtained as a result can be taken as the degree of significance. Further, image data for the second to Nth frames is stored, for example, at the RAM $20_1$ to $20_{N-1}$ (FIG. 57). This data is then referred to and the edge intensities (the edge intensities of pixels existing at shifted chains of the following frame) of the pixels corresponding to each of the pixels comprising the shifted chain are calculated for the following frame. It is also possible to then take the average value of these edge intensities as a degree of importance, etc.

After calculating the degree of importance, step S325 is proceeded to and a determination is made as to whether or not this degree of importance is equal to or greater than a prescribed threshold value T. When a determination is made in step S325 that the degree of importance is not equal to or greater than the prescribed threshold value T, it is taken that a chain connected to the noted chain (roughly overlapping with the noted chain after shifting) does not exist in the following frame, step S326 to S328 are skipped and step S329 is proceeded to. When it is determined in step S325 that the degree of importance is equal to or greater than the prescribed threshold value T, i.e. when a chain that (approximately) overlaps with the noted chain after shifting exists, step S326 is proceeded to and the chain of the following frame is replaced with the shifted chain (this replacing is the confirming at the replacing circuit 324 that the chain of the following frame is replaced with the noted chain). In this way, the noted chain and the chain of the following frame are made to correspond with each other.

Further, in step S326, the motion parameter going to the following frame calculated in step S323 is stored in the RAM 126 and step S327 is proceeded to. Also, in step S326, the update processing of the RAM 123 is carried out. Namely, when a chain existing in the following frame is replaced with the shifted chain, it is not necessary to take this chain as a processing target thereafter (because a shifted chain is used in place of this chain). Therefore, when, for example, in step S326, the currently noted frame is taken to be the nth frame, the values of the bitmap for the n+1th frame stored at the RAM $123_n$ stored at addresses corresponding to ranges of L1×L2 pixels taking each of the pixels comprising the shifted chain as centers are all taken to be "0". In this way, at the n+1th frame, characteristic points in the L1×L2 pixel range centered about each of the pixels comprising the shifted chain are, so to speak, eliminated.

After this, the following frame is taken to be the new noted frame in step S327, step S328 is proceeded to and a determination is made as to whether or not the noted frame is the Nth frame (final frame). When the noted frame is determined not to be the Nth frame in step S328, step S323 is returned to, the chain replaced in step S326 (shifted chain) existing at the frame taken as the new noted frame in step S327 is taken as the noted chain and the process from step S323 onwards is carried out.

When it is determined in step S328 that the new noted frame is the Nth frame, step S329 is proceeded to. The chain number of the chain taken as the first noted chain present in the chains of the frame (i.e. the first frame) taken as the noted frame in step S322, the motion parameters (motion parameters going to following frame) stored in RAM 126 and number of these motion parameters are outputted to the select multiplexer 316, and processing is complete.

As described above, the process shown in FIG. 59 is carried out for all of the chains existing in the first frame.

At the select multiplexer 316, as described above, the chain encoded data for the chain number outputted from the chain replacer 315 (replacing circuit 324) is read from the RAM 141. This chain encoded data and the motion parameters and number of motion parameters outputted from the same chain replacer 315 are then multiplexed together, before being outputted as multiplexed chain encoded data.

For example, when the chains $CH_1$ to $CH_n$ present at the first to Nth frames are connected, as shown in FIG. 61, the chain encoded data for the chain $CH_1$, the motion parameters going from the chain $CH_1$ to the chain $CH_{N-1}$ and this number N−1 are multiplexed and then outputted from the select multiplexer 316.

Chains capable of replacing (being made to correspond with) the noted chain of the first frame are outputted as chain encoded data for this noted chain and motion parameters for shifting (motion compensating) this chain and decoding other chains. The amount of time consumed can therefore be reduced and the efficiency of the compression of the image can therefore be improved when compared with the case in the related art where the chains existing at each of the frames were each respectively outputted as items of chain encoded data.

As shown in FIG. 58, it is also possible to develop the first bitmap on the RAM 122 in the same way as the case occurring at the RAM $123_1$ to $123_{N-1}$. In this case, the RAM 122 has to be a frame memory capable of storing a bitmap for one frame portion and must therefore have a large storage capacity. With regards to this, as described above, when chain encoded data existing at the first frame is stored at the RAM 122, the amount of data for one frame portion of chain encoded data is smaller than for a bitmap for one frame portion and a RAM having a small storage capacity can therefore be used for the RAM 122.

According to the image encoding device of FIG. 57, as described above, improvements in the efficiency of compressing image data can be achieved. However, the process shown in FIG. 59 can only be carried out for chains existing in the first frame. When chains are then first seen in frames from the second frame onwards (for example, when scenes change etc., in frames from the second frame onwards), information for these chains is not outputted from the select multiplexer 316 and decoding of these chains on the decoding side is therefore difficult.

Fifth Embodiment

Figure 62:
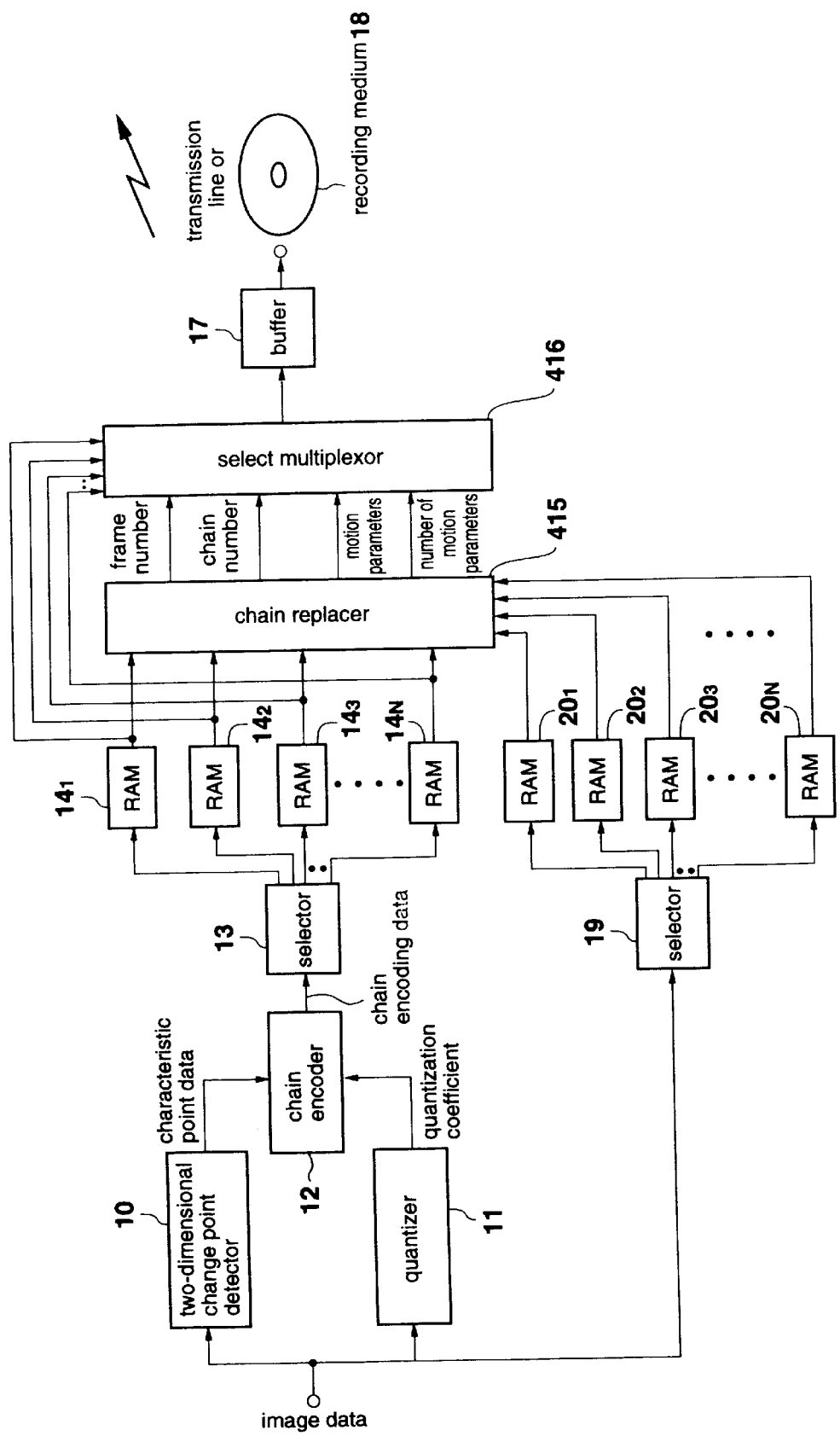
FIG. 62 is a block diagram showing the structure of a fifth embodiment of the present invention applied to an image encoding device.

FIG. 62 shows the structure of a fifth embodiment of the present invention applied to an image encoding device. Portions corresponding to portions in FIG. 57 are given the same numerals, i.e. other than a chain replacer 415 and a select multiplexer 416 being provided in place of the chain replacer 315 and the select multiplexer 316, the structure is the same as the structure of the image encoding device of FIG. 62. The structure of the image encoding device of the fifth embodiment is similar to that of the third embodiment and common portions therefore exist. These portions have therefore been given the same numerals as in the third embodiment will not be described in detail in this embodiment.

The chain replacer 415 does not only carry out the same process for the chain replacer 315 shown in FIG. 57 for the chain existing in the first frame, but also carries out this process taking chains existing at the second frame onwards as targets and outputs the frame numbers, chain numbers, motion parameters and number of motion parameters to the select multiplexer 416.

The select multiplexer 416 reads chain encoded data for chains corresponding to chain numbers from the chain replacer 415 from RAM $14_n$ suffixed with the same frame number n from the chain replacer 415. This chain encoded data, is then multiplexed together with the motion parameters from the chain replacer 415 and the number of vectors and then outputted to the buffer 17 as multiplexed chain encoded data.

Figure 63:
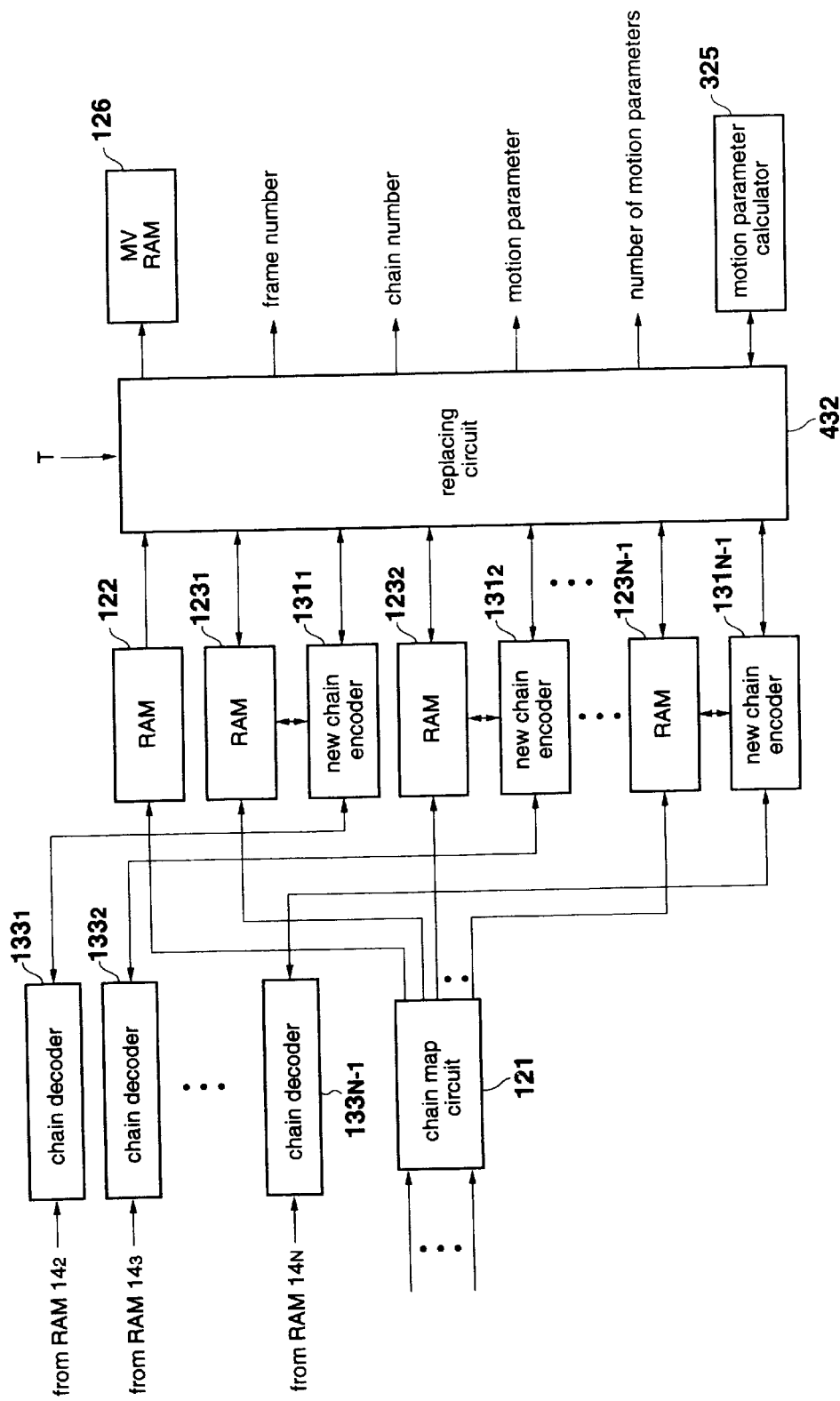
FIG. 63 is a block diagram showing an example of the structure of the chain replacer 415 shown in FIG. 62.

FIG. 63 shows an example of the structure of the chain replacer 415 shown in FIG. 62. In FIG. 63, portions corresponding to the chain replacer 315 of FIG. 58 are given the same numerals. Namely, other than a replacing circuit 432 being provided in place of the replacing circuit 324 and new chain encoding circuits $131_1$ to $131_{N-1}$ and chain decoding circuits $133_1$ to $133_{N-1}$ being provided, the structure is the same as for the chain replacer 315 of FIG. 58.

The similar chain encoders $131_1$ to $131_{N-1}$ and the chain decoders $133_1$ to $133_{N-1}$ have the same structure as that shown in FIG. 50, are given the same numerals and their detailed description is therefore omitted.

With the chain replacer 415 constructed in the above way, in the same way as the case of FIG. 51, the chain encoded data for the first frame is stored at the RAM 122 and the bitmaps for chains for the second to Nth frames are developed over RAM $123_1$ to $123_{N-1}$ respectively. Processing is then carried out at the replacing circuit 432 in accordance with the flowchart of FIG. 64.

First, in step S431, a variable n for counting the number of frames is initialized to "1" and step S432 is proceeded to, with replacement processing based on the nth frame then being carried out. When replacement processing based on this nth frame is complete, the variable n i incremented by "1" in step S433, step S434 is proceeded to and a determination is made as to whether or not the variable n is less than the processing unit frame number N. When n is determined to be less than N in step S434, step S432 is returned to and replacement processing is once again carried out based on the nth frame. Further, when the variable n is determined to be not less than N in step S434, the process is complete.

Figure 64:
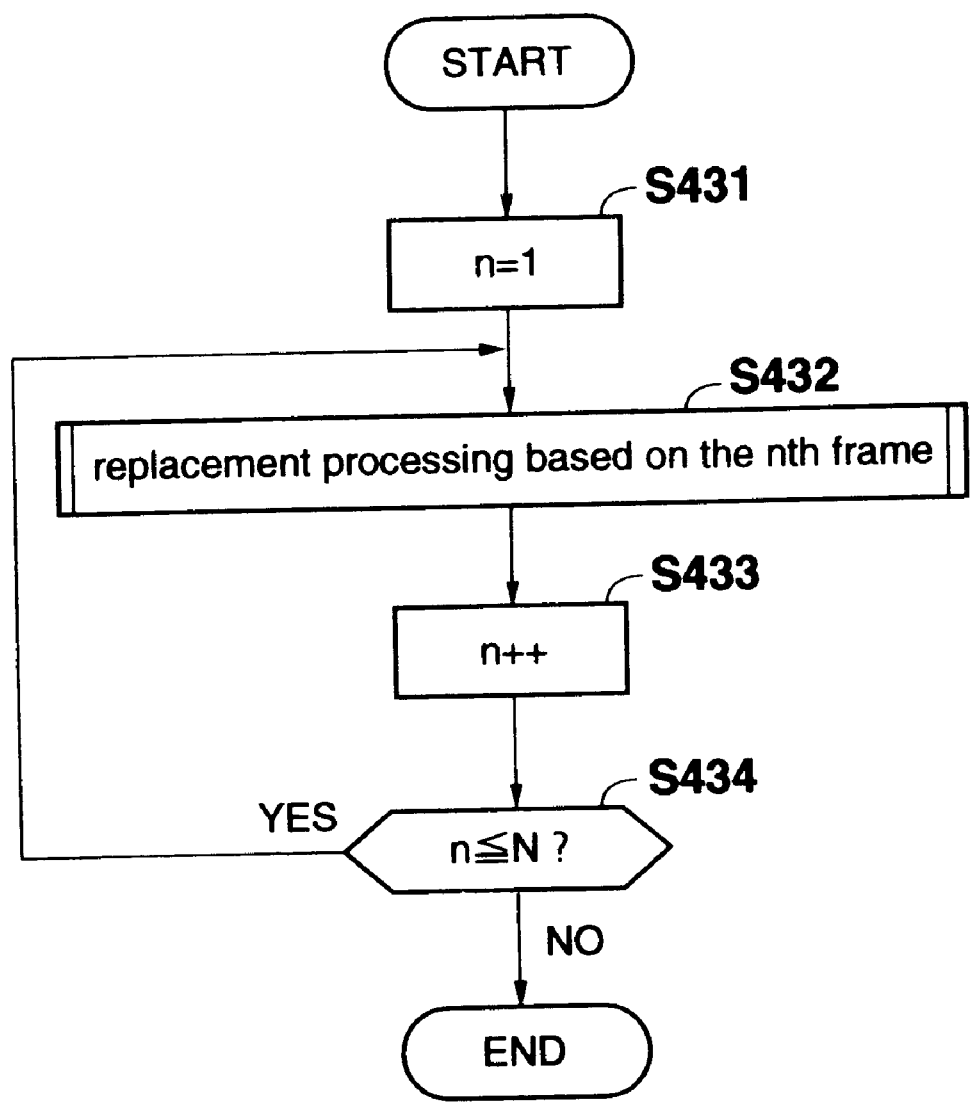
FIG. 64 is a flowchart illustrating the operation of the replacing circuit 432 shown in FIG. 63.
Figure 65:
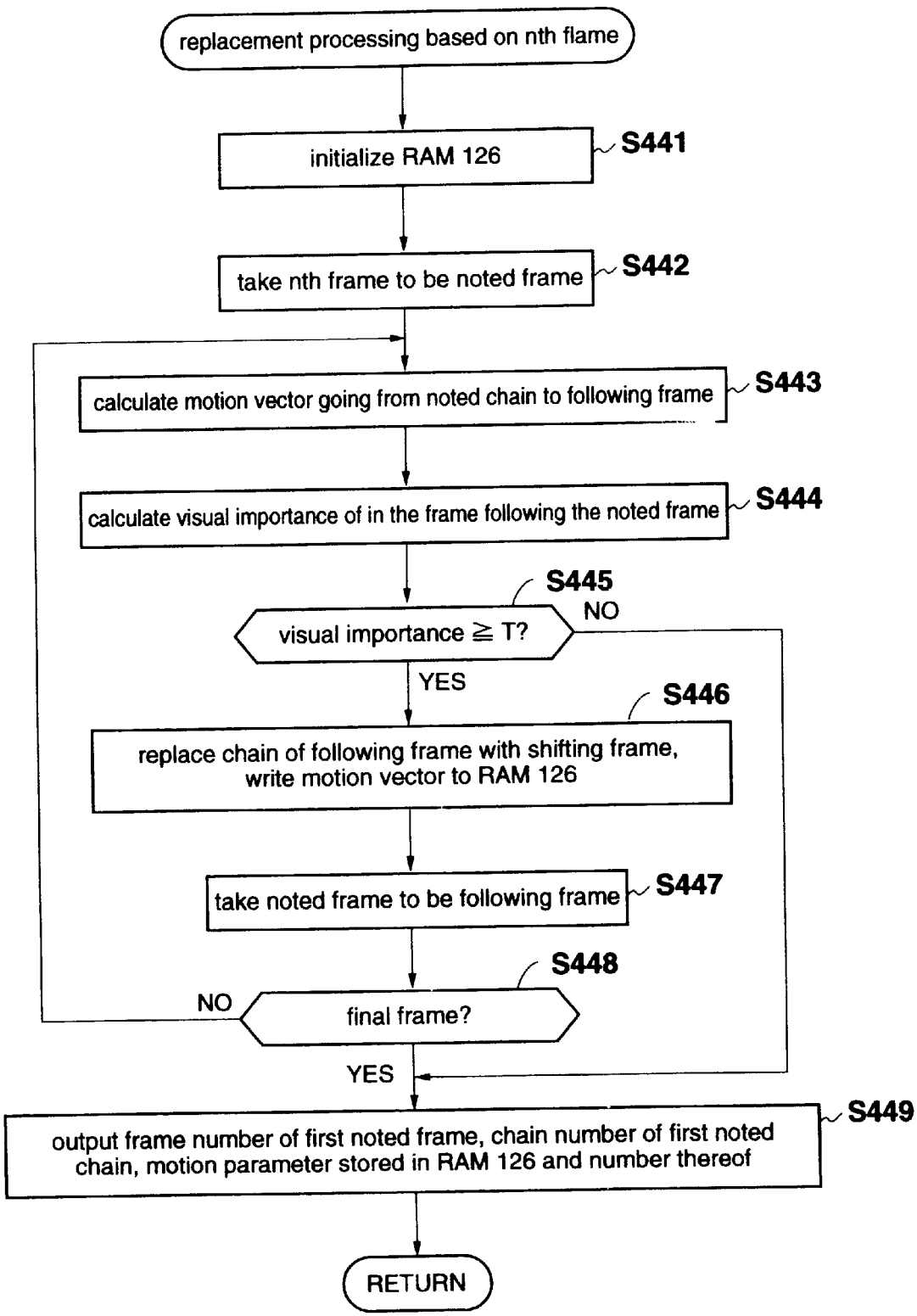
FIG. 65 is a flowchart illustrating the details of the process of step S432 in FIG. 64.

FIG. 65 is a flowchart showing the details of the replacement process based on the nth frame within FIG. 64. This replacement process based on the nth frame is the same as the process occurring in step S321 to S328 of FIG. 59, with the exception that, in step S442 of step S441 to S448, the nth frame is taken as the noted frame, rather than the first frame.

Chain encoded data for the chain existing at the first frame is stored in the RAM 122. Chains existing at the first frame can therefore be identified using the chain encoded data stored at the RAM 122. Then, for example, in step S443, the motion parameters from these chains to the following frame can be calculated. However, with regards to chains existing at the frames from the second frame onwards, only bitmaps for which the value stored in the address corresponding to the position of the characteristic point comprising a chain is "1" are stored on the RAM $123_1$ to $123_{N-1}$. Therefore, in order to recognize chains existing at frames for the second frame onwards, the storage contents of the RAM 123 where the bitmaps for the noted frames are developed are skipped at the replacing circuit 432, re-structuring taking portions of consecutive one's is necessary and processing time is required.

The bitmaps stored at RAM $123_1$ to $123_{N-1}$ are updated in step S146 in the same way as the case in step S326 described in FIG. 59, but it is then necessary to verify these chains at the replacing circuit 432 after updating.

Then, in step S442, when a frame from the second frame onwards is taken as the noted frame, the replacing circuit 432 verifies the chains existing at the frame taken as the noted frame in the following way.

For example, in step S442, when the nth frame is taken as the noted frame (where n is taken to be a variable greater than or equal to 2 and less than or equal to N), the replacing circuit 432 outputs a control signal to the new chain encoding circuit $131_{n-1}$ constructed in the same way as the chain encoding circuit 12 described in FIG. 3. The new chain encoding circuit $131_{n-1}$ receives the control signal from the replacing circuit 132 and controls the chain decoding circuit $133_{n-1}$. In this way, the nth frame of chain encoded data are read from the RAM $14_n$ and the chains are decoded. The nth frame of image data obtained by chain decoding using the chain decoding circuit $133_{n-1}$ is then provided to the new chain encoding circuit $131_{n-1}$ and the new chain encoding circuit $131_{n-1}$ re-encodes the chain while referring to the storage contents of the RAM $123_{n-1}$.

Namely, in addition to the image data for the nth frame, the characteristic point for the nth frame obtained by decoding the chain encoded data for the nth frame is also provided from the chain decoding circuit $133_{n-1}$ to the new chain encoding circuit $131_{n-1}$. There is also a characteristic point for the nth frame from the chain decoding circuit $133_{n-1}$ at the new chain encoding circuit $131_{n-1}$. Points (pixels) corresponding to this characteristic point for which the value stored at the address for the RAM $123_{n-1}$ is "1" is taken as the right characteristic point. The nth frame image data provided from the chain encoding circuit $133_{n-1}$ is then chain encoded and the chain encoded data obtained as a result is outputted to the replacing circuit 432.

The chain encoded data for the nth frame outputted by the new chain encoding circuit $131_{n-1}$ is then used to update the contents of the RAM $131_{n-1}$.

The chains existing at the nth frame are therefore verified at the replacing circuit 432 based on the updated nth frame chain encoded data which updated the contents of the RAM $131_{n-1}$ provided from the new chain encoding circuit $131_{n-1}$.

Then, at the replacing circuit 432, in step S449, in the same way as the case in step S329 of FIG. 59, the chain number of the chain first taken as the noted chain, the motion parameters (motion parameters going to the following frame) stored in the RAM 126, the number of motion parameters and the frame number of the frame (the frame taken as the noted frame in step S442) at which the first noted frame exists are outputted to the select multiplexer 416.

The process shown in FIG. 65 is then carried out for all of the chains existing at the nth frame taken as the noted frame in step S442.

As described above, the chain number of the frame number n, together with the motion parameters and number of motion parameters are outputted from the chain replacer 415. Further, chain encoded data for the chain corresponding to the aforementioned chain number is read from the RAM $14_n$ suffixed with the aforementioned frame number. This chain encoded data, the motion parameters from the chain replacer 415 and the number of motion parameters are then multiplexed at the select multiplexer 416 and outputted as the multiplexed chain encoded data.

Figure 66:
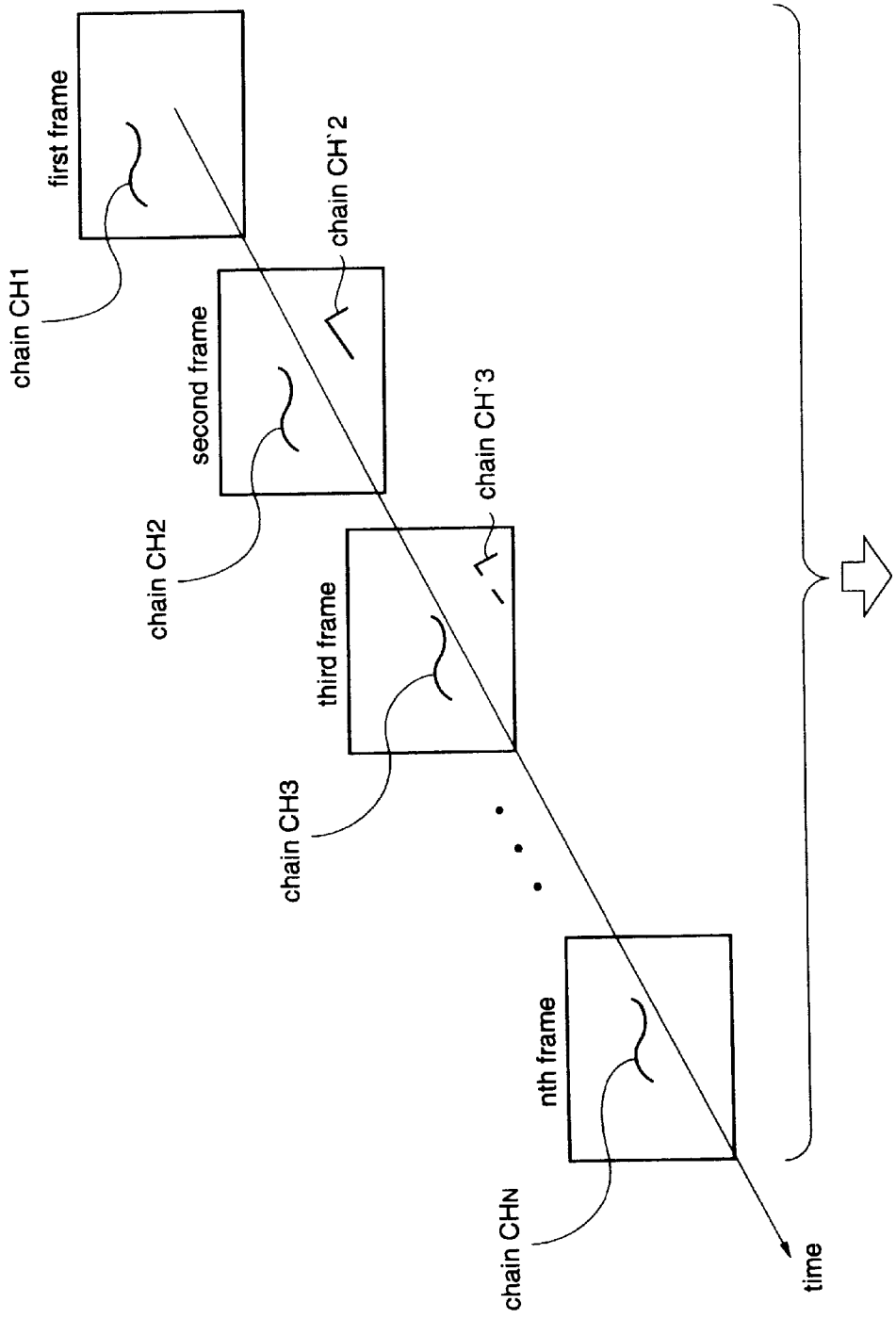
FIG. 66 is a view illustrating the multiplexed chain encoded data outputted by the select multiplexer 416 shown in FIG. 62.

For example, as shown in FIG. 66, when chains $CH_1$ to $CH_N$ existing at the first to Nth frames, respectively, are connected, in the same way as the case in FIG. 61, the chain encoded data for the chain $CH_1$, the motion parameters to the following frames for chain $CH_1$ to chain $CH_{N-1}$, and this number N−1 are multiplexed at and then outputted from the select multiplexer 416. Further, as also shown in FIG. 66, when a chain $CH_2'$ is seen for the first time at the second frame, the chain $CH_2'$ is also connected to the chain (in the embodiment of FIG. 66, this is the chain $CH_3'$ of the third frame) to be connected to this chain by carrying out step S432 of FIG. 64 "replacement processing based on the second frame". As a result, the chain encoded data for the chain $CH_2'$, the motion parameters going to the following frame for the chain $CH_2'$ and this number multiplexed at and then outputted from the select multiplexer 416.

Therefore, in this case, decoding of chains on the decoding side is possible even when these chains are chains which are encountered for the first time at the second frame onwards.

A decoded image is obtained from the multiplexed chain encoded data outputted from the image encoding device according to FIG. 57 and FIG. 62 by the fourth and fifth embodiments of the present invention in the following way. Namely, the chain encoded data and the motion parameters are extracted from the multiplexed chain encoded data and the chain encoded data is chain decoded. The decoded image (chain) obtained as a result is then motion-compensated in accordance with the motion parameters so as to obtain a decoded image for the frame following the first decoded image.

Multiplexed chain-encoded data outputted from the image encoding devices of FIG. 57 and FIG. 62 can therefore be decoded in the same way as the aforementioned cases by the image decoding device described in FIG. 40. Multiplexed chain-encoded data outputted from the image encoding device of FIG. 57 and FIG. 62 comprises chain encoded data and motion parameters. Therefore, at the divider of the image decoding device of FIG. 40, motion parameters are separated rather than motion vectors and these separated motion parameters are provided to the motion compensator 77. The decoded image from the image constructor 74 is then motion-compensated at the motion compensator 77 in accordance with the motion parameters. The above structure differs from the image decoding device for the image encoding device of FIG. 2, FIG. 44 and FIG. 50, but other aspects of the structure are the same.

Figure 41:
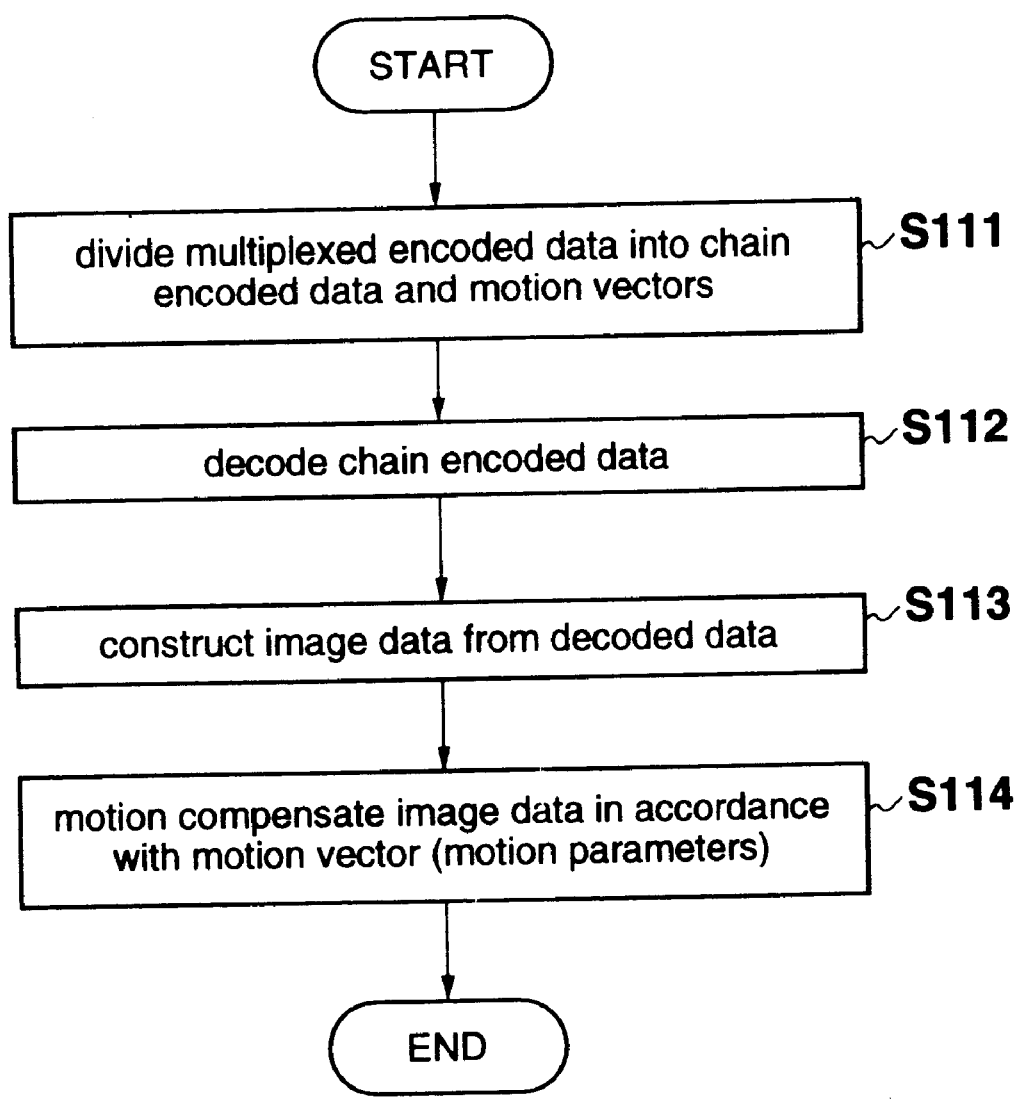
FIG. 41 is a flowchart illustrating the operation of the image decoding device of FIG. 40.

The steps are also the same as those in the flowchart of FIG. 41, with the exception that the image data is motion compensated in step S114 in accordance with the motion parameters.

This decoded image is as shown in FIG. 55A and FIG. 55B and FIG. 56A and FIG. 56B. If a chain outputted from the image encoding device is taken as the foundation chain and, for example, as shown in FIG. 55A, a certain one chain exists at the nth frame of the original image, with this chain then existing as three chains in the following frame, the chain of the nth frame is taken as the foundation chain. When this foundation chain is then made to correspond to (replace) the three chains of the following frame, the chain of the following frame is decoded by motion-compensating the foundation chain on the decoding side and the three chains of the following chain are therefore decoded as a single chain, as shown in FIG. 55B.

Further, as shown, for example, in FIG. 56A, when three chains exist at the nth frame of the original image and a single chain of these three chains linked together exists in the following chain, the three chains of the nth frame are each respectively taken as the foundation chain. When this foundation chain is then made to correspond with (replace) the one chain of the following chain, the chain of the following frame is decoded by motion compensating the foundation chain on the decoding side, and the one chain of the following frame is therefore decoded as three chains, as shown in FIG. 56B.

The structure of the motion parameter calculator 325 shown in FIG. 58 (FIG. 63) will now be described in detail.

Figure 67:
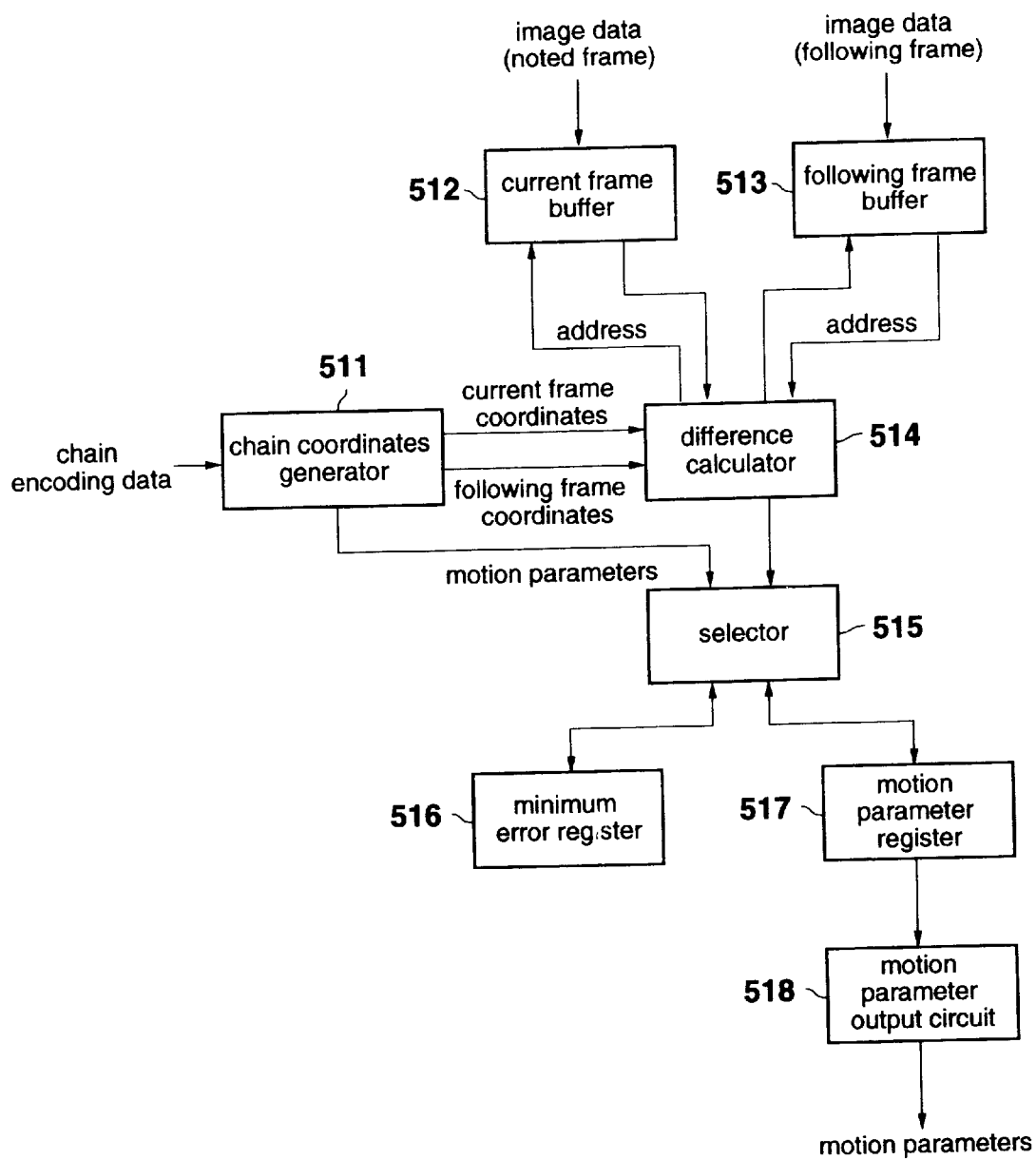
FIG. 67 is a block diagram showing the structure of an embodiment of the motion parameter calculator shown in FIG. 58(FIG. 63)

FIG. 67 shows an example structure of a motion parameter calculator adopted in this kind of image encoding device or a motion tracking device etc. for following the motion of the outline of a body. A chain coordinate generator 511 detect chains corresponding to chain encoded data based on a chain direction component (to be described later) included in chain encoded data outputted by the chain encoder 12 and obtains the coordinates of each of the characteristic points comprising this chain. The chain coordinate generator 511 then takes the coordinates obtained as the coordinates for the current frame and sequentially outputs these coordinates to a difference calculator 514.

The chain coordinate generator 511 changes each of the coefficients for, for example, Affine Parameters taken as motion parameters expressing the motion of the image within a fixed range while carrying out coordinate transformations on the current frame coordinates using these affine parameters. The coordinates obtained are then taken as the following frame coordinates and outputted to the difference calculator 514. The affine parameters used at this time are also outputted to the selector 515 as the motion parameters.

When the affine parameter coefficients are taken as a, b, c, d, e and f, and the current frame coordinates and following frame coordinates are taken as (x, y) and (x', y'), respectively, the chain coordinate generator 511 varies, for example, the coefficients a, b, d and e within the range −2 to 2 and the coefficient c within the range −8 to 8 using the appropriate steps, in accordance with the following equation, and calculates the following frame coordinates (x', y').

$$x'=ax+by+c$$

$$y'=dx+ey+f$$

Figure 68:
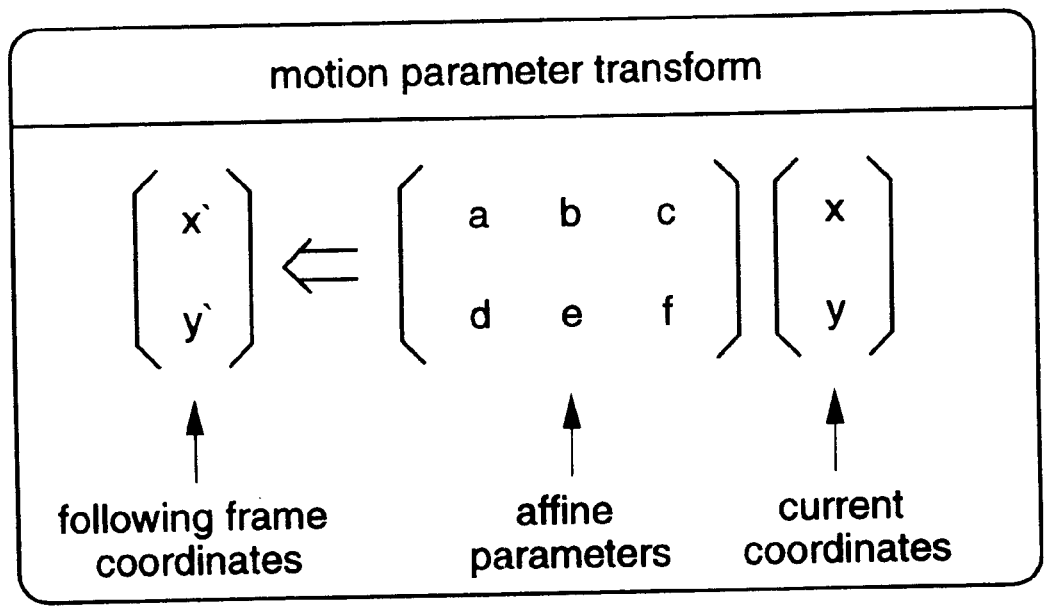
FIG. 68 is a view showing the transformation equation (Motion Vector Transform Equation) for coordinates using affine parameters.
Figure 69:
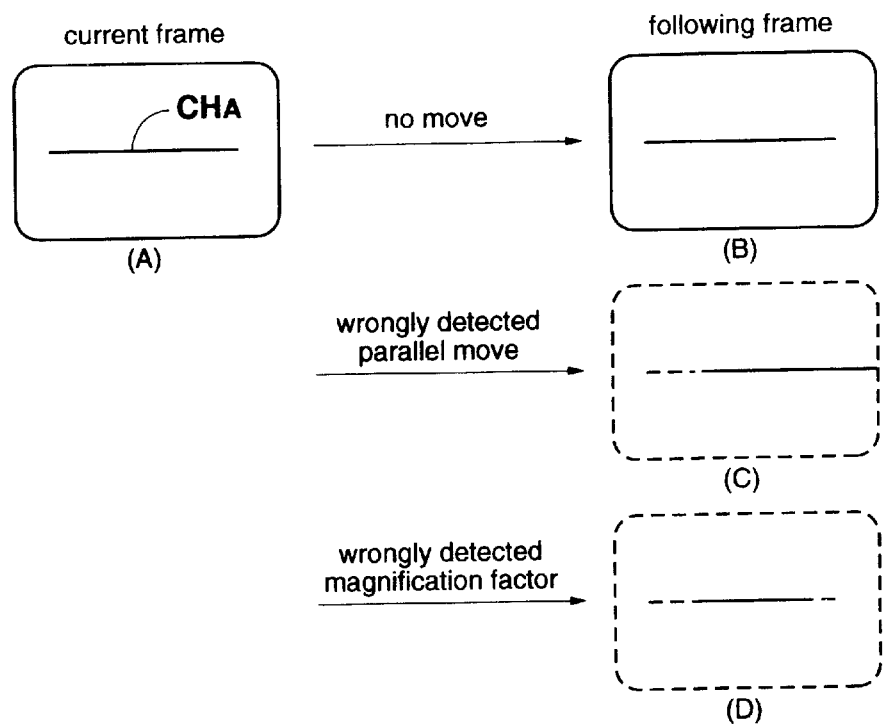
FIG. 69 is a view illustrating the motion parameters obtained by the motion parameter calculator of FIG. 67.
Figure 70:
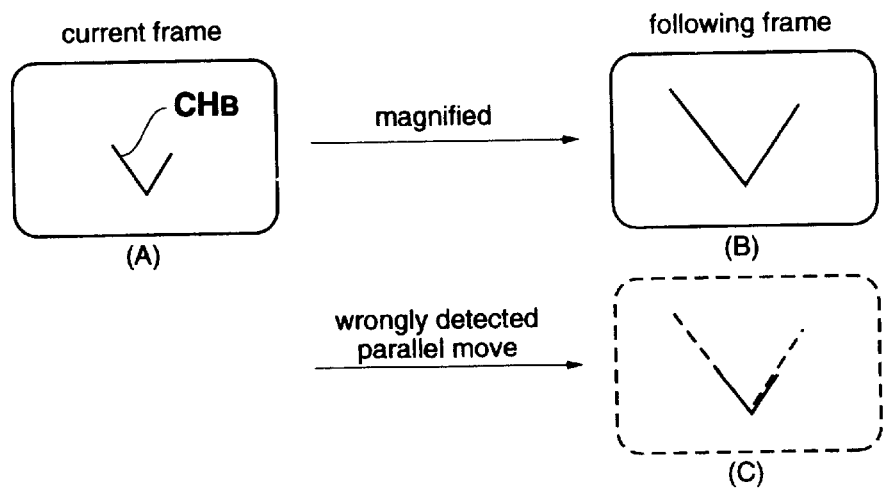
FIG. 70 is a view illustrating the motion parameters obtained by the motion parameter calculator of FIG. 67.

The above equations are usually expressed as shown in FIG. 68.

With regards to one current frame coordinate, this current frame coordinate is following frame coordinates transformed using a plurality of affine parameters, i.e. a plurality of following frame coordinates, are outputted from the chain coordinate generator 511 to the difference calculator 514.

Further, this plurality of affine parameters is outputted from the chain coordinate generator 511 to a selector 515.

On the other hand, image data (hereinafter referred to as current frame data) for the frame existing at the chain for which motion parameters are to be detected is provided to and stored in the current frame buffer 512. Image data (hereinafter referred to as the following frame data) for the next frame (following frame) of current frame data is provided to and stored in a following frame buffer 513.

After the current frame data and following frame data is stored in the current frame 512 and the following frame 513, the difference calculator 514 receives the current frame coordinates and the following frame coordinates from the chain coordinate generator 511. Block matching is then carried out taking a block of a prescribed range centered between the current frame coordinate and the following frame coordinate.

The difference calculator 514 takes the current frame coordinates and following frame coordinates received from the chain coordinate generator 511 as an address and output these to the current frame buffer 512 and the following frame buffer 513. In this way, the current frame data and following frame data (pixel value) of the Q×Q (horizontal, vertical) pixel scope taken as being at the center of the pixels corresponding to the current frame and following frame are read-out from the current frame buffer 512 and the following frame buffer 513, respectively.

The difference calculator 514 obtains the difference between the current frame data of the Q×Q pixel ranges taking the pixels corresponding to the current frame coordinates as centers and the following frame data for the Q×Q pixel ranges taking the pixels corresponding to the following frame coordinates as centers (hereafter, this difference value is referred to as an estimation error) and then calculates, for example, the absolute value sum of this estimation error.

At the difference calculator 514, the absolute value sum of the aforementioned prediction error is obtained for the plurality of following frame coordinates obtained for a single current frame and outputted to the selector 515.

Before the chain coordinate generator 511 starts processing for a certain chain, the selector 515 initializes a smallest error register 516 by installing, for example, "−1" in this smallest error register 516. The selector 515 then receives the absolute value sum of the estimation errors from the difference calculator 514 and compares this value with the value stored at the smallest error register 516. When the absolute value sum for the estimation errors is smaller than the value stored in the smallest error register 516 or when the value stored in the smallest error register 516 is "−1", the absolute value sum of the estimation errors from the difference calculator 514 is newly installed in the smallest error register 516. Further, the selector 515 stores affine parameters of the affine parameters provided from the chain coordinate generator 511 used in obtaining the absolute value sum of the estimation error installed in the smallest error register 516 are stored in a motion parameter register 517.

When the chain coordinate generator 511 finishes processing a particular chain, a motion parameter output circuit 518 reads and outputs as motion parameters the affine parameters stored in the motion parameter register 517 at this time.

At the parameter calculating circuit shown in FIG. 67, the coordinates are transformed by the affine parameters of various values and the differential absolute value sum of the current frame data for the range Q×Q centered about the coordinates before transformation and the following frame data for the range Q×Q centered about the coordinates after transformation, i.e. the estimation error absolute value sum is obtained for the coordinates for all of the characteristic points comprising the chain. The affine parameter which makes the absolute value sum of this estimation error the smallest is then detected as the motion parameter.

Erroneous motion parameters can be detected when motion parameters are detected by this kind of method.

Namely, for example, as shown in FIG. 69A, when a straight line-shaped chain $CH_A$ exists at the current frame, when this chain does not move at all in the following frame (the frame after the current frame) as shown in FIG. 69B, a motion parameter showing a parallel move along this chain $CH_A$ is detected for $CH_A$ as shown in FIG. 69B, or a parameter showing that the chain $CH_A$ is reduced is detected, as shown in FIG. 69D.

Further, when, as shown, for example, in FIG. 70A, a V-shaped chain $CH_B$ exists at the current frame, as shown in FIG. 70B, and the position of the peak of this chain does not move but is enlarged, a motion parameter showing the chain $CH_B$ perform a horizontal move can be detected, as shown in FIG. 70C.

Moreover, according to the motion parameter calculator of FIG. 67, a motion parameter expressing parallel moving of the body, enlargement/reduction and rotation etc., can be obtained because a motion parameter is detected using an affine parameter having the six coefficients a to f. However, in this case, the six coefficients a to f are modified within the aforementioned scope and an estimation error is calculated. This requires an enormous amount of calculation, hardware capable of high-speed processing in real-time has to be used and the device therefore becomes expensive as a result.

Sixth Embodiment

Figure 71:
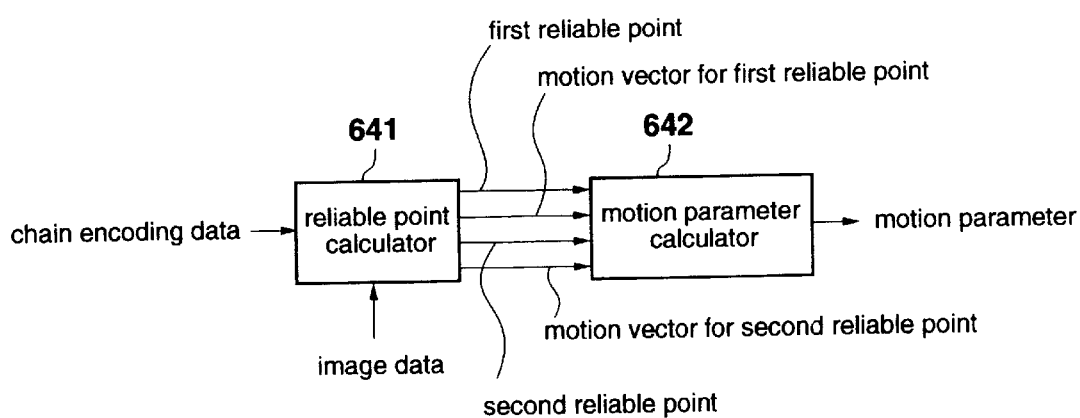
FIG. 71 is a block diagram showing an example of the structure of the motion parameter calculator 325 shown in FIG. 58 (FIG. 63)

In order to resolve the aforementioned problems, a sixth embodiment of the motion parameter calculator 325 shown in FIG. 58 (FIG. 63) will be described. FIG. 71 shows an example structure of the motion parameter calculator 325. This motion parameter calculator 325 comprises a reliable point calculator 641 and a motion parameter calculator 642. Chain encoded data for the chain for which the motion parameters are to be obtained for from a replacing circuit 324 (or 432) and image data from the RAM 20 are provided to the reliable point calculator 641. The reliable point calculator 641 takes chain encoded data as input and detects a chain corresponding to this chain encoded data. A degree of reliability expressing the reliability of the respective characteristic points comprising this chain (consecutive points) is then calculated and two points are selected in order of high reliability from the characteristic points based on this degree of reliability (the most and second most reliable points of the two selected points are hereinafter referred to as the first reliable point and the second reliable point, respectively). The reliable point calculator 641 then detects the motion vectors for the first and second reliable points, respectively, and outputs these motion vectors to the motion parameter calculator 642 together with the coordinates of the first and second reliable points.

The motion parameter calculator 642 receives the first reliable point (coordinates of the first reliable point) and motion vector, and the second reliable point (coordinates of second reliable point) and motion vector for the chain from the reliable point calculator 641 and calculates motion parameters expressing the amount of parallel moving of the chain, the enlargement/reduction and the amount of rotation based on these coordinates and vectors.

Figure 72:
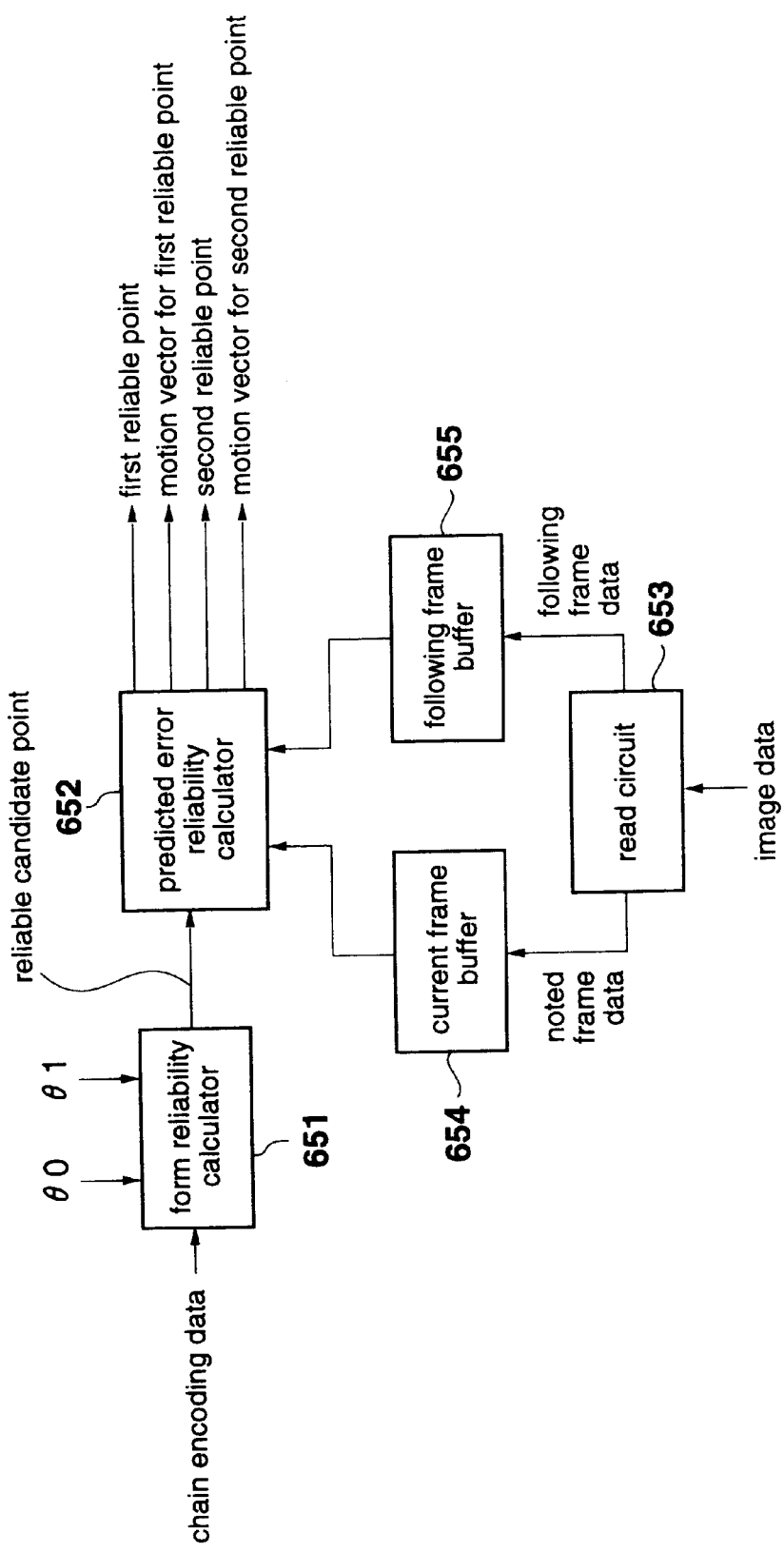
FIG. 72 is a block diagram showing an example of the structure of the reliable point calculator 641 shown in FIG. 71.

FIG. 72 is a view showing the structure of the reliable point calculator 641 shown in FIG. 71. Chain encoded data is inputted at a shape reliability calculator 651. The shape reliability calculator 651 then calculates the degree of reliability of the characteristic points based on the geometrical shape occurring at the periphery of the characteristic points comprising the chain corresponding to this chain encoded data. The shape reliability calculator 651 then detects and outputs to an estimated error degree of reliability calculator 652 candidate points (hereinafter referred to as reliable candidate points) for the first and second reliable points (hereinafter referred to simply as reliable points) from the characteristic points comprising the chain based on the obtained degree of reliability.

Specifically, the shape reliability calculator 651 calculates the angle the chain makes taking each of the characteristic points comprising the chain as peak points and takes this angle as the degree of reliability (hereinafter referred to as the angle degree of reliability in order to distinguish this degree of reliability from other degrees of reliability (in this embodiment, estimation error degrees of reliability to be described later). Characteristic points for which the value for the angle degree of reliability (hereinafter referred to in this embodiment as angle) falls within a prescribed range are then taken as reliable candidate points.

The estimated error degree of reliability calculator 652 calculates the motion vectors for the reliable candidate points from the shape reliability calculator 651 by performing so-called program matching while referring to the current frame buffer 654 and the following frame buffer 655. The degree of reliability (hereinafter referred to as the estimation error degree of reliability to distinguish this degree of reliability from other degrees of reliability (in this embodiment, the aforementioned angle degree of reliability) of each of the reliable candidate points is then calculated. In this embodiment, the average value of the absolute value of the estimation error is, for example, taken as the estimation error degree of reliability.

The estimated error degree of reliability calculator 652 selects and outputs to the motion parameter calculator 642 together with the motion vectors first and second reliable points from the reliable candidate points based on the estimation error degree of reliability.

A read circuit 653 reads image data (hereinafter referred to as noted frame data) for the frame (noted frame) existing at the chain (noted chain) currently being taken as the processing target and image data (following frame data) for the following frame (frame after the noted frame) from the RAM 20 and stores the noted frame data and the following frame data in the current frame buffer 654 and the following frame buffer 655, respectively.

Next, this operation will be described. Chain encoded data for the chain for which the motion parameters are to be obtained from the replacing circuit 324 (or 432) is taken as input and provided to the shape reliability calculator 651. Further, at this time, the read circuit 653 reads and provides to the current frame buffer 654 and the following frame buffer 655 image data for the frame existing at the chain corresponding to the inputted chain encoded data i.e. the noted frame (noted frame data) and the following frame data from the RAM 20.

Figure 73:
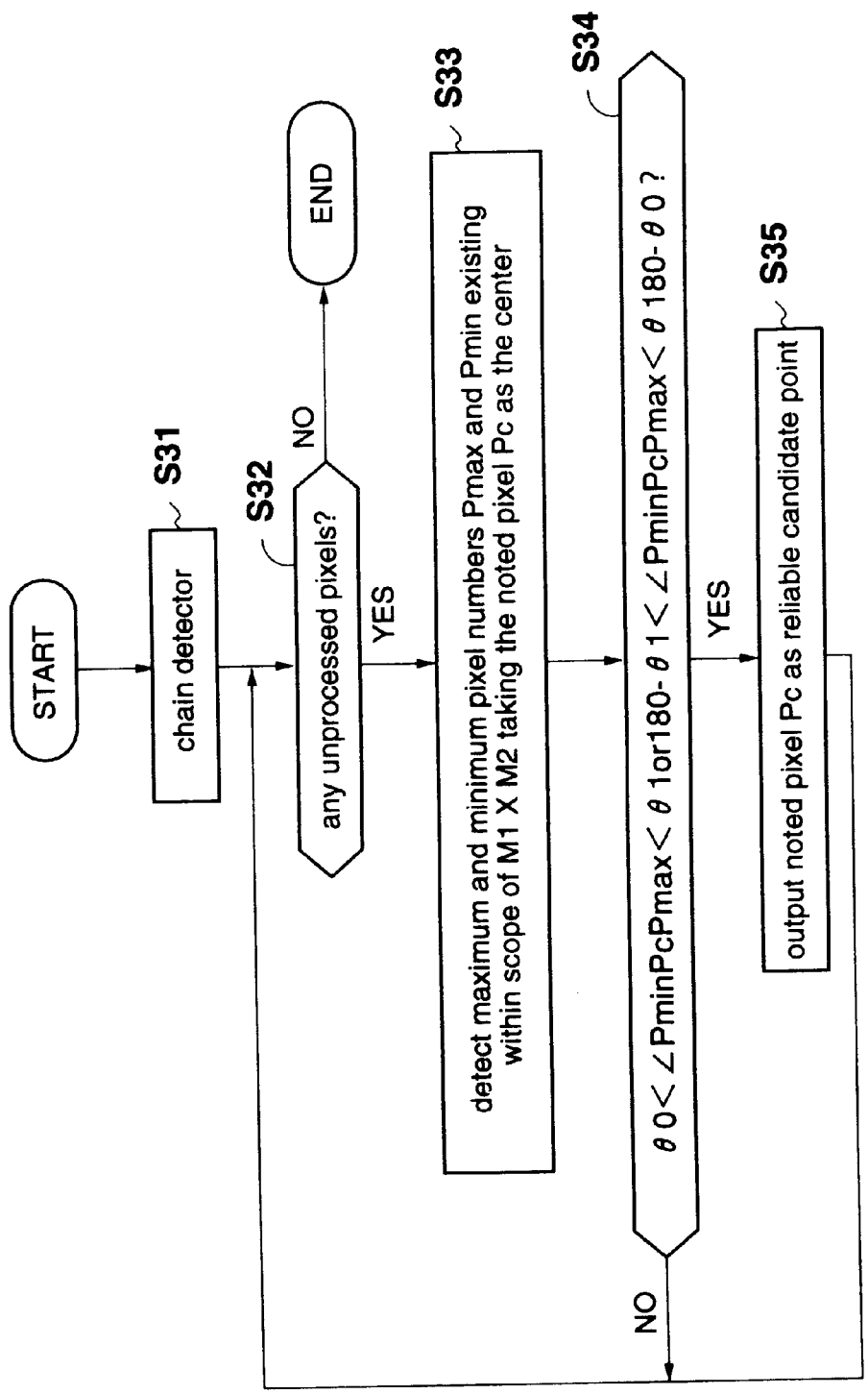
FIG. 73 is a flowchart illustrating the operation of the shape degree of reliability calculator 51 shown in FIG. 72.

After this, processing is carried out at the shape reliability calculator 651 in accordance with the flowchart of FIG. 73. First, at the shape reliability calculator 651, in step S31, the chain (noted chain) corresponding to the chain encoded data is detected based on the direction component of the inputted chain encoded data. Further, in step S31, serial numbers (hereinafter referred to as image pixels) are given to each of the pixels (characteristic points) comprising this noted chain in a direction from, for example, the start point to the end point. For example, when the noted chain comprises P pixels, 1 is given to the start point, 2 is given to the point following the start point, . . . , n is given to the pth point from the start point, . . . and P is given to the end point.

After this, step S32 is proceeded to, and a determination is made as to whether or not unprocessed pixels exist amongst the pixels comprising the noted chains. When a determination is made in step S32 that unprocessed pixels exist and the pixels comprising this noted chain are seen in, for example, ascending order of pixel number, the first detected unprocessed pixels are taken as noted pixels and step S33 is proceeded to.

Figure 74:
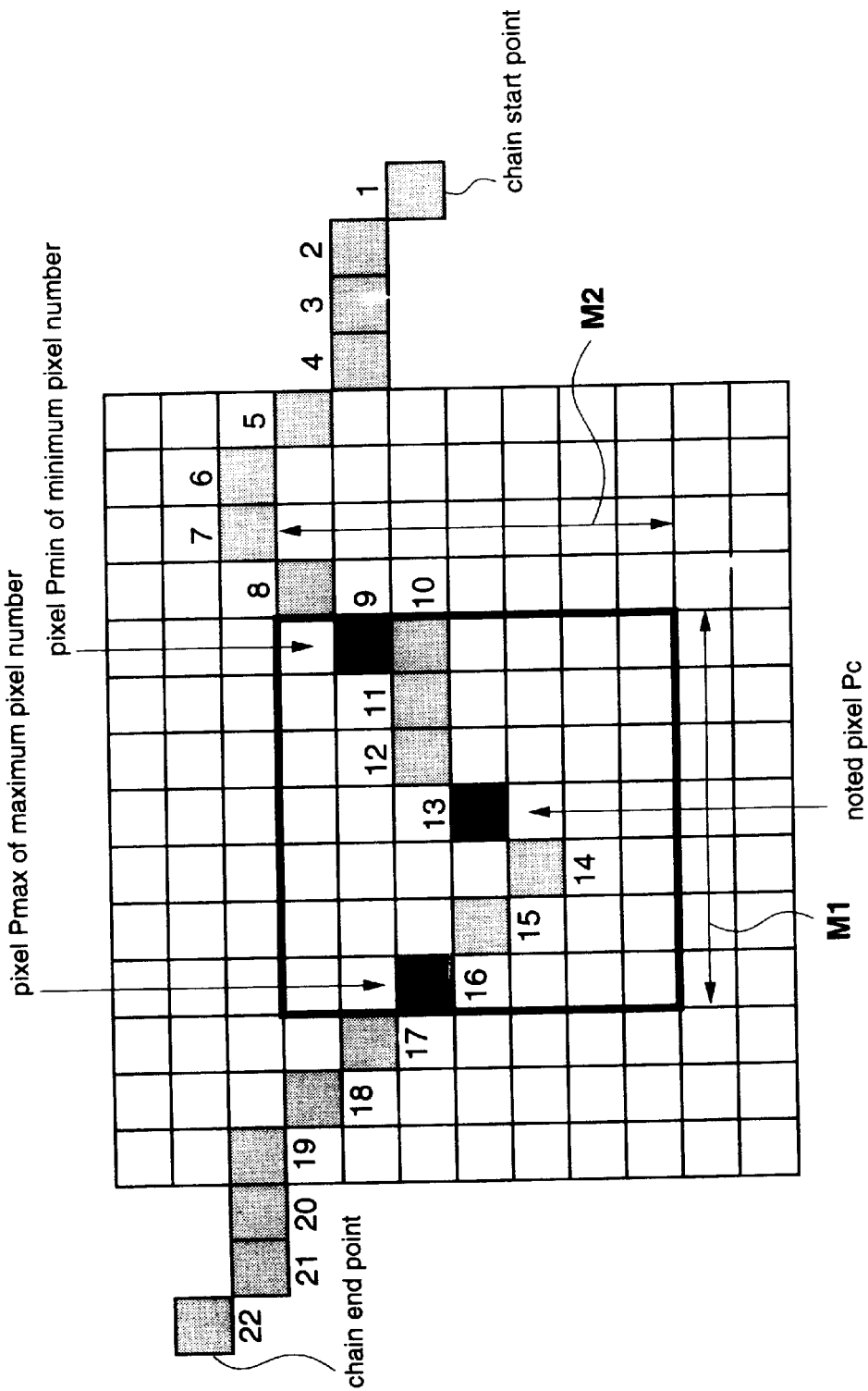
FIG. 74 is a view illustrating the process of step S33 of FIG. 73.

In step S33, the pixel (hereinafter referred to as the first reference point) of the maximum pixel number $P_{max}$, and the pixel (hereinafter referred to as the second reference point) Pmin are detected from pixels comprising the noted chain existing within the M1×M2 pixel range centered about the noted pixel $P_c$. Namely, for example, as shown in FIG. 74, when the chain (the shaded portions of FIG. 74) comprised by the pixels given the pixel numbers 1 to 22 is taken as the noted chain and the pixel of pixel number 13 is taken as the noted pixel, the pixel of the pixels comprising the noted chain existing within the M1×M2 pixel range (the range within FIG. 74 framed by a bold line) centered about this noted pixel of the maximum pixel number 16 is detected as the first reference point $P_{max}$ and pixel of the smallest pixel number 9 is detected as the second reference point Pmin. In the embodiment in FIG. 74, M1=M2=7.

Figure 75:
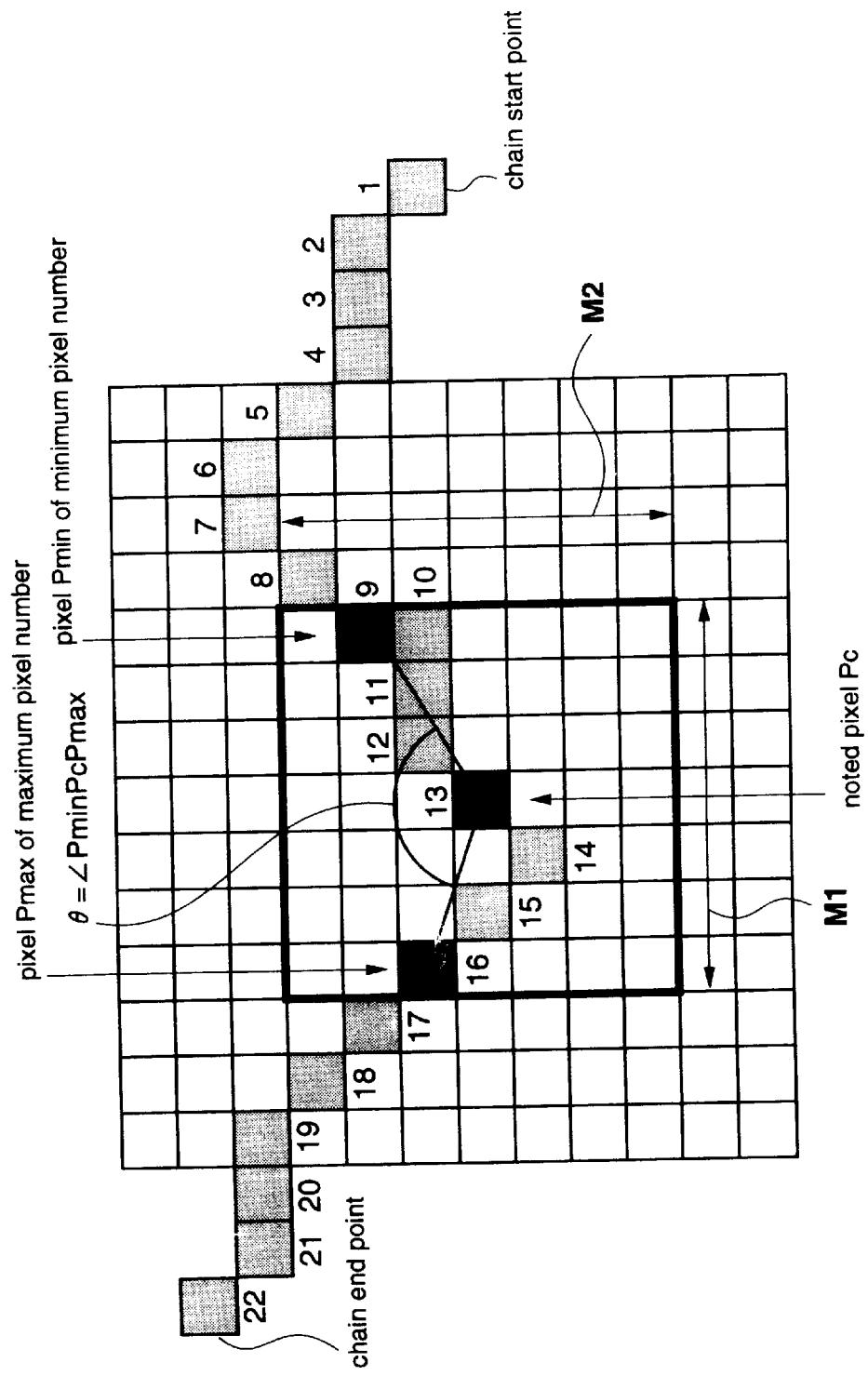
FIG. 75 is a view illustrating the process of step S34 of FIG. 73.

After this, step S34 is proceeded to, the noted pixel Pc is taken as the peak point and the angle θ ($=<P_{min}P_cP_{max}$) between $P_c$, $P_{max}$ and $P_{min}$ is calculated as the angle degree of reliability. Namely, when the noted pixel $P_x$, the first reference point $P_{max}$ and the second reference point Pmin are obtained as shown in FIG. 74, the angle θ (angle degree of reliability) shown in FIG. 75 is calculated as the angle degree of reliability. This angle θ (angle degree of reliability) is specifically calculated as follows. When the coordinates $P_c$, $P_{max}$ and $P_{min}$ are taken as (x, y), ($x_a$, $y_a$) and ($x_b$, $y_b$), the angle degree of reliability θ is calculated in accordance with the equation:

$$\theta = |\arctan(y_a - y/(x_a - x)) - \arctan(y_b - y/(x_b - x))|$$

Further, a determination is made in step S34 as to whether or not, when η0<θ1 (where the units of θ0 and θ1 are taken to be degrees) the angle degree of reliability θ is greater than θ0 and less than θ1, or greater than 180−θ1 and less than 180−θ0. If a determination is made in step S34 that the angle degree of reliability is not greater than θ0 or less than θ1, or greater than 180−θ1 and less than 180−θ0, then step S32 is returned to. Further, if it is determined in step S34 that the angle degree of reliability θ is greater than θ0 and less than θ1, or greater than 180−θ1 and less than 180−θ0, step S35 is proceeded to, and the noted pixel Pc (coordinates of the noted pixel Pc) to which this angle degree of reliability is applied to is taken as a reliable candidate point and outputted to the estimated error degree of reliability calculator 652.

Here, θ0 and θ1 are taken to be, for example, about 20 and 70 degrees, respectively. This is for the following reason. Namely, when the angle degree of reliability θ is before and after 45 degrees (for example, about 20 and 70 degrees) or before and after 135 degrees (for example, 110 degrees to 160 degrees), when the motion vector for this notes pixel Px is obtained by carrying out, for example, block matching, that the reliability of this motion vector is high is understood through experience. On the other hand, motion vectors are detected at the estimated error degree of reliability calculator 652 via block matching. Here θ0 and θ1, as described above, are taken to be about 20 and 70 degrees in order to detect motion vectors of a high degree of reliability at the estimated error degree of reliability calculator 652. Because of this, it can be determined that pixels for which the angle degree of reliability θ0 is greater than θ0 and less than θ1, or greater than 180−θ1 and less than 180−θ1, are of a high degree of reliability with regards to shape.

In step S35, after the reliability candidates have been outputted, step S32 is returned to and in step S32, the process from step S32 to S35 is repeated until there is a determination that there are no more unprocessed pixels. Then, in step S32, when it is determined that there are no unprocessed pixels, the processing finishes, the inputting of new chain encoded data is waited for and the process is again repeated from step S31 onwards.

When the first and second reference points cannot be obtained in step S33, the process thereafter is not carried out, step S32 is returned to and the process from step S32 onwards is repeated again.

Figure 76:
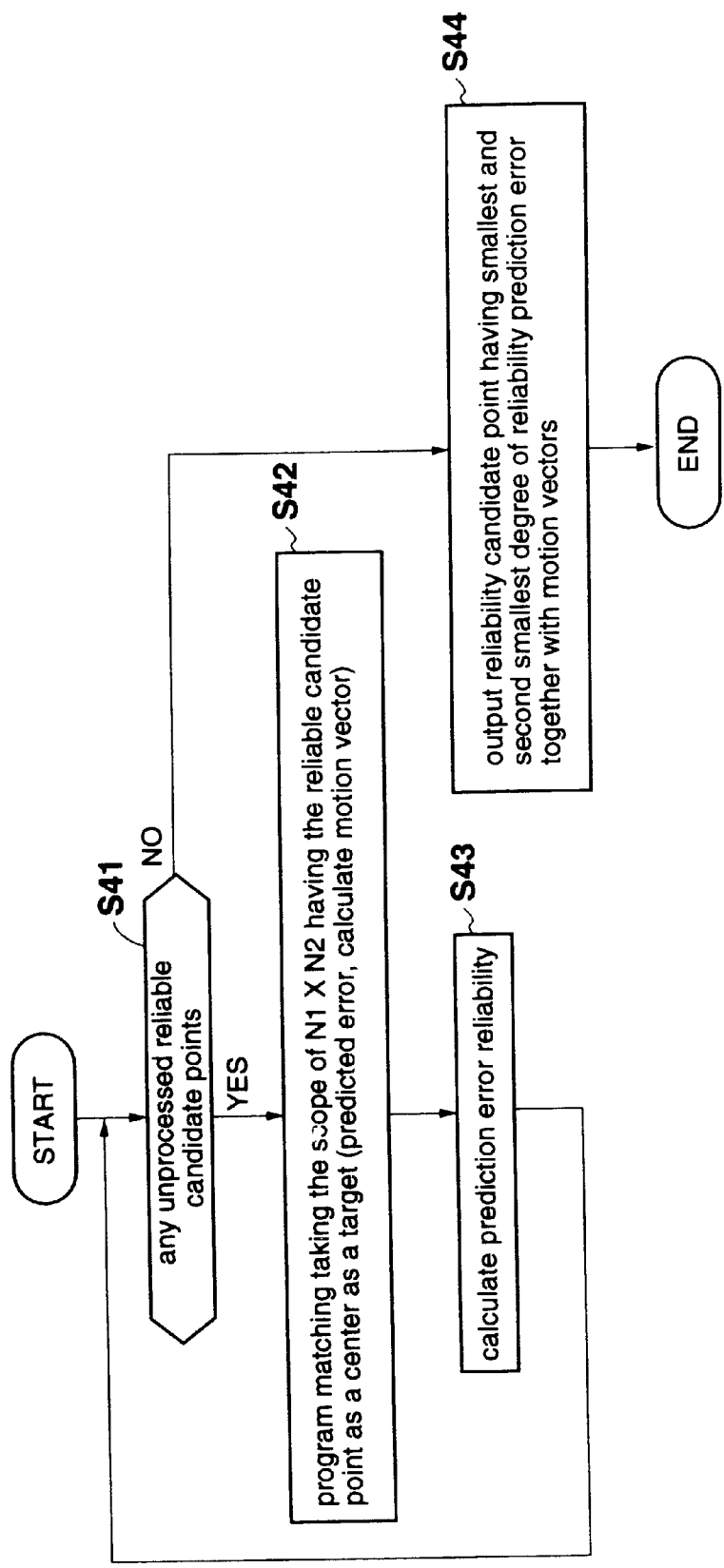
FIG. 76 is a flowchart illustrating the operation of the estimation error degree of reliability calculator 652 shown in FIG. 72.

At the estimated error degree of reliability calculator 652, the outputting of the reliable candidate points for one chain from the shape reliability calculator 651 is waited for and processing is carried out in accordance with the flowchart of FIG. 76. Namely, all of the reliable candidate points for one chain from the shape reliability calculator 651 are received at the estimated error degree of reliability calculator 652 and a determination is made in step S41 as to whether or not there are any unprocessed reliable candidate points amongst all of the reliable candidate points for the one chain received from the shape reliability calculator 651. When it is determined in step S41 that there are unprocessed reliable candidate points amongst the reliable candidate points received from the shape reliability calculator 651, the reliable candidate points detected first are taken as noted reliable candidate points as viewed, for example, in ascending order of pixel number, and step S42 is proceeded to.

In step S42, motion vector detection is carried out using block matching taking the N1×N2 range centered about the noted reliable candidate point as a target. Namely, when the coordinates of the noted reliable candidate point are taken to be (x, y), in step S42, the noted frame data for the N1×N2 pixel range centered about the noted reliable candidate point (x, y) is read out from the current frame buffer 654 and the following frame data for the N1×N2 pixel range centered about the point (x+Δx, y+Δy) is read out from the following frame buffer 655. Further, in step S42, the difference between the noted frame data for the N1×N2 pixel range centered about the point (x, y) and the following frame data for the N1×N2 pixel range centered about the point (x+Δx, y+Δy) i.e. the estimation error, is calculated. After this, the average value of the absolute value for this estimation error is calculated.

The above process is repeated in step S42 while changing the prescribed ranges for Δx and Δy. When the average value of the absolute value for the estimation error is obtained for Δx and Δy occurring within these prescribed ranges, ($\Delta X_{min}$ and $\Delta Y_{min}$) provided by these minimum values are calculated as the motion vectors going to the following frame for the noted reliable candidate points (x, y).

After this, step S43 is proceeded to and the degree of reliability (estimated error degree of reliability) of the noted reliable candidate point is calculated based on the estimation error obtained when block matching was carried out in step S42. In this embodiment, in step S43, the absolute value of the estimation error when the motion vectors ($\Delta x_{min}, \Delta Y_{min}$) are obtained are taken as the estimation error degree of reliability without modification. Step S41 is then returned to and the process is repeated again from step S41 onwards.

It is also possible to use, for example, the total absolute value total or squared total for the estimation error as the estimation error degree of reliability rather than the average value of the absolute value for the estimation error.

After this, when it is determined in step S41 that there are no unprocessed reliable candidate points amongst the reliable candidate points received from the shape reliability calculator 651, i.e. when calculations for the motion vectors and estimation error degree of reliability for all of the reliable candidate points for one chain, step S44 is proceeded to. The reliable candidate point for which the estimation error degree of reliability is smallest (highest estimation error degree of reliability (in this embodiment the degree of reliability is higher for smaller values)) and the reliable candidate point for which this value is the second smallest (second highest estimation error degree of reliability) are selected as the most reliable points of the points (characteristic points) comprising the chain (chains corresponding to the chain encoded data inputted to the shape reliability calculator 651). These points are then outputted as the first and second reliable points, together with the motion vectors.

When the reliable points have been obtained or only a first reliable point has been obtained (when two or more reliable candidate points are not outputted from the shape reliability calculator 651, i.e. when two or more points fulfilling the conditions described in step S34 do not exist), the chain start point and end point are taken as the first and second reliable points, respectively.

The first and second reliable points and motion vectors obtained in the above way are provided to the motion parameter calculator 642 (FIG. 71).

The motion parameter calculator 642 receives the first and second reliable points and motion vectors from the reliable point calculator 641 (estimated error degree of reliability calculator 652) and then calculates the motion parameters going to the following frame for the chain in accordance with the following equation.

Taking the first and second coordinates to be (x1, y1) and (x2, y2), respectively, the motion vectors for the first and second reliable points to be (MVx1, MVy1) and (MVx2, MVy2), respectively, the motion parameter (parallel movement vector) expressing the amount of parallel movement of the chain as (MVx, MVy) , the motion parameter (enlargement/reduction parameter) expressing the rate of enlargement/reduction of the chain as S and the motion parameter (rotation parameter) expressing the amount of rotation of the chain as R, the motion parameters (MVx, MVy), S, and R are calculated at the motion parameter calculator 642 in accordance with the following equation.

$$(MVx, MVy)=((MVx1+MVx2)/2, (MVy1+MVx2)/2)$$

$$S=((1-F)^2+G^2)^{1/2}$$

$$R=\arctan(G/(1-F))$$

Where F=(AC+BD)/E, G=(AD−BC)/E, A=MVx1−MVx2, B=MVy1−MVx2, C=x2−x1, D=y2−y1, $E=C^2+D^2$.

The above equation is obtained by substituting the coordinates for two points and the motion vectors for two points into an equation using the affine parameters shown in FIG. 68 and then resolving this equation.

Figure 77A:
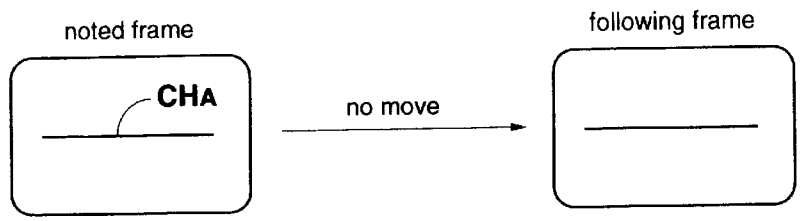
FIG. 77A and FIG. 77B are views illustrating the motion vectors calculated by the motion parameter calculator 325 shown in FIG. 58 (FIG. 63)
Figure 77B:
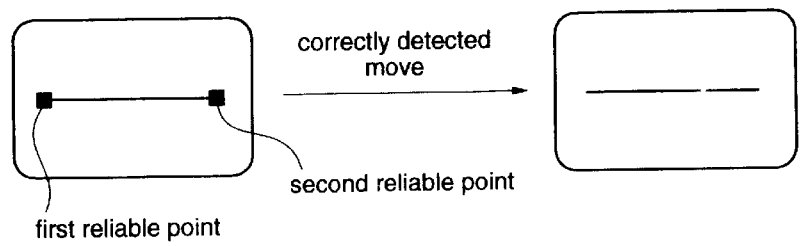

According to the above motion parameter calculator 125, the following kind of motion parameters are detected. Namely, for example, as shown in FIG. 77A, when a straight line-shaped chain $CH_A$ exists at the current frame, when this chain does not move at all in the following frame as shown in FIG. 77B, for example, the start point and end point of the chain $CH_A$ are taken as the first and second reliable points (in this case, the chain $CH_A$ is a straight line, with the start point and end point of the chain $CH_A$ therefore being taken as the first and second reliable points, instead of the reliable candidate points outputted from the shape reliability calculator 651). In this way, a motion parameter showing that the frame does not move at all is calculated.

Figure 78A:
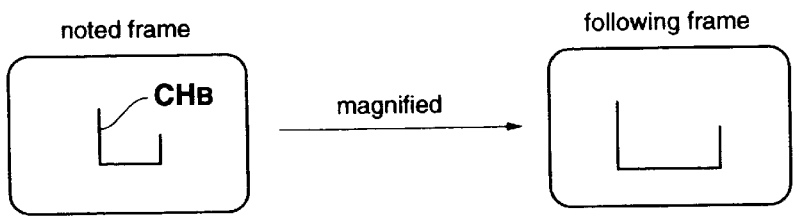
FIG. 78A and FIG. 78B are further views illustrating the motion vectors calculated by the motion parameter calculator 325 shown in FIG. 58 (FIG. 63).
Figure 78B:
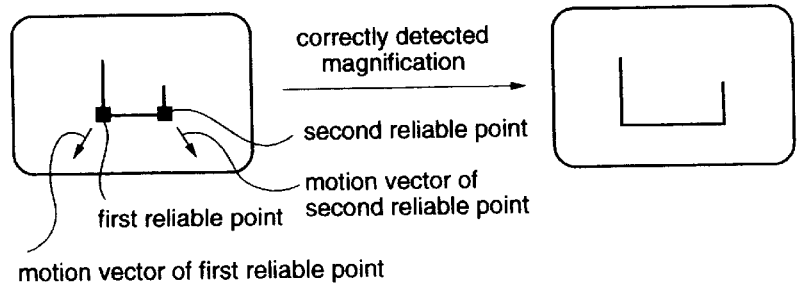

Further, as shown in FIG. 78A, when an open box-shaped chain $CH_B$ exists at the current frame and this chain is enlarged at the following frame as shown in FIG. 77B, the bottom two corners of the box are taken as the first and second reliable points (in this case, the chain $CH_B$ is open box-shaped, with the conditions described in step S34 therefore being fulfilled at the shape reliability calculator 652 and points in the vicinity of the two corners of the box being taken as reliable candidate points (in this embodiment, the two corner points of the box of these kind of reliable candidate points are taken as the first and second reliable points at the estimated error degree of reliability calculator 652)). Further, motion vectors showing movement in a downward left direction and a downward right direction are detected as the motion vectors for the first and second reliable candidate points. As a result, a motion parameter showing enlargement of the chain $CH_B$ is calculated.

According to the motion parameter calculator 325, motion parameters showing the parallel moving, enlargement/reduction and rotation permitted for a moving body are calculated from two points of the points (characteristic points) comprising the chain that can be relied upon (which can be relied upon for calculating the motion parameters) and from the motion vectors for these two points and precise motion parameters can be obtained.

Further, the amount of calculation required can be dramatically reduced when compared with the case for the related art where the estimated error was calculated while modifying the six coefficients a to f because the reliable point motion vectors can be calculated just by obtaining the estimated error while modifying the two coefficients $\Delta x$ and $\Delta y$. As a result, the hardware for carrying out real time processing can be achieved easily and at a low cost.

In the above, the present invention is described for the case of application in an image encoding device for carrying out chain encoding. However, the present invention can also be applied to all image encoding devices for detecting and encoding movement of consecutive points of images. Further, the present invention can also be applied to, for example, video tape recorders, video disc recorders, television conferencing systems and image editing devices, as well as image encoding devices.

In the motion parameter calculator of this embodiment, the angle degree of reliability and estimated error degree of reliability were used as degrees of reliability for selected points that can be relied upon from the points comprising the chain. However, other items such as an index value or an evaluation amount can also be used as the degree of reliability. For example, the periphery of the noted pixel can be filtered using a high-pass filter and the outputted value can be used as the degree of reliability of the noted pixel or, for example, edge reinforcement of the noted pixel can be used as the degree of reliability. Further, in this embodiment, two kinds of degrees of reliability were used, the angle degree of reliability and the estimation error degree of reliability were used together. However, just one type, or three types or more may also be used.

Moreover, the start point and end point of a chain were not necessarily used as reliable point candidates in the motion parameter calculator of this embodiment. However, the start point and end point of a chain may also always be used as a reliable candidate point. Further, the start point and the end point of the chain can then usually be taken to be the first and second reliable points.

In the motion parameter calculator of this embodiment, the motion parameter going to the following frame for the chain is detected. However, the motion parameters going to the previous frame (the frame one frame before the frame at which the chain for which the motion parameters are to be obtained exists) can also be detected. The image data for the previous frame is stored in place of the following frame data.

With the motion parameter calculator of this embodiment, two points are selected from the points comprising the chain and the motion parameters for this chain is calculated. However, this is by no means limited to two, and, for example, one or three points may be selected and the motion parameters for this chain are calculated. When just one point is selected, the estimation error degree of reliability is selected from the reliable candidate points at the estimation error degree of reliability calculator 652. Further, when three points or more are selected, the reliable candidate points are selected in order of estimation error degree of reliability at the estimation error degree of reliability calculator 652. By doing this in this way, one point or more, and the motion vectors for this (or these) point(s), can be outputted from the reliable point calculator 641 (estimation error degree of reliability calculator 652). However, in this case, for example, the average value of this motion vector is calculated as the motion parameters 642 showing the amount of parallel movement of the chain.

According to the image encoding device and image encoding method of the present invention, data relating to characteristic points of moving images is encoded and the resulting data and motion vectors for chains linking characteristic points are multiplexed. In this way, the amount of code generated can be reduced.

Further, according to the image decoding device and image decoding method of the present invention, encoded data encoded with data relating to characteristic points of the moving image and motion vectors for chains linking characteristic points are extracted from transmission data and the encoded data is decoded. The decoded data obtained as a result is then motion compensated in accordance with motion vectors. A decoded image can then be obtained from transmission data including encoded data encoded with data relating to characteristic points of the moving image and motion vectors for chains linking characteristic points.

According to the recording medium of the present invention, data including encoded data encoded with data relating to characteristic points of moving images and motion vectors for chains linking characteristic points can be recorded. The recording of moving pictures of a long duration is therefore possible.

According to the image encoding device of the present invention, one or more of the characteristic points comprising a chain are selected and the motion vectors for these one or more points are detected. The motion parameters for the chain are then calculated based on the motion vectors. Accurate motion parameters can therefore be calculated with few calculations and higher speeds can be achieved for the encode processing as a result.

Further, according to the motion parameter detecting device and motion parameter detecting method of the present invention, one or more points of the consecutive points for the image are selected and motion vectors for these one or more points are detected. Motion parameters for consecutive points are then calculated based on these motion vectors. Accurate motion parameters can then be calculated using few calculations.

What is claimed is:

1. An image encoding method for encoding moving images, comprising the steps of:

detecting characteristic points of a moving image;

encoding a chain generated based on information relating to the characteristic points in such a manner as to generate chain encoded data, with the chain corresponding to an outline of the image;

detecting motion of the chain and generating information corresponding to the motion, wherein said motion information-detecting step is such that motion vectors between corresponding chains existing at neighboring frames are detected and generated as motion information; and multiplexing the chain encoded data and the motion information;

connecting corresponding chains existing in different frames and deciding the chain encoded data and motion vectors in such a manner as to correspond to connection results, with the decided chain encoded data and motion vectors then being multiplexed in the multiplexing step, wherein, in the deciding step is such that a degree of similarity among the chains existing in the neighboring frames is calculated and the corresponding chains are connected based on said degree of similarity, and wherein said deciding step is such that the degree of similarity of a chain A, existing at a prescribed frame, with respect to another chain B existing at a frame neighboring the prescribed frame is calculated based on pixels of the pixels comprising the chain A after shifting in accordance with the motion vectors going from the prescribed frame to the neighboring frame closest to the chain B within the chain existing at the neighboring frame.

2. An image encoding method for encoding moving images, comprising the steps of:

detecting characteristic points of a moving image;

encoding a chain generated based on information relating to the characteristic points in such a manner as to generate chain encoded data, with the chain corresponding to an outline of the image;

detecting motion of the chain and generating information corresponding to the motion, wherein said motion information-detecting step is such that motion vectors between corresponding chains existing at neighboring frames are detected and generated as motion information;

multiplexing the chain encoded data and the motion information; and connecting corresponding chains existing in different frames and deciding the chain encoded data and motion vectors in such a manner as to correspond to connection results, with the decided chain encoded data and motion vectors then being multiplexed in the multiplexing step, wherein, in the deciding step is such that a degree of similarity among the chains existing in the neighboring frames is calculated and the corresponding chains are connected based on said degree of similarity, and wherein said deciding step is such that a degree of similarity SA of the chain A with respect to the chain B and a degree of similarity SB of the chain B with respect to the chain A are calculated and the chain A and the chain B are connected when the degree of similarity SA and the degree of similarity SB are both equal to or greater than a prescribed threshold value.

3. An image encoding method for encoding moving images, comprising the steps of:

detecting characteristic points of a moving image;

encoding a chain generated based on information relating to the characteristic points in such a manner as to generate chain encoded data, with the chain corresponding to an outline of the image;

detecting motion of the chain and generating information corresponding to the motion, wherein said motion information-detecting step is such that motion vectors between corresponding chains existing at neighboring frames are detected and generated as motion information;

multiplexing the chain encoded data and the motion information; and connecting corresponding chains existing in different frames and deciding the chain encoded data and motion vectors in such a manner as to correspond to connection results, with the decided chain encoded data and motion vectors then being multiplexed in the multiplexing step, wherein, in the deciding step is such that a degree of similarity among the chains existing in the neighboring frames is calculated and the corresponding chains are connected based on said degree of similarity, and wherein, when a chain C exists in one of the neighboring frames and a plurality of chains $D1, D2, D3, \ldots$ exist in the remaining frame, said deciding step is such that the degrees of similarity $SC1, SC2, SC3, \ldots$ of the chain C with respect to the plurality of chains $D1, D2, D3, \ldots$, respectively, and degrees of similarity $SD1, SD2, SD3, \ldots$, of the plurality of chains $D1, D2, D3, \ldots$, respectively, with regards to the chain C are calculated, and the chain C and the chains $D1, D2, D3, \ldots$ are connected when all of the degrees of similarity $SD1, SD2, SD3, \ldots$ are greater then or equal to a prescribed threshold value and the total of the degrees of similarity $SC1, SC2, SC3, \ldots$ is equal to or greater than a prescribed threshold value.

4. An image encoding method for encoding moving images, comprising the steps of:

detecting characteristic points of a moving image;

encoding a chain generated based on information relating to the characteristic points in such a manner as to generate chain encoded data, with the chain corresponding to an outline of the image;

detecting motion of the chain and generating information corresponding to the motion, wherein said motion information-detecting step is such that motion vectors between corresponding chains existing at neighboring frames are detected and generated as motion information; and multiplexing the chain encoded data and the motion information;

moving a chain A existing at a prescribed frame A in accordance with a motion vector going from the prescribed frame to a neighboring frame and calculating a degree of visual significance of the chain A after moving, in the neighboring frame; and replacing the chain A after moving with a chain of the chains existing in the neighboring frame at the periphery of the chain A after shifting when the degree of significance calculated in the degree of significance calculating step is greater than or equal to a prescribed threshold value, and wherein said multiplexing step is such that the chain encoded data corresponding to the chain A and the motion vector information to the neighboring frame where chain replacement has been made to take place in the replacing step is multiplexed.

5. An image encoding method according to claim 4, wherein said significance degree calculating step is such that the degree of significance is calculated based on the characteristic points existing at the periphery of the chain A after moving in the neighboring frame.

6. An image encoding method according to claim 4, wherein the significance degree calculating step is such that the degree of significance is calculated based on edge strength of the chain A after moving occurring at the neighboring frame.

7. An image encoding device for encoding moving images, comprising:

detecting means for detecting characteristic points of a moving image;

encoding means for encoding a chain generated based on information relating to the characteristic points in such a manner as to generate chain encoded data, with the chain corresponding to an outline of the image;

motion information detecting means for detecting motion of the chain and generating information corresponding to the motion, wherein said motion information detecting means detects and generates as motion information motion vectors between corresponding chains existing at neighboring frames; and multiplexing means for multiplexing the chain encoded data and the motion information;

deciding means for connecting corresponding chains existing in different frames and deciding the chain encoded data and motion vectors in such a manner as to correspond to connection results, with the decided chain encoded data and motion vectors then being multiplexed at the multiplexing means, wherein, the deciding means calculates a degree of similarity among the chains existing in the neighboring frames and connects corresponding chains based on said degree of similarity, and wherein the deciding means calculates the degree of similarity of a chain A, existing at a prescribed frame, with respect to another chain B existing at a frame neighboring the prescribed frame based on pixels of the pixels comprising the chain A after shifting in accordance with the motion vectors going from the prescribed frame to the neighboring frame closest to the chain B within the chain existing at the neighboring frame.

8. An image encoding device for encoding moving images, comprising:

detecting means for detecting characteristic points of a moving image;

encoding means for encoding a chain generated based on information relating to the characteristic points in such a manner as to generate chain encoded data, with the chain corresponding to an outline of the image;

motion information detecting means for detecting motion of the chain and generating information corresponding to the motion, wherein said motion information detecting means detects and generates as motion information motion vectors between corresponding chains existing at neighboring frames; and multiplexing means for multiplexing the chain encoded data and the motion information;

deciding means for connecting corresponding chains existing in different frames and deciding the chain encoded data and motion vectors in such a manner as to correspond to connection results, with the decided chain encoded data and motion vectors then being multiplexed at the multiplexing means, wherein, the deciding means calculates a degree of similarity among the chains existing in the neighboring frames and connects corresponding chains based on said degree of similarity, and wherein said deciding means calculates a degree of similarity SA of the chain A with respect to the chain B and a degree of similarity SB of the chain B with respect to the chain A and connects the chain A and the chain B when the degree of similarity SA and the degree of similarity SB are both equal to or greater than a prescribed threshold value.

9. An image encoding device for encoding moving images, comprising:

detecting means for detecting characteristic points of a moving image;

encoding means for encoding a chain generated based on information relating to the characteristic points in such a manner as to generate chain encoded data, with the chain corresponding to an outline of the image;

motion information detecting means for detecting motion of the chain and generating information corresponding to the motion, wherein said motion information detecting means detects and generates as motion information motion vectors between corresponding chains existing at neighboring frames; and multiplexing means for multiplexing the chain encoded data and the motion information;

deciding means for connecting corresponding chains existing in different frames and deciding the chain encoded data and motion vectors in such a manner as to correspond to connection results, with the decided chain encoded data and motion vectors then being multiplexed at the multiplexing means, wherein, the deciding means calculates a degree of similarity among the chains existing in the neighboring frames and connects corresponding chains based on said degree of similarity, and wherein, when a chain C exists in one of the neighboring frames and a plurality of chains D1, D2, D3, . . . exist in the remaining frame, said deciding means calculates the degrees of similarity SC1, SC2, SC3, . . . of the chain C with respect to the plurality of chains D1, D2, D3, . . . , respectively, and degrees of similarity SD1, SD2, SD3, . . . , of the plurality of chains D1, D2, D3, . . . , respectively, with regards to the chain C, and connects the chain C and the chains D1, D2, D3, . . . when all of the degrees of similarity SD1, SD2, SD3, . . . are greater then or equal to a prescribed threshold value and the total of the degrees of similarity SC1, SC2, SC3, . . . is equal to or greater than a prescribed threshold value.

10. An image encoding device for encoding moving images, comprising:

detecting means for detecting characteristic points of a moving image;

encoding means for encoding a chain generated based on information relating to the characteristic points in such a manner as to generate chain encoded data, with the chain corresponding to an outline of the image;

motion information detecting means for detecting motion of the chain and generating information corresponding to the motion, wherein said motion information detecting means detects and generates as motion information motion vectors between corresponding chains existing at neighboring frames; and multiplexing means for multiplexing the chain encoded data and the motion information;

moving means for moving a chain A existing at a prescribed frame A in accordance with a motion vector going from the prescribed frame to a neighboring frame and calculating a degree of visual significance of the chain A after moving, in the neighboring frame; and means for replacing the chain A after moving with a chain of the chains existing in the neighboring frame at the periphery of the chain A after shifting when the degree of significance calculated in the degree of significance calculating step is greater than or equal to a prescribed threshold value, and wherein said multiplexing means multiplexes the chain encoded data corresponding to the chain A and the motion vector information to the neighboring frame where chain replacement has been made to take place in the replacing step.

11. An image encoding device according to claim 10, wherein said moving means calculates the degree of significance based on the characteristic points existing at the periphery of the chain A after moving in the neighboring frame.

12. An image encoding device according to claim 10,
wherein said moving means calculates the degree of significance based on edge strength of the chain A after moving occurring at the neighboring frame.

* * * * *